United States Patent
Geissler et al.

(10) Patent No.: US 12,251,784 B2
(45) Date of Patent: Mar. 18, 2025

(54) TRANSPORT DEVICE FOR TRANSPORTING ONE OR MORE HANDLING DEVICES

(71) Applicant: DECKEL MAHO Pfronten GmbH, Pfronten (DE)

(72) Inventors: Alfred Geissler, Pfronten (DE); Michael Trenkle, Pfronten (DE); Sebastian Riedel, Eisenberg (DE)

(73) Assignee: DECKEL MAHO Pfronten GmbH, Pfronten (DE)

( * ) Notice: Subject to any disclaimer, the term of this patent is extended or adjusted under 35 U.S.C. 154(b) by 658 days.

(21) Appl. No.: 17/271,556

(22) PCT Filed: Aug. 30, 2019

(86) PCT No.: PCT/EP2019/073280
§ 371 (c)(1),
(2) Date: Feb. 25, 2021

(87) PCT Pub. No.: WO2020/043912
PCT Pub. Date: Mar. 5, 2020

(65) Prior Publication Data
US 2021/0316412 A1     Oct. 14, 2021

(30) Foreign Application Priority Data

Aug. 30, 2018   (DE) .................... 10 2018 214 794.9
Jan. 18, 2019   (DE) .................... 10 2019 200 663.9

(51) Int. Cl.
*B23Q 7/14*     (2006.01)
*B23Q 3/18*     (2006.01)
(Continued)

(52) U.S. Cl.
CPC ............. *B23Q 7/1436* (2013.01); *B23Q 3/18* (2013.01); *B23Q 7/1442* (2013.01);
(Continued)

(58) Field of Classification Search
CPC ...... B23Q 7/1436; B23Q 3/18; B23Q 7/1442; B23Q 11/0067; B23Q 11/1084;
(Continued)

(56) References Cited

U.S. PATENT DOCUMENTS 4,797,989 A * 1/1989 Cherko .............. B23Q 3/15539
                                                    198/465.1
4,940,378 A * 7/1990 Feldmann .............. B23Q 16/00
                                                    414/584
(Continued)

FOREIGN PATENT DOCUMENTS

AT           504171 A1     3/2008
CN          1233204 A      10/1999
(Continued)

OTHER PUBLICATIONS

Office Action dated Dec. 30, 2022 for CN App. Ser. No. 201980057082. 4, with English Summary.
(Continued)

*Primary Examiner* — Khoi H Tran
*Assistant Examiner* — Tristan J Greiner
(74) *Attorney, Agent, or Firm* — Henricks Slavin LLP

(57) ABSTRACT

The present invention relates to a transport device (100) for transporting one or more handling devices, each for handling a pallet (300) and/or a workpiece (1) on a machine tool (1000) which is set up on a base surface for machining the workpiece (1), wherein the transport device (100) is freely movable on the base surface for positioning the one or more handling devices relative to the machine tool (1000), in particular within a region in front and/or next to the machine tool (1000) and/or in front and/or next to a working space of the machine tool (1000).

22 Claims, 62 Drawing Sheets

(51) Int. Cl.
  *B23Q 11/00* (2006.01)
  *B23Q 11/10* (2006.01)
  *B23Q 37/00* (2006.01)
  *B23Q 39/00* (2006.01)
  *B23Q 39/04* (2006.01)
  *B66F 9/06* (2006.01)
  *G05D 1/00* (2024.01)
  *G05D 1/692* (2024.01)

(52) U.S. Cl.
  CPC ...... *B23Q 11/0067* (2013.01); *B23Q 11/1084* (2013.01); *B23Q 37/007* (2013.01); *B23Q 39/00* (2013.01); *B23Q 39/048* (2013.01); *B66F 9/063* (2013.01); *G05D 1/0027* (2013.01); *G05D 1/692* (2024.01)

(58) Field of Classification Search
  CPC .... B23Q 37/007; B23Q 39/00; B23Q 39/048; B66F 9/063; G05D 2201/0216
  See application file for complete search history.

(56) References Cited

U.S. PATENT DOCUMENTS

| | | | | |
|---|---|---|---|---|
| 2006/0259195 | A1* | 11/2006 | Eliuk | B01F 33/8442 700/245 |
| 2008/0199298 | A1* | 8/2008 | Chilson | B60L 15/38 414/809 |
| 2010/0184575 | A1* | 7/2010 | Williams | B25J 15/04 483/13 |

FOREIGN PATENT DOCUMENTS

| | | | | |
|---|---|---|---|---|
| CN | 102626884 | A | 8/2012 | |
| DE | 3026945 | A1 | 9/1981 | |
| DE | 3219459 | A1 | 1/1983 | |
| DE | 3614165 | A1 * | 10/1987 | ............... B23Q 7/04 |
| DE | 19654536 | A1 | 1/1998 | |
| DE | 103 17 349 | A1 | 11/2004 | |
| DE | 102009040811 | A1 | 3/2011 | |
| EP | 1693149 | A1 | 8/2006 | |
| EP | 2019014 | A2 | 1/2009 | |
| EP | 2987761 | A1 * | 2/2016 | ............ B66F 9/0755 |
| GB | 1263911 | A | 2/1972 | |
| JP | 01-257543 | A | 10/1989 | |
| JP | 1995-136880 | A | 5/1995 | |
| JP | 2013-124783 | A | 6/2013 | |
| WO | WO 2007/059845 | A1 | 5/2007 | |
| WO | WO 2017/109980 | A1 | 6/2017 | |

OTHER PUBLICATIONS

Office Action dated Apr. 4, 2023 for JP App. Ser. No. 2021-510749, with English language translation.
Office Action dated Jul. 13, 2023 for CN App. Ser. No. 201980057082. 4, with English language translation.
International Search Report dated Apr. 3, 2020 for PCT App. Ser. No. PCT/EP2019/073280.
Stierle H., "Fahrerlose Transportfahrzeuge ohne Leitlinien—eine neue Dimension im Materialfluss," *Zeitschrift fur wirtschaftliche Fertigung und Automatisierung*, vol. 86, No. 12, Dec. 1, 1991, p. 632-636.
Egge H., "Fahrerlose Transportsysteme—Eine Loesung Fuer Viele Materialflussprobleme", *Zeitschrift fur wirtschaftliche Fertigung und Automatisierung*, vol. 86, No. 10, Oct. 1, 1991, p. 517-520.
Office Action dated Oct. 4, 2022 for JP App. Ser. No. 2021-510749.

* cited by examiner

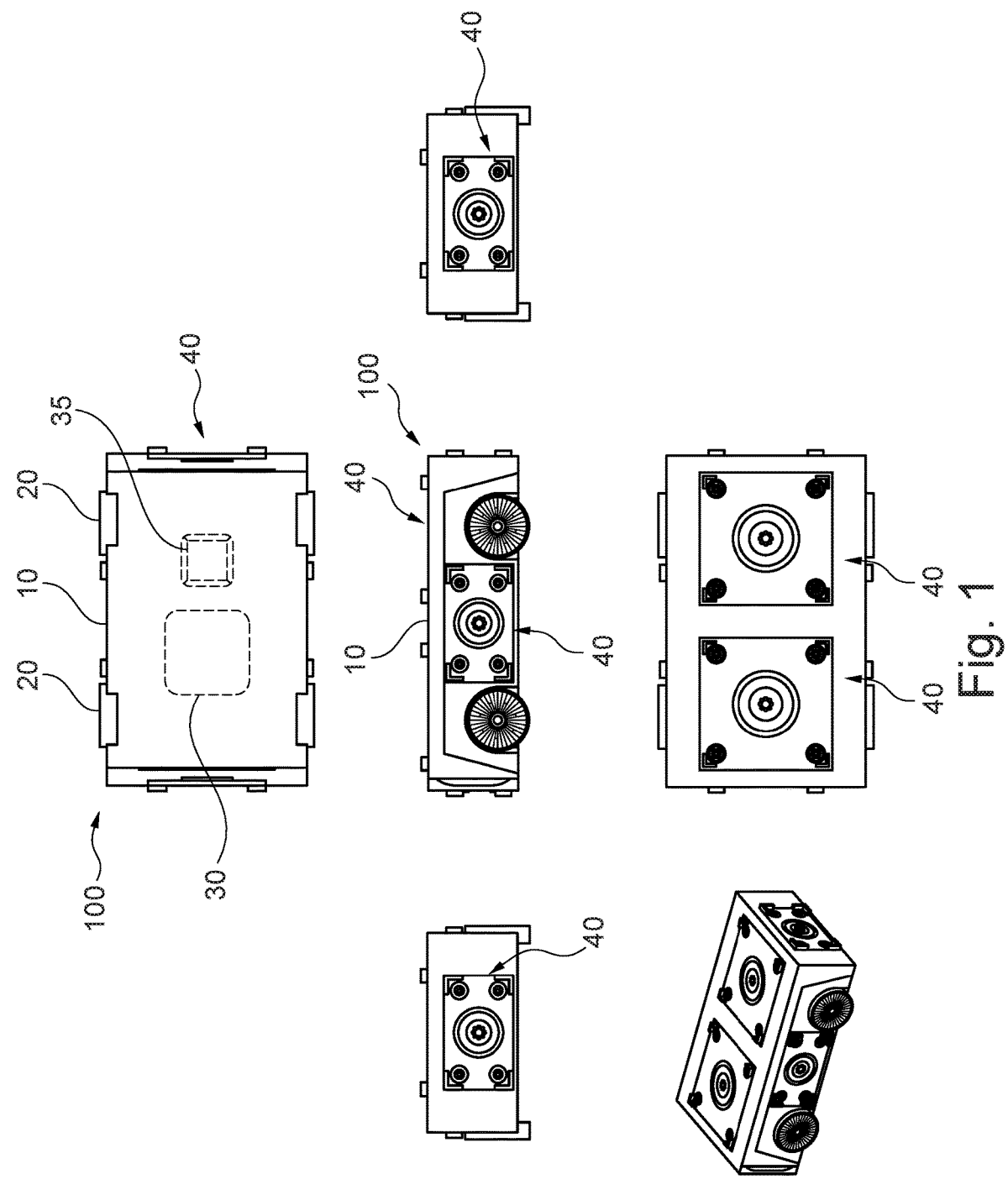

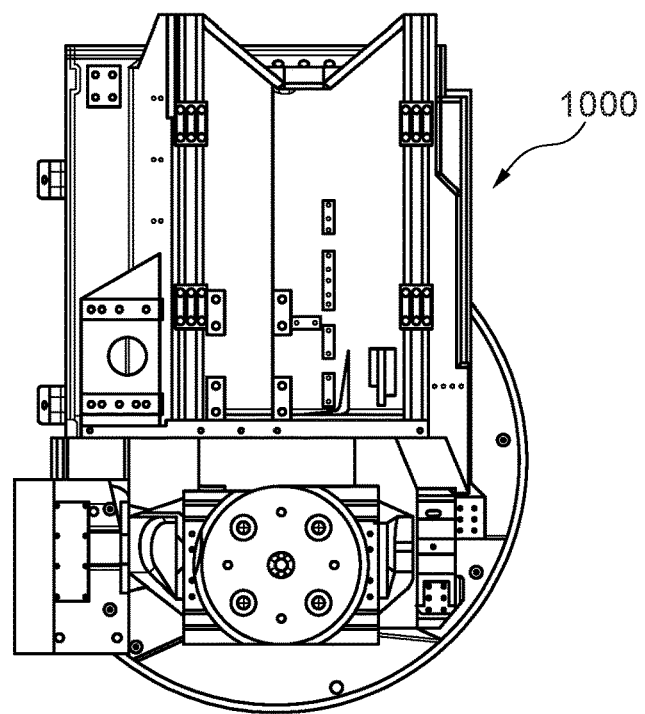
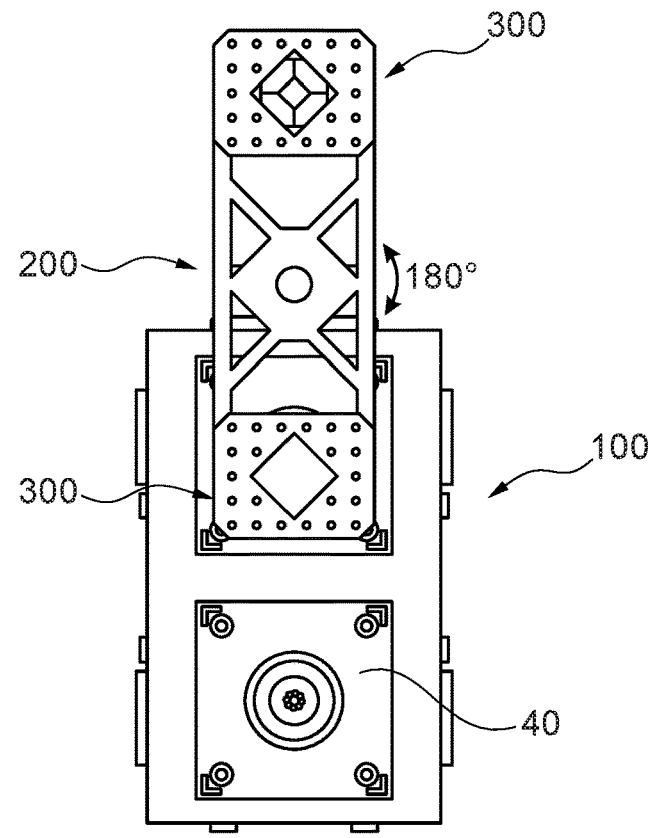
Fig. 5

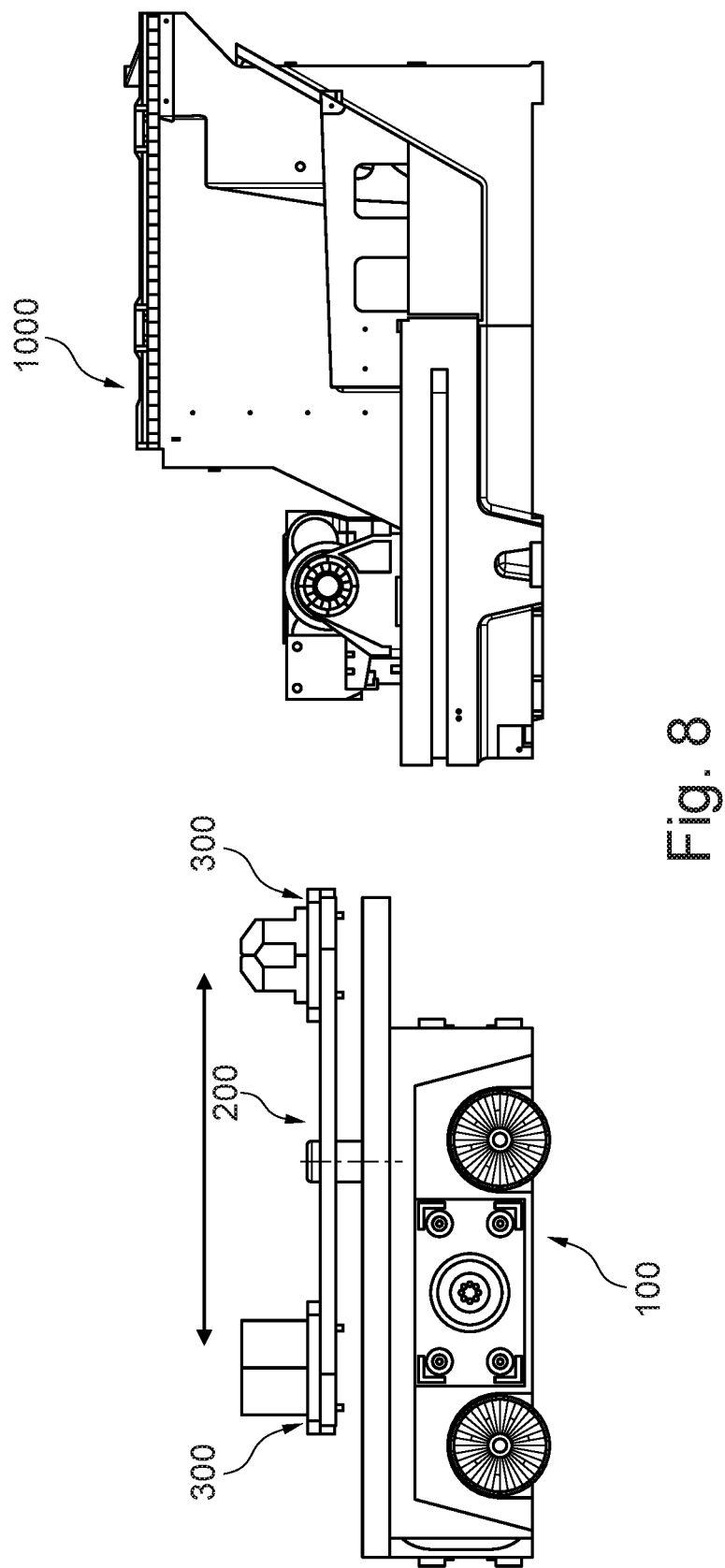

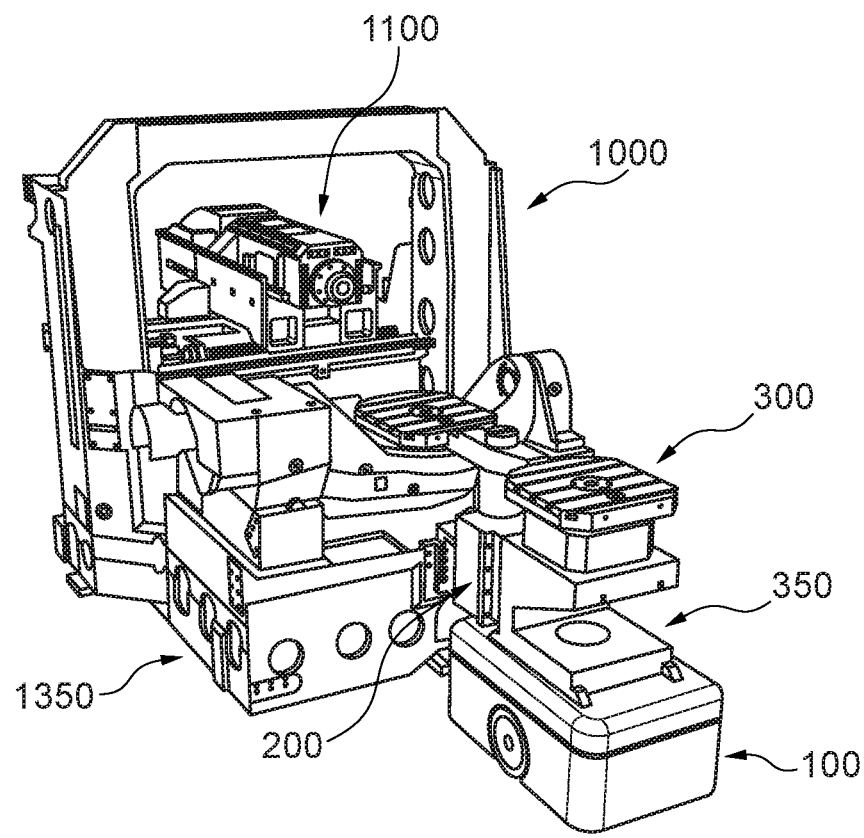
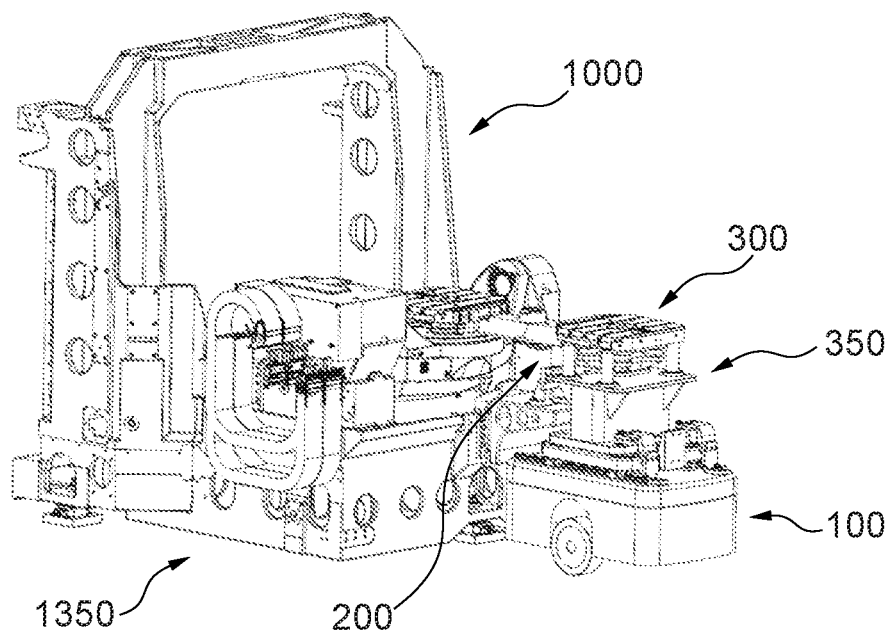
Fig. 12c

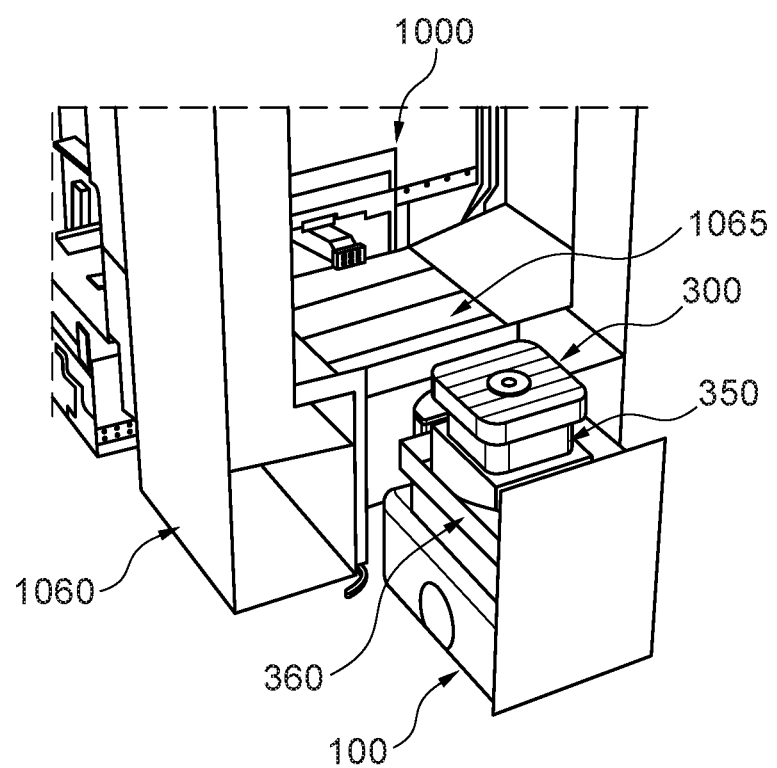
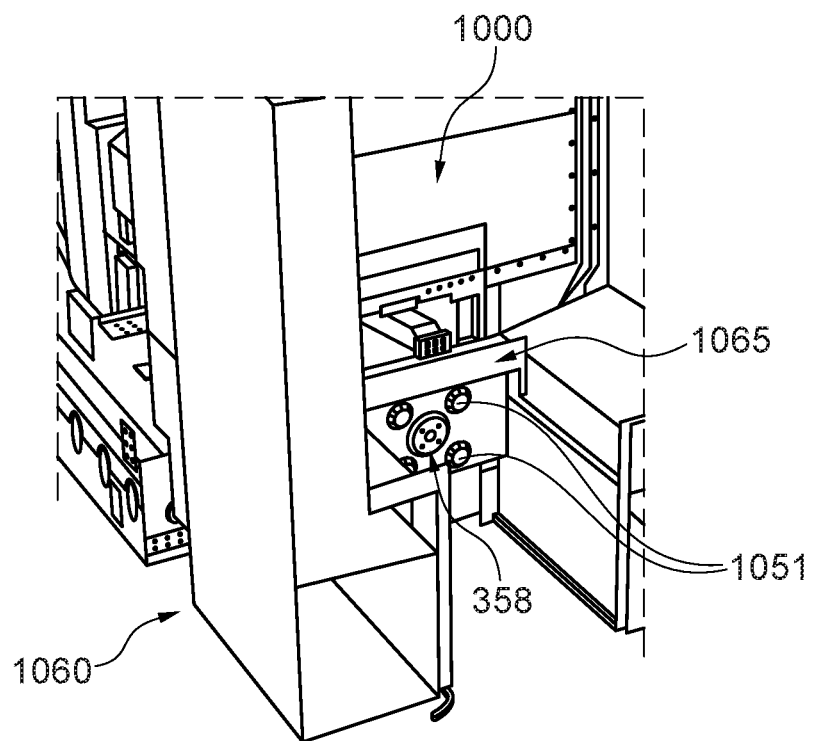
Fig. 20b

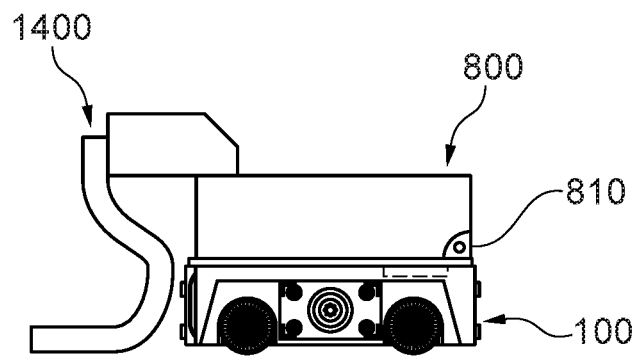
Fig. 29a
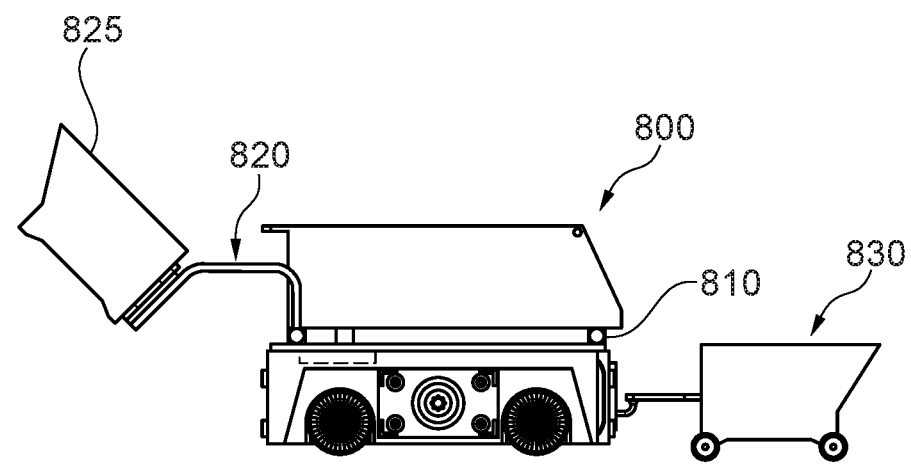
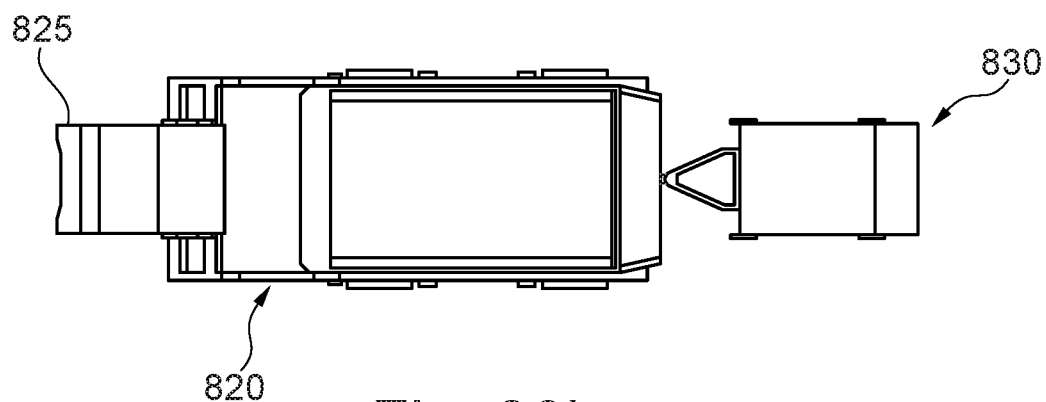
Fig. 29b

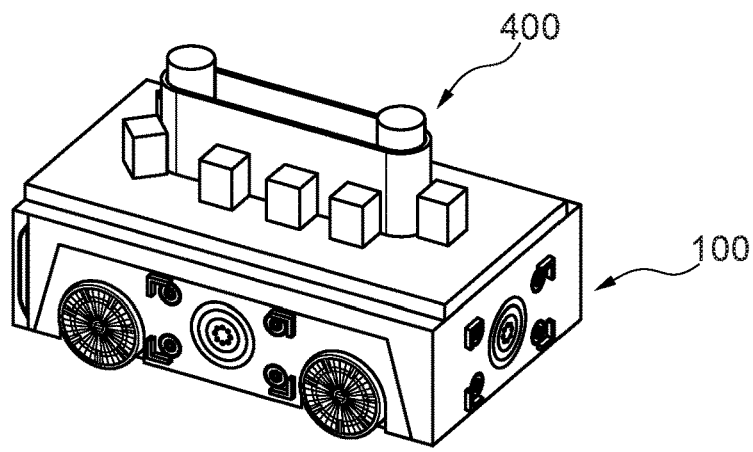
Fig. 33b
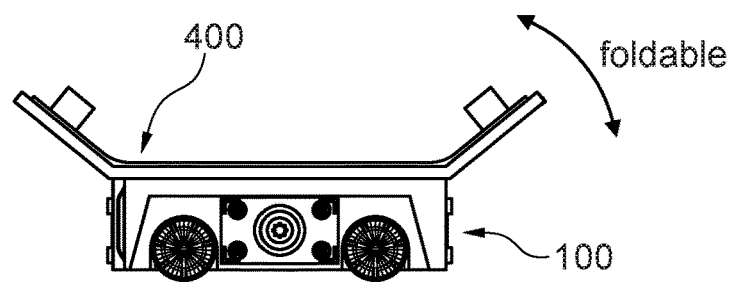
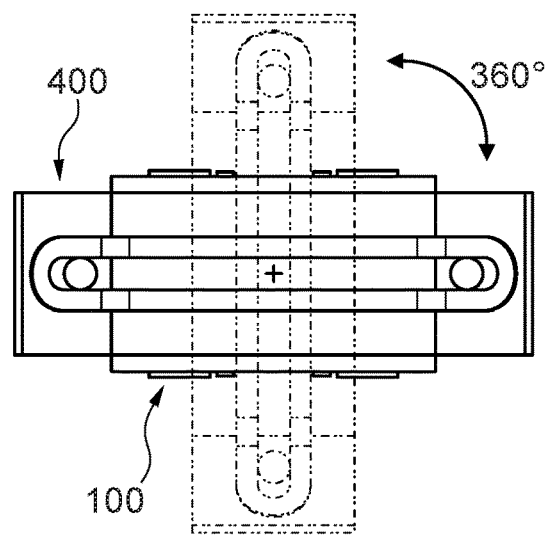
Fig. 33c

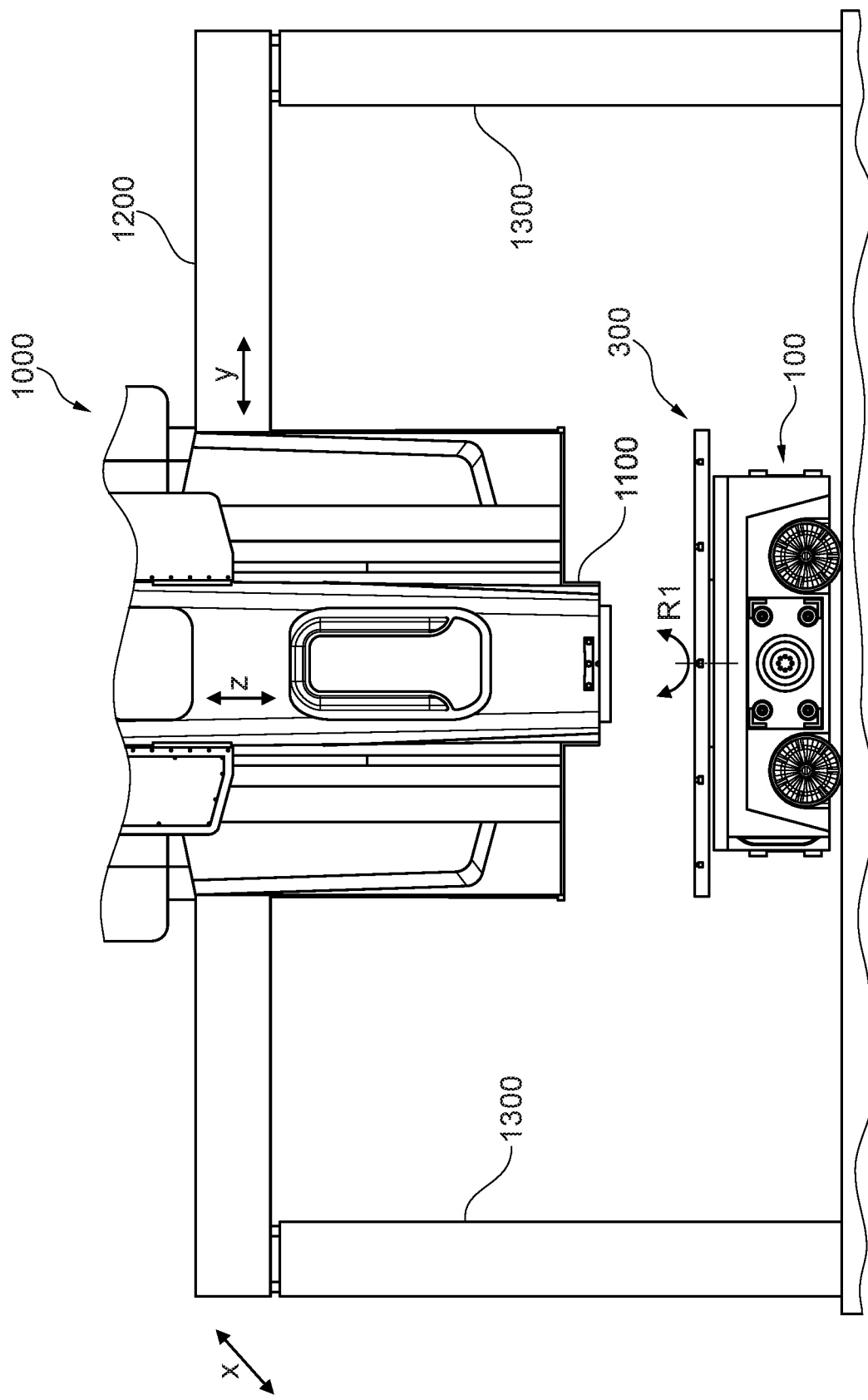

TRANSPORT DEVICE FOR TRANSPORTING ONE OR MORE HANDLING DEVICES

The present invention relates to a transport device for transporting one or more handling devices. Furthermore, the present invention relates to a system the transport device and a central control device.

BACKGROUND OF THE INVENTION

Transport vehicles for picking up and transporting goods within a workshop are known. The best-known examples are forklifts and partly motorized lift trucks. It is a declared goal for such deliveries by corresponding vehicles to continue to increase the level of automation and preferably to synchronize the deliveries with the production processes.

The preferred choice for this purpose are driverless transport systems, or FTSs for short, which, in addition to driverless transport vehicles, or FTFs for short, also have specified places for picking up or depositing goods to be transported by the transport vehicles, possibly also specifically arranged places or stops, for example for preparing the goods being transported for the upcoming production process.

However, FTSs guiding the transport vehicles to the respective stations by a rail system prove to be disadvantageous. Such a rail system is not only very complex with regard to manufacture, arrangement and alignment of the rails and rail segments with respect to one another. It is also merely configured for one specific case and can therefore not react or be adapted to changes in the positions of the places or the production process at short notice.

Such systems are therefore immensely disadvantageous with respect to flexibility.

Furthermore, the currently known FTSs have the disadvantage that the FTTs are usually only equipped with an interface for receiving transport goods or corresponding technical devices etc., so that these vehicles often have to travel long distances to get a large number of containers to their respective destination or to bring the corresponding technical devices to their site of operation.

SUMMARY OF THE INVENTION

Therefore, it is an object of the present invention to provide a transport device for transporting one or more handling devices such that the above problems can be avoided.

Furthermore, it is an object of the present invention to provide a system including the transport device and a central control device.

These objects are achieved by a transport device and system according to the independent claims. The dependent claims relate to advantageous exemplary embodiments of the transport device and system.

The transport device according to the invention for transporting one or more handling devices, each for handling a pallet and/or a workpiece on a machine tool set up on a base surface for machining the workpiece, wherein the transport device is freely movable on the base surface for positioning the one or more handling devices relative to the machine tool, in particular within a region in front of and/or next to the machine tool and/or in front of and/or next to a work space of the machine tool.

By means of the transport device according to the invention, a wide variety of handling processes for pallets or workpieces can be carried out in a particularly advantageous manner, so that a smooth and particularly efficient operating sequence in the production chain is possible.

In particular, the configuration of the transport device according to the invention advantageously allows for customized and free positioning of the transport device in front of the machine tool or in front of the work space of the machine tool without having to rely on a type of rail system or the like.

In addition, various delivery and pick-up operations for pallets and/or workpieces can be carried out on one or more machine tools using the transport device according to the invention in order to further increase the efficiency of production.

Furthermore, the various modules such as pallet changer and/or pallet storage and/or material carrier etc. may be combined with one another in a manner completely unconstrained, just as required. This means that manufacturing processes can be rendered extremely flexible and efficient.

The transport device according to the invention may advantageously be further developed in that the transport device, by means of moving on the base surface, is configured to position the one or more handling devices within a region in front of and/or next to the work space of the machine tool along the spatial directions spanning the region.

As a result, various handling devices can be received by the transport device, transported and brought to their destination in an extremely flexible manner.

Furthermore, the transport device according to the invention may advantageously be further developed in that the transport device has one or more receiving devices for receiving respective handling devices.

In addition, the transport device according to the invention can advantageously be further developed in that at least one of the one or more receiving devices includes a centering device configured to align the handling device received with the receiving device.

In this way, a positioning inaccuracy of the handling device (or another device such as pallet holders, material boxes, etc.) with respect to the machine tool or another device (such as setup station, storage station, magazine station, etc.) can be compensated for when the handling device is deposited/docked on the machine tool. The centering device allows the transport device to correct the relative position of the handling device received with respect to the transport device and thus obtain a positioning inaccuracy of the handling device with respect to the machine tool which essentially only stems from the positioning inaccuracy of the transport device.

Furthermore, the transport device according to the invention may advantageously be further developed in that the at least one of the one or more receiving devices which includes a centering device also includes a drive for linear displacement of the receiving device in the direction of the centering device.

For aligning/centering the handling device received with respect to the transport device, it may also be advantageous when an additional drive is available which is able to move the receiving device in the direction of the centering device (or in the opposite direction) in order to deliver the handling device received to the centering device and thus to assist in centering/aligning.

In addition, the transport device according to the invention may advantageously be further developed in that at least one receiving device is provided on at least one side of the transport device, preferably with at least one receiving device provided on two sides of the transport device, particularly preferably with at least one receiving device provided on each side of the transport device.

Thereby, the transport device according to the invention is now able to receive a large number of modules/modular units in order to assist in the manufacturing processes on the machine tools. In addition, a wide variety of modules can be combined with one another and transported to the respective machine tool or to the respective machine tools.

In addition, the transport device according to the invention may advantageously be further developed in that the one or more receiving devices have connection elements, in particular for establishing an electrical, hydraulic and/or pneumatic connection, in particular for transmitting control signals and/or energy from the transport device to the handling device.

Furthermore, the transport device according to the invention may advantageously be further developed in that the connection elements automatically establish a connection with the handling device for the transmission of electrical, pneumatic and/or hydraulic control signals and/or energy when the handling device is received.

As a result, various modular units can now be received and set down again independently with a high degree of automation by the transport device.

In addition, the transport device according to the invention may advantageously be further developed in that the receiving devices each have a control device for monitoring the state of the receptacle of the respective handling device.

Thereby, certainty regarding the correct reception of the modular units by the transport device can be ensured.

In addition, the transport device according to the invention may advantageously be further developed in that the control device is configured to monitor the control signals, the energy transfer and/or a locking state of the handling device received on the respective receiving device.

Thereby, the signals and the energy transfer may also be monitored. In the event of a failure, for example, the respective transport device can travel to a maintenance position for control and the problem can be localized accordingly.

Furthermore, the transport device according to the invention may also advantageously be further developed in that the one or more receiving devices of the transport device are configured to receive material carriers, in particular mesh boxes with unfinished and/or finished parts.

Moreover, the transport device according to the invention may advantageously be further developed in that the one or more receiving devices of the transport device are configured to receive an exchange gripper for exchanging workpieces and/or tools on the machine tool.

In addition, the transport device according to the invention may advantageously be further developed in that the one or more receiving devices of the transport device are configured to receive a pallet holder.

In addition to handling modules such as a pallet changer, advantageously also material carriers, in particular mesh boxes with unfinished and/or finished parts, exchange grippers for exchanging workpieces and/or tools on the machine tool, and pallet holders for transporting/storing a pallet may be accommodated by the transport device. This also increases the flexibility of the production/manufacturing processes.

Furthermore, the transport device according to the invention may advantageously be further developed in that at least the handling device, the material carrier, the exchange gripper and/or the pallet holder are configured to be deposited and/or docked on a receptacle of the machine tool configured to receive the handling device, the material carrier, the exchange gripper and/or the pallet holder by the transport device.

Here, the transport device acts as a delivery unit for the machine tool by bringing a wide variety of modules/devices to the machine tool and placing them there (for example on a receptacle configured for this purpose) or docking them there (also on a receptacle configured for this purpose). The receptacles may comprise conical receptacles which, for example, also have connection options for energy and/or signals. Connections for fluids (such as cooling lubricants) may also be provided at the cones, In addition, the transport device according to the invention may advantageously be further developed in that a plurality of receiving devices of the transport device are configured uniformly.

In this way, a wide variety of modules/modular units can be received on the uniformly configured receiving devices. In particular, such a "standardization" of the receiving devices makes it possible to switch back and forth between the individual modules for the receiving device, so that not only one receiving device is suitable for a module.

Furthermore, a transport device according to the invention may advantageously be further developed in that the transport device comprises a driverless transport vehicle.

Particularly advantageously, this allows for the degree of automation of the entire production to be increased many times over, since the coordination and generally the control of the driverless transport vehicles or transport devices can be carried out, for example, by a central computer/control device so that a worker primarily has a monitoring function.

In addition, the transport device according to the invention may advantageously be further developed by: a drive for moving the transport vehicle, and a control unit for controlling the transport device.

Furthermore, the transport device according to the invention may advantageously be further developed by an internal energy store supplying the transport device with energy, in particular electrical energy.

Moreover, the transport device according to the invention may advantageously be further developed by a sensor unit comprising one or more optical, infrared and/or radar sensors for monitoring the environment of the transport device.

In addition to providing a time-limited, self-sufficient energy supply for the freely movable machine tool structure, this ensures the safety of the surroundings, in particular people who are present in the workshop and may be walking around, since the freely movable machine tool structures register them and can accordingly trigger a safety function if a collision occurs or is imminent.

Furthermore, the transport device according to the invention may advantageously be further developed by a plurality of wheels for moving or displacing the transport device, one, several or all wheels of the transport device being individually controllable and/or steerable.

In addition, the transport device according to the invention may advantageously be further developed in that one, a plurality or all of the wheels of the transport device are configured as individually controllable Mecanum wheels.

Since they are already widely known in robotics, Mecanum wheels may also be used advantageously for the transport device in order to also ensure great flexibility in the movement or in the possibilities of movement of the transport device.

The transport device according to the invention may advantageously be further developed by one or more drive chains for moving or displacing the transport device.

An advantageous development of the transport device according to the invention is that the one or more handling devices comprise a pallet changer for exchanging the pallet in the machine tool.

In addition, the transport device according to the invention may advantageously be further developed in that the pallet changer is configured to exchange the pallet in the work space and/or at a setup station of the machine tool.

Furthermore, the transport device according to the invention may advantageously be further developed in that the pallet changer includes a gripper, a receiving claw and/or a fork-shaped receptacle for receiving the pallet.

The list mentioned here is not to be understood as exclusive, but may be supplemented with further configuration options for the pallet changer.

A particularly advantageous development of the transport device according to the invention is that the one or more handling devices comprise an industrial robot for handling and/or machining the workpiece.

In this way, the transport device may be expanded in a particularly advantageous manner to provide the possibility of receiving an industrial robot by means of which the transport device can take over or assist in the handling and/or machining of workpieces.

Furthermore, the transport device according to the invention may advantageously be further developed in that the transport device is configured to receive at least one of the one or more handling devices, the material carrier, the exchange gripper and/or the pallet holder from the machine tool and to transport it/them to a storage station and/or to receive it/them at the storage station and to transport it/them from the storage station to the machine tool.

In this way, the transport device may particularly advantageously serve as a delivery vehicle for supplying the machine tools with the required handling devices such as a pallet changer or an industrial robot and to also deposit the handling devices there in order to take over other tasks.

Moreover, the transport device according to the invention may advantageously be further developed in that, when receiving the handling device, the material carrier, the exchange gripper and/or the pallet holder, the transport device is configured to establish a connection between one or more connection elements of the transport device and one or more connection elements of the handling device, the material carrier, the exchange gripper and/or the pallet holder, in particular for the transmission of control signals and/or energy from the transport device to the handling device, the material carrier, the exchange gripper and/or the pallet holder.

In this way, the degree of automation can be increased further since an independent connection between the transport device and the module/modular unit can be established by the transport device.

A particularly advantageous development of the transport device according to the invention is that the transport device is configured to deposit and/or dock one or more handling devices, a material carrier, an exchange gripper and/or a pallet holder on the machine tool.

In this way, the transport device can deliver the required handling devices, material carriers, exchange grippers and/or pallet holders to the respective machine tool, deposit them there, and take on another task instead of having to wait in front of the machine tool until the handling device (or another device) has performed the work on the machine tool. This allows for a significantly more efficient utilization of the transport device(s).

In addition, the transport device according to the invention may advantageously be further developed in that, when the handling device, the material carrier, the exchange gripper and/or the pallet holder are deposited, the transport device is configured to establish a connection between one or more connection elements of the machine tool and one or more connection elements of the handling device, the material carrier, the exchange gripper and/or the pallet holder, in particular for transferring control signals and/or energy from the machine tool to the handling device, the material carrier, the exchange gripper and/or the pallet holder.

In this way, advantageously direct communication between the deposited handling device, the material carrier, the exchange gripper and/or the pallet holder and the machine tool can take place and the machine tool can directly control the handling device, the material carrier, the exchange gripper and/or the pallet holder as required.

Furthermore, the transport device according to the invention may advantageously be further developed in that, when depositing the handling device, the material carrier, the changeable gripper and/or the pallet holder on the machine tool, the transport device is configured to sever a connection for transmitting control signals and/or energy from the transport device to the handling device, the material carrier, the exchange gripper and/or the pallet holder.

This allows for the transport device to deposit the handling device (or another device) and detach itself therefrom so that the handling device can perform its task in front of the machine tool as a kind of "stand-alone" device without the aid of the transport device.

In addition, the transport device according to the invention may advantageously be further developed in that the transport device is configured to communicate with an external control device, in particular with a central control device configured to be connected to a plurality of transport devices at the same time, in particular by means of a wireless communication connection, and to control the plurality of transport devices, in particular by automatic remote control.

In this way, the central control device can be used to communicate with the transport devices and with the modules received by the transport devices and to control them if required.

The system according to the invention comprising one or more transport devices according to the invention and a central control device configured to be connected to the one or more transport devices, in particular by means of a wireless communication connection, and to control the plurality of transport devices, in particular by automatic remote control.

By means of the transport device according to the invention, the production and machining process of workpieces can be rendered much more flexible. In addition, the transport device according to the invention can be used both with existing manufacturing structures and for completely new processes for manufacturing and machining workpieces.

In addition, the transport device according to the invention offers the clear advantage of not being restricted to any tasks within the production chain/within the production process due to its flexible usage options.

Hereinafter, examples of a transport device, a machine tool and a method for handling a pallet or a workpiece and their respective advantages will be described.

An exemplary transport device for transporting a handling device for handling a pallet and/or a workpiece to a machine tool for machining the workpiece, wherein the machine tool including a work spindle for receiving a tool or the workpiece and a pallet for receiving the tool or the workpiece is further configured to position the handling device within a region in front of a work space of the machine tool along the spatial directions spanning the region.

The exemplary transport device makes it possible to dispense entirely with rail systems for guiding the transport vehicles since the transport vehicles can move freely on a plane such as the hall floor.

In addition, this allows for the vehicles and their "trajectories" to be individually adapted to the circumstances, thus allowing for a significant increase in flexibility in production and logistics.

Furthermore, the exemplary transport device has a large number of interfaces at which a wide variety of handling devices such as pallet changers, robots, containers and boxes, etc. can be received, which can further increase flexibility in the production process as well as in the area of logistics.

The exemplary transport device may advantageously be further developed in that the transport device is further a driverless transport vehicle comprising a platform including a plurality of receiving devices for receiving handling devices, a drive for moving the platform, and a control unit for controlling the receiving devices and the drive of the platform.

In order to increase the degree of automation, the exemplary transport device is configured as a driverless transport vehicle with appropriate control and networking such that even a plurality of transport vehicles/transport devices can be moved in a coordinated manner.

The exemplary transport device may advantageously be further developed in that at least one receiving device is provided on at least one side of the transport device, preferably at least one receiving device is provided on at least two sides of the transport device, and particularly preferably at least one receiving device is provided on each side of the transport device.

In this way, significantly more technical devices and/or containers can now be brought to their respective destination with just one trip than possible with previously known transport vehicles.

The exemplary transport device may advantageously be further developed in that the platform further includes an internal energy store supplying the receiving devices, the drive and the control unit of the platform with energy, in particular electrical energy.

In this way, the transport device can move freely through factory halls and production or manufacturing areas without the need to provide a complex routing system for cables for energy and/or signal transmission.

The exemplary transport device may advantageously be further developed in that the control unit further includes a sensor unit comprising optical, infrared and/or radar sensors for monitoring the environment of the transport device.

For monitoring the environment and detecting any obstacles, it is advantageous to provide such sensors on a driverless transport vehicle. This also increases the protection of the factory workers in the hall.

The exemplary transport device may advantageously be further developed in that the transport device is further configured to deposit the handling device after it has been positioned on the machine tool.

This possibility is particularly advantageous in that the transport device does not have to remain in place along with the handling device, but can transport other handling devices while, for example, the deposited handling device performs its function on the respective machine tool.

The exemplary transport device may advantageously be further developed in that the receiving devices further include connection elements configured for a transmission of control signals and/or energy from the transport device to the handling device.

In this way, energy and signals for controlling the handling device can advantageously be transmitted from the transport device to the handling device. This is particularly advantageous because the transport device can be in contact with a central main computer control (via radio signal, WLAN, etc.) and thereby all handling devices that are being moved by transport devices at the time can be controlled.

The exemplary transport device may advantageously be further developed in that, when the handling device is received, the connection elements of the receiving devices of the transport device automatically establish a connection with the handling device for the transmission of control signals and/or energy.

This eliminates the manual intervention of a factory worker and allows for the degree of automation of the production and logistics processes to be increased further.

The exemplary transport device may advantageously be further developed in that the receiving devices each include a control device for monitoring the status of the reception of the respective handling device.

The exemplary transport device may advantageously be further developed in that the control device is configured to monitor the control signals, the energy transfer, and/or a locking state of the handling device received on the respective receiving device.

This is particularly advantageous in order to avoid malfunctions of the handling devices that could possibly occur and to ensure the safety of the handling device on the transport device as well as the safety of the workers in the immediate vicinity of the handling device.

In addition, faulty receptacles or faulty components (damaged contacts of the connections for energy and/or signal transmission, etc.) can be localized more quickly and thus can be replaced/repaired more quickly.

The exemplary transport device may advantageously be further developed in that the drive includes a plurality of wheels for moving the platform, the wheels being individually controllable and/or steerable.

In particular, it is advantageous if the wheels can be controlled or steered separately from one another as individual units, whereby the mobility and maneuverability of the transport device can be significantly improved in comparison with vehicles with only a steerable axle.

The exemplary transport device may advantageously be further developed in that the wheels are configured as individually controllable Mecanum wheels.

The great advantage of Mecanum wheels is that steering of the wheels can be omitted entirely and that the direction of travel or the direction of rotation of the transport device can be controlled solely by the direction of rotation of the individual wheels. The prerequisite for the function of Mecanum wheels is that each wheel always has sufficient contact with the ground.

The exemplary transport device may advantageously be further developed in that the drive includes a large number of chains for moving the platform.

In addition to the classic wheels and Mecanum wheels, chains may also be used to move the transport device. This may be advantageous when the transport device has to carry large loads and these loads must/should be distributed over the largest possible area of the ground on which the transport device is traveling.

The exemplary transport device may advantageously be further developed in that the handling device is a pallet changer for exchanging the pallet in the machine tool and the pallet changer is configured for exchanging the pallet in the work space and/or at a setup station of the machine tool.

In particular, it is advantageous if the handling device that can be transported by the transport device is a pallet changer. In this way, various pallets can be transported to the individual machine tools and inserted or exchanged with just one pallet changer and one transport device.

The exemplary transport device may advantageously be further developed in that the pallet changer has a receiving claw or a fork-shaped receptacle for receiving the pallet.

The exemplary transport device may advantageously be further developed in that the handling device is an industrial robot for handling and/or machining the workpiece.

However, it may also be extremely advantageous for the transport device to receive, in addition to or instead of the pallet changer, a robot (industrial robot) and to transport it to machine tools or processing stations where a robot is needed. This may be for workpiece handling tasks (e.g., fitting the machine table/pallet or the work spindle with workpieces, exchanging tools on a work spindle or a tool turret, post-processing workpieces such as burr removal, etc.). The areas of application of a robot in the field of machining are manifold.

The exemplary transport device may advantageously be further developed in that the receiving devices of the transport device are further configured to receive material carriers, in particular mesh boxes with unfinished and/or finished parts, and to receive an exchange gripper.

The exemplary transport device may advantageously be further developed in that the receiving devices of the transport device are of configured uniformly.

In particular, it is advantageous if the receiving devices by means of which the handling devices such as pallet changers, robots, material pallets, mesh boxes, etc. can be received by the transport device, are uniform, that is to say standardized. In this way, all conceivable handling devices can be provided with one or the same interface, so that regardless of which handling device is to be received, the connection for energy and/or signal transmission can be established automatically.

An exemplary machine tool for machining a workpiece comprises: a work spindle for receiving a tool or the workpiece, a pallet for receiving the tool or the workpiece, and a handling device for handling the pallet and/or the workpiece, wherein the handling device can be positioned on the machine tool by an exemplary transport device.

This offers a number of advantages, since the transport device can bring any handling device to the machine tool that is required or even necessary for the respective pending machining steps. The machine tool, in particular the equipment with workpieces and/or tools, can obtain a higher degree of automation and autonomous work times of the machine tools can be extended.

The exemplary machine tool c may advantageously be further developed in that the machine tool further includes positioning devices for spatial positioning of the handling device with respect to the machine tool in case the handling device is deposited on the machine tool by the transport device.

Exact positioning of the handling device may not only be advantageous, but also necessary, for example when pallets have to be placed very precisely on a pallet holder or for example when equipping operations or post-processing of a workpiece must be carried out with a robot at small tolerances.

The exemplary machine tool may advantageously be further developed in that the positioning devices include connection elements configured for the transmission of control signals and/or energy from the machine tool to the deposited handling device.

In this way, energy and signals for controlling the handling device can advantageously be transmitted from the machine tool to the handling device and thus be independent of the transmission of the energy or the signals on the part of the transport device.

The exemplary machine tool may advantageously be further developed in that the connection elements of the positioning devices of the machine tool automatically establish a connection with the handling device for the transmission of control signals and/or energy when the handling device is deposited by the transport device.

In this way, the degree of automation can advantageously be increased further and manual intervention by a worker can be eliminated.

An exemplary method for handling a pallet and/or a workpiece on the exemplary machine tool comprises the steps of: receiving a handling device for handling the pallet and/or the workpiece by means of the exemplary transport device from a storage station, transporting the handling device by means of the transport device from the storage station to the machine tool, positioning the handling device by means of the transport device on the machine tool, in particular in front of a work space of the machine tool, and handling the pallet and/or the workpiece by means of the handling device on the machine tool.

The exemplary method may advantageously be further developed in that, during the step of receiving the handling device, a connection is established between the transport device and the handling device by means of connecting elements of the transport device, via which control signals and/or energy are transmitted from the transport device to the handling device.

The exemplary method may advantageously be further developed in that the following steps are carried out before the step of handling the pallet and/or the workpiece: depositing the handling device in front of the workspace of the machine tool by the transport device, and positioning the handling device by positioning devices of the machine tool.

The exemplary method may advantageously be further developed in that, when the handling device is deposited, the positioning devices of the machine tool are establishing a connection between the machine tool and the handling device by means of connection elements of the machine tool, via which control signals and/or energy are transmitted from the machine tool to the handling device.

The exemplary method may advantageously be further developed in that, before the step of handling the pallet and/or the workpiece, the following steps are performed: severing the connection for the transmission of control signals and/or energy from the transport device to the handling device, and moving the transport device further from the machine tool to the storage station or another machine tool.

The exemplary method may advantageously be further developed in that, after the step of handling the pallet and/or the workpiece, the following steps are performed: receiving the handling device from the positioning devices of the machine tool by the transport device, wherein during reception of the handling device the connection for the transmission of control signals and/or energy from the machine tool to the handling device is severed, and moving the transport device with the handling device received again further from the machine tool to the storage station or to another machine tool.

The exemplary method may advantageously be further developed in that a central computer unit is connected to the control unit of the transport device for controlling the individual steps, the central computer unit being configured to be connected to and control a plurality of transport devices at the same time.

By using the exemplary transport device, the flexibility in the production processes could be significantly improved and changes in production could be responded to quickly.

Further aspects and their advantages as well as advantages and more specific implementation options of the aspects and features described above are described with the following descriptions and explanations of the attached figures, which are in no way to be considered restrictive.

BRIEF DESCRIPTION OF THE DRAWINGS

FIG. 1 schematically shows an embodiment of the transport device according to the invention with receiving devices for receiving handling devices.

FIG. 5 schematically shows an embodiment of the transport device according to the invention during a pallet change, the transport device remaining in its position and the pallet changer, an H-shaped pallet changer as shown in FIG. 3, rotating.

FIG. 8 schematically shows an embodiment of the transport device according to the invention with a displaceable pallet changer.

FIG. 12c schematically shows a transport device according to the invention when loading a pallet changer.

FIG. 20b schematically shows a further embodiment of the transport device according to the invention which transports a pallet into a work space of a machine tool.

FIG. 24b shows a detailed view of the embodiment of the transport device according to the invention as shown in FIG. 24a.

FIG. 29a schematically shows a further embodiment of the transport device for chip removal according to the invention at a chip cart of a machine tool.

FIG. 29b schematically shows a further embodiment of the transport device for chip removal according to the invention with a lifting mechanism and an additional chip container.

FIG. 33b schematically shows a detailed view of the transport device according to the invention as shown in FIG. 33a.

FIG. 33c schematically shows a further embodiment of the transport device according to the invention with a foldable conveyor belt.

FIG. 39 schematically shows a further embodiment of the transport device according to the invention as part of various machine concepts of a machine tool.

Figure 2A:
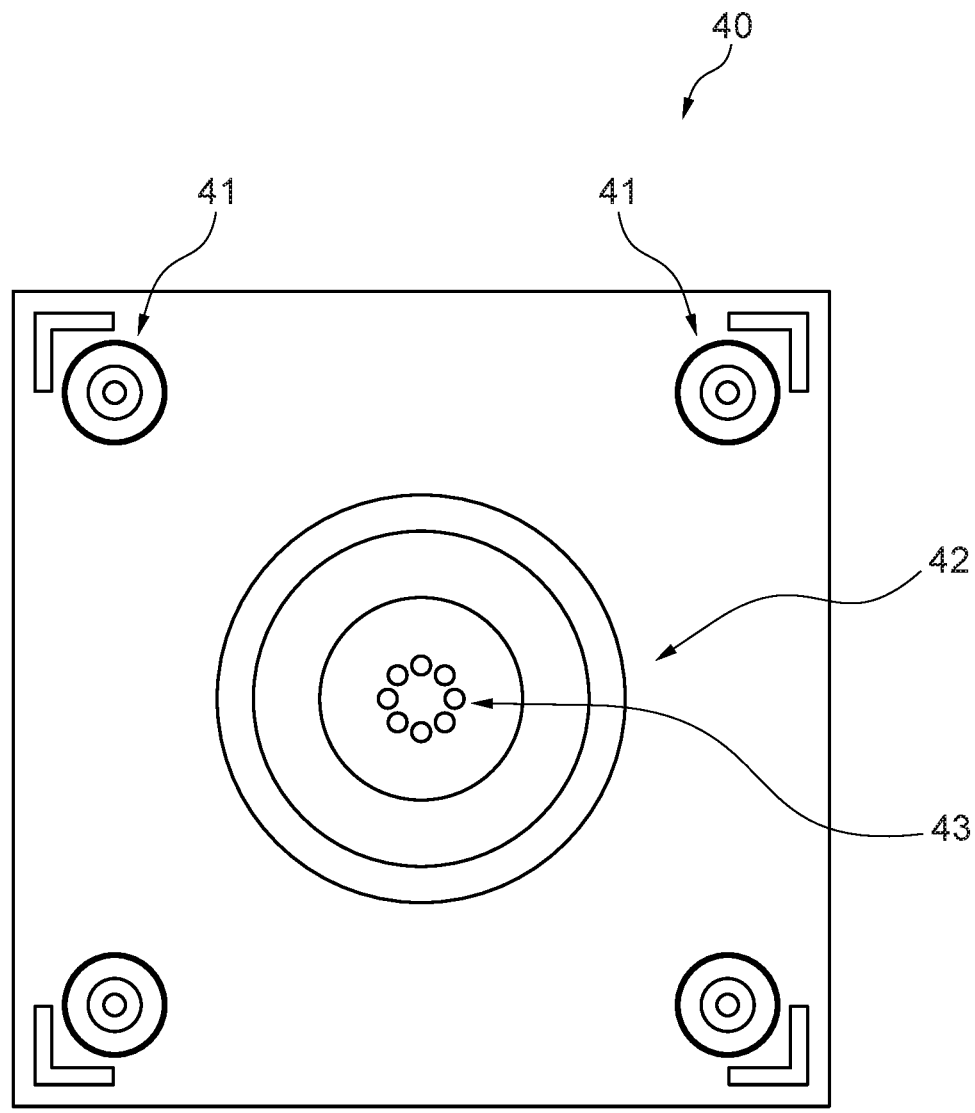
FIG. 2a schematically shows a detailed view of a receiving device for receiving handling devices.

DETAILED DESCRIPTION OF THE FIGURES AND PREFERRED EMBODIMENTS OF THE PRESENT INVENTION

In the following, examples or exemplary embodiments of the present invention are described in detail with reference to the appended figures. The same or similar elements in the figures can be designated with the same reference symbols, but sometimes with different reference symbols.

It should be emphasized that the present invention is in no way limited or restricted by the exemplary embodiments described below and their design features, but also includes modifications of the exemplary embodiments, in particular those that are included within the scope of the independent claims by modifications of the features of the described examples or by combining one or more of the features of the described examples.

FIG. 1 schematically shows an embodiment of the transport device 100 according to the invention with receiving devices 40 for receiving handling devices.

The embodiment of the transport device 100 according to the invention shown in FIG. 1 is, in a particularly preferred embodiment, configured as a driverless transport vehicle (FTF) of a driverless transport system (FTS).

Here, the transport device 100 includes a chassis 10 (platform) and a drive 20. The chassis is configured to accommodate an energy store 30, wherein an electrical energy store 30 such as a battery is preferably used for this purpose. However, the energy store 30 is not limited to electrical energy, so that, if necessary, mechanical energy may also be stored in the form of, for example, pressurized fluids or deformation energy (e.g. a resilient element). Further energy stores for e.g. hydraulics or pneumatics may also be accommodated in the chassis 10.

Furthermore, the transport device 100 according to the invention particularly preferably comprises wheels 20 for moving the transport device 100, for example in a factory hall. These wheels 20 may be connected to a central drive motor via a drive train (not shown), but they may also each have their own drive motor (e.g. one or more electric motors) individually controllable by an internal controller 35.

Furthermore, the wheels 20 may be steered individually so that an extremely flexible driving style and positioning (for example turning on the spot, sideways travel etc.) of the transport device 100 according to the invention becomes possible. The wheels 20 may, however, also put the transport device 100 into a rotating motion by means of a movement in opposite directions in order to achieve a positioning of the transport device 100.

Alternatively, instead of the wheels 20, chains or a crawler chassis or a combination of wheels 20 and chains/crawler chassis may be used in order to further increase the mobility or flexibility of the transport device 100 according to the invention.

A particularly preferred embodiment of the wheels 20 are so-called Mecanum wheels. By simply controlling the direction of rotation of each wheel 20, they allow for a rotational movement of the transport device 100 on the spot, a translational movement of the transport device 100 both in the longitudinal direction (forwards, backwards) and in the transverse direction (sideways movement) of the transport device 100, as well as in a 45° angle with respect to the longitudinal or transverse direction.

By using Mecanum wheels, a steering mechanism for the wheels 20 may advantageously be completely eliminated and a corresponding positioning movement of the transport device 100 can be obtained solely with the internal controller 35.

Furthermore, the chassis 10 is preferably configured as a platform carrier including a wide variety of receiving devices 40 for handling devices (e.g., automation components or transport components, etc.).

The platform carrier particularly preferably includes n+1 receiving devices 40 for the various handling devices, the receiving devices 40 being particularly preferably arranged on the entire platform carrier. In particular, all sides (spatial planes) of the transport device 100 are preferably used for providing a receiving device 40 (cf. also the various views of the transport device 100 in FIG. 1). Thereby, far more handling devices can be received and moved accordingly than is possible, for example, with a commercially available transport vehicle such as a forklift or a motorized lift truck.

However, it should be pointed out that the number and/or the distribution of the receiving devices 40 on the transport device 100 is not limited to the number/distribution shown in FIG. 1. For example, only a single receiving device 40 may be provided on the top of the transport device 100, for example, and/or two or more receiving devices 40 may be provided on one or more sides of the transport device 100.

Furthermore, the receiving devices 40 provided on the upper side of the transport device 100 may differ in size and properties from the receiving devices 40 on the sides of the transport device 100. This may be advantageous, for example, when smaller handling devices with a comparatively low weight are to be received on the sides of the transport device 100 and the heavier handling devices are to be preferably positioned above the axes/the drive 20 of the transport device 100.

Furthermore, for example, the smaller receiving devices 40 on the sides of the transport device 100 may also have a smaller number of connections (see the explanations for FIG. 2) compared to the larger receiving devices 40 on the upper side of the transport device 100.

The transport device 100 is preferably equipped with a unit for optically monitoring its environment (not shown here) and the coupled handling devices. This device is preferably coupled to the control software of the internal controller 35 and allows for an action to be taken on the basis of the detection.

In addition, further sensors are preferably installed in the transport device 100, said sensors making possible to monitor the environment and components in a suitable manner. For example, infrared or radar sensors may be used.

FIG. 2a schematically shows a detailed view of a receiving device 40 for receiving handling devices (or any other devices).

Here, the receiving devices 40 are preferably configured for mechanical fixation of the handling devices, for signal transmission and energy transmission to the respective handling device. Depending on the handling device, only one of the transmission options or any combination thereof may be used.

Furthermore, the receiving devices 40 are particularly preferably configured to be automated. The transport device 100 can thus independently exchange the handling devices and can therefore be used flexibly for a wide variety of tasks. In the case of automated embodiments of the transport device 100, quick-release couplings (e.g., front loader quick-release couplings) are also particularly suitable for automatically establishing a connection for energy transmission or signal transmission between the transport device 100 and the handling device.

As shown in FIG. 2a, for example, cone-shaped portions 41 of the receiving device 40 may be provided in order to align and fix the corresponding handling device with respect to the receiving device 40. For aligning and simultaneously fixing the handling device on the receiving device 40 in such a way, clamping cones may advantageously be used here, as are already known, for example, from the receptacle for pallets in a machine tool.

Furthermore, the receiving device 40 may have an interface 42 for the transmission of mechanical energy (for example a rotation of a motor provided in the transport device 100 to the handling device) and/or electrical, hydraulic and/or pneumatic energy. Furthermore, however, operating means such as cooling lubricant could also be fed from the transport device to the handling device respectively received on the receiving device 40, for example. For this purpose, for example, corresponding fastening means and connections conducting electricity and/or fluids (fastening means and connections 43) may be provided.

In addition, the interface 42 may advantageously include a device for contactless transmission of signals between the receiving device 40 of the transport device 100 and the handling device. This device for contactless signal transmission may be configured, for example, as a transmitter/receiver coil or as an inductive coupler with I/O link for contactless transmission of the signals.

The device may be provided at any point on the interface 42 or even outside of the interface 42, the device for contactless signal transmission advantageously being provided centrally in the interface 42.

It should be noted at this point that, for example, the connections conducting electricity and/or fluids do not necessarily have to be provided on the interface 42. They may also be provided outside of the interface 42, for example in order to separate/isolate the transmission of rotational energy from the transmission of electrical/fluid energy.

Moreover, the receiving devices 40 are particularly preferably configured to be uniform or standardized such that any components or handling devices with correspondingly uniformly configured receiving elements can be attached and essentially the same quick-release couplings can be used for energy or signal transmission.

Furthermore, the receiving devices 40 preferably have the option of monitoring the state of the receiving handling device. This preferably includes the monitoring of the clamping situation of the coupled handling device (for example at the clamping cones), status and signals thereof, as well as energy transfer thereof.

When monitoring the clamping state, preferably a contact control or a clamping control in the receiving devices 40 may be used, the contact control preferably determining the state via electrical signals or alternatively using blown air for this purpose.

As an example, the transport device 100 may receive the following handling devices: pallet changers (e.g. known from machine tools), robots, material pallets, mesh boxes and other material carriers, storage stations for robot accessories (e.g. exchange grippers), deburring stations, washing stations, tools for, e.g., machine tools, forklift trucks, etc. For further details, reference is made to FIGS. 3 to 11 and 22 to 36.

It should be pointed out here that the possible handling devices receivable by the receiving devices 40 of the transport device 100 are in no way covered by the above list.

Furthermore, the transport device 100 is advantageously configured such that the handling devices can be combined with one another as desired in order to enable greater flexibility for specific applications.

The internal controller 35 of the transport device 100 preferably includes its own control software which can control and monitor the travel and transport movements. The control software could, for example, be expanded by individual software modules that are necessary for the respective components or handling devices. This may, for example, be the attachment of a robot control or the attachment of the control of a pallet changer.

Figure 2B:
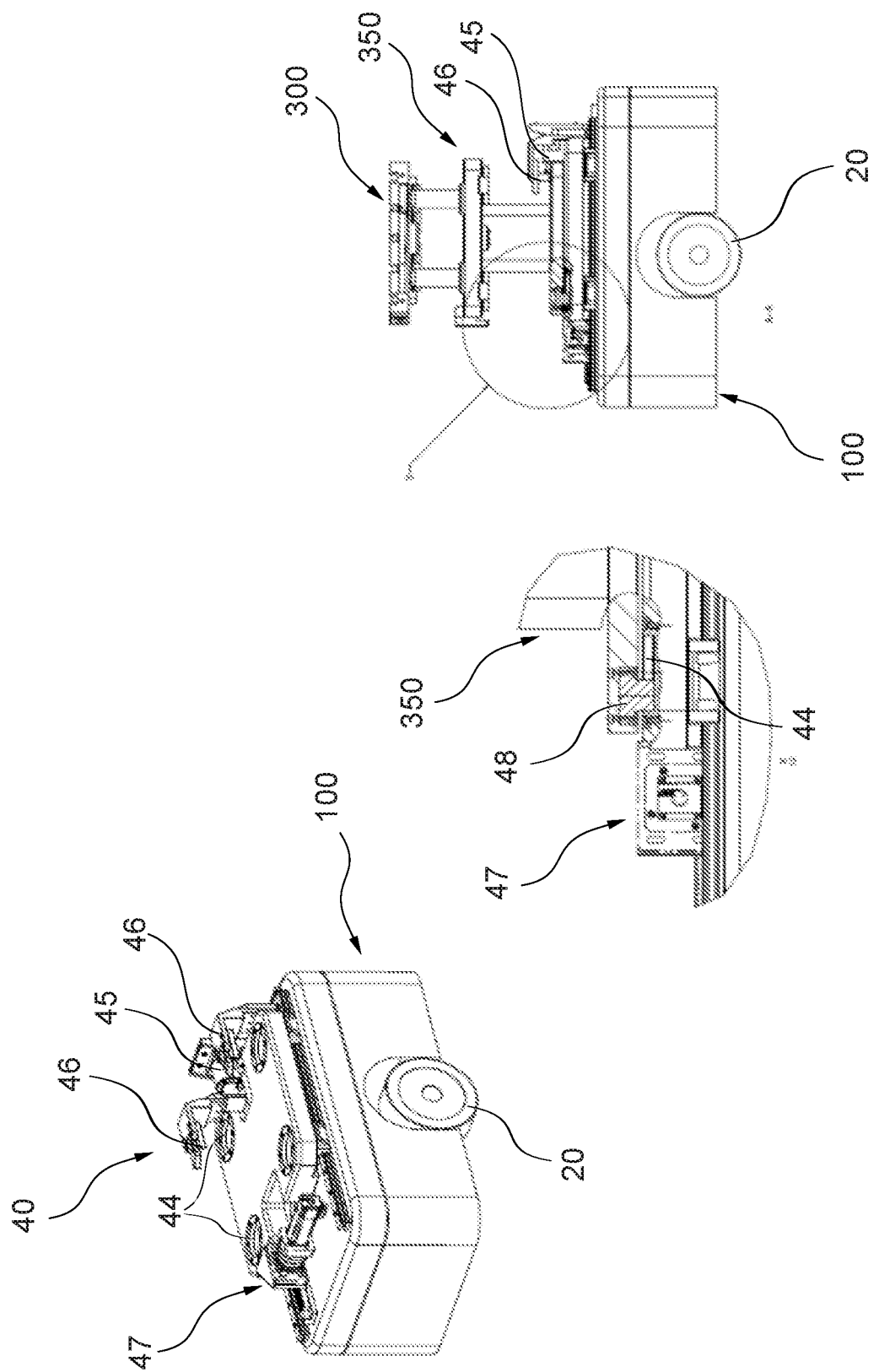
FIG. 2b schematically shows a further embodiment of the receiving device of the transport device for receiving a handling device.

FIG. 2b schematically shows a further embodiment of the receiving device 40 of the transport device 100 for receiving a handling device (or any other device).

Here, the receiving device 40 includes at least one recess 44 (for example a milled recess or a bore) by which a bolt 48 of a device (for example the handling device, pallet holder 350 or any other device) can be received. In this case, the recess 44 has a greater extent than, for example, the diameter of the bolt 48 so that the bolt 48 can be displaceably mounted on the bottom of the recess 44. In addition or as an alternative to the bottom, the recess 44 may also have at least one receiving surface (for supporting the received device) by which the device can be received.

It should already be pointed out here that the recesses 44 are provided on the device and the bolts 48 therefor are provided on the receiving device 40. In addition, it should be pointed out that, in addition to the combination of recess 44/bolt 48, other shape pairings are also conceivable for receiving the device on the receiving device 40, for example prism and cone. The options mentioned and described herein are not to be regarded as exclusive.

Furthermore, the receiving device 40 may have a device 46 for centering the device received by the receiving device 40 (here pallet holder 350) relative to the transport device 100 or the receiving device 40. This is particularly advantageous in order to compensate for possible positioning inaccuracies of the received device on the receiving device 40 by means of the transport device 100.

The reception and, if necessary, centering of the exemplary pallet holder 350 on the receiving device 40 or by the centering device 46 takes place as follows:

At the beginning, the transport device 100 moves with the respective receiving device 40 (and a certain positioning accuracy) under the device to be received (here, for example, the pallet holder 350). Here, the pallet holder 350 may be pressed against a pressure piece 45 provided on the side of the receiving device 40, like the centering device 46. This pressure piece 45 ensures that the pallet holder 350 is biased in the direction opposite the centering device 46 with respect to the receiving device 40.

Figure 17A:
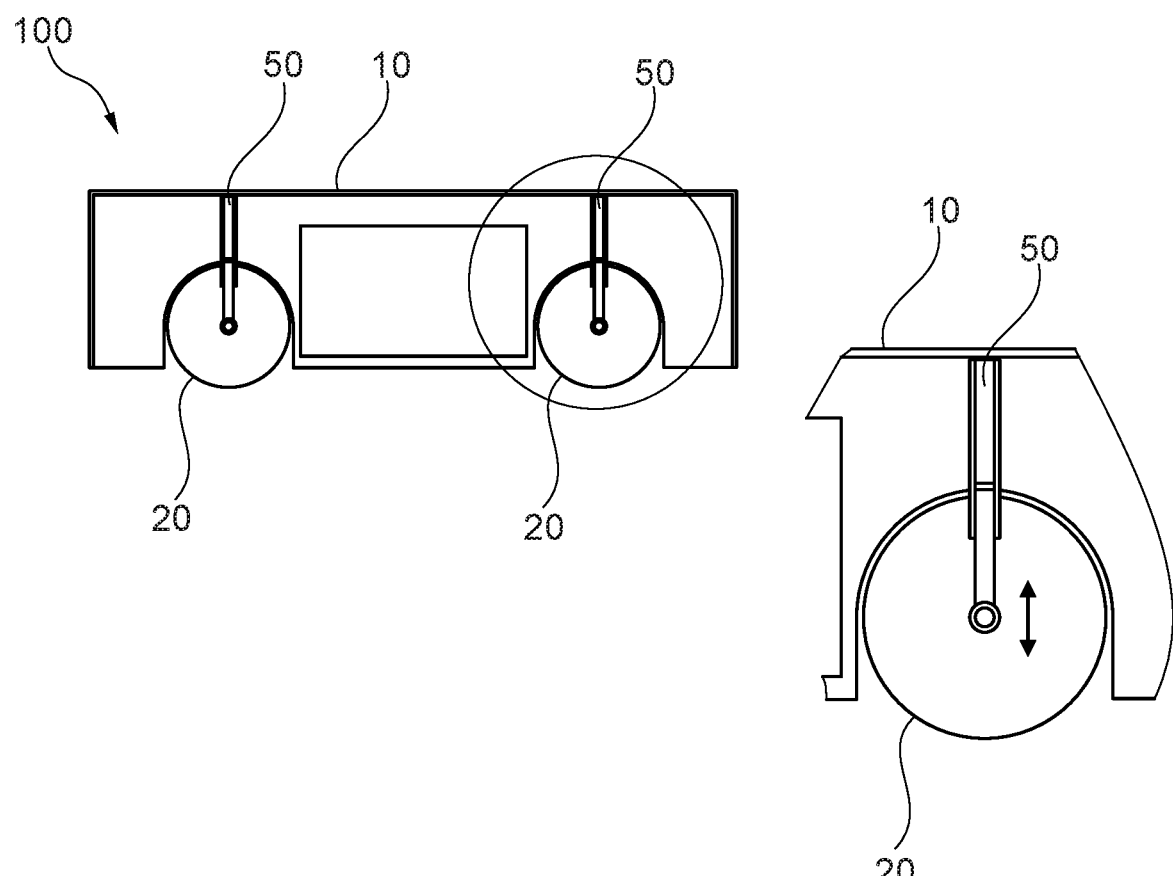
FIG. 17a schematically shows an embodiment of the transport device according to the invention with height adjustment of the transport device according to the invention by means of lifting cylinders.
Figure 17B:
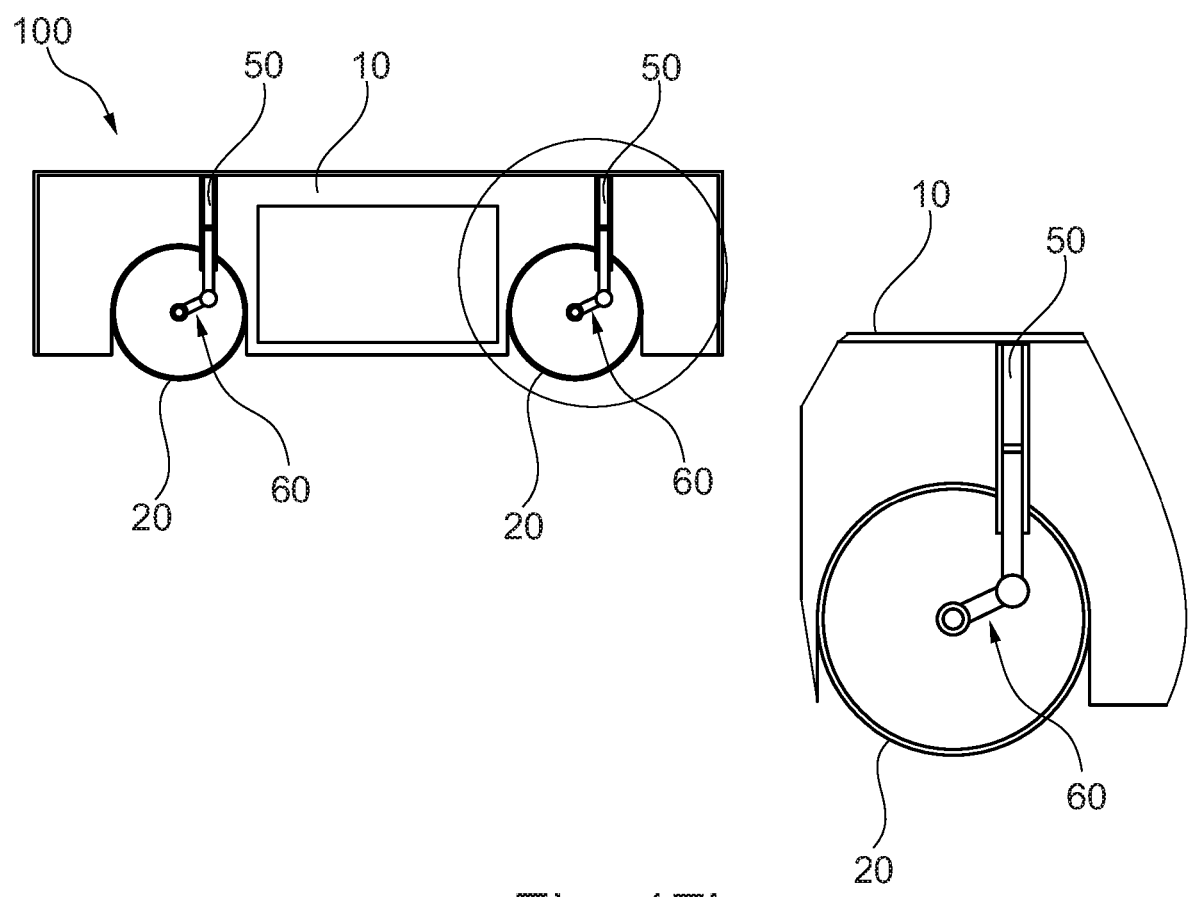
FIG. 17b schematically shows a further embodiment of the transport device according to the invention with height adjustment of the transport device according to the invention by means of lifting cylinders and a suspension.

Then, the transport device 100 rises (for example by a mechanism as shown in FIGS. 17a and 17b) such that the bolts 48 thread into the recesses 44, the transport device 100 being raised further until the pallet holder 350 rests completely in the recesses 44 or on the upper side thereof.

The transport device 100 then rises further until the pallet holder 350 is lifted out of its receptacle (not shown here) and is thus completely supported by the transport device 100.

After that, the pallet holder 350 may now be centered (and therewith also fixed) on the receiving device 40. In this case, for example, the drive 47 may become active for displacing the recesses 44, which are slidably mounted, for example, on a sliding or ball guide, in the direction of the centering device 46.

The drive displaces the pallet holder 350 previously floatingly mounted on the receiving device 40 (or in and/or on the recesses 44) in the direction of the centering device 46 and presses it against the centering device 46 (and possibly also more strongly against the pressure piece 45) such that an alignment of the pallet holder 350 on the centering device 46 is obtained (for example, the centering device 46 includes a prism/two prisms and corresponding pins/bolts of the pallet holder 350 is aligned with said prism(s)).

The drive 47 may have two end positions: On the one hand, when the drive 47 has displaced/moved the recesses as far as possible in the direction of the centering device 46, the pallet holder 350 is fixed and aligned. And on the other hand, when the drive 47 has moved the recesses 44 to the greatest possible distance from the centering device 47, the pallet holder 350 is free and can align itself using other elements (for example using a receptacle on a machine tool, a setup station, a magazine station or the like). In this state, the pallet holder 350 may correspondingly be transferred to a receptacle or be received by the receptacle.

Fixing the pallet holder 350 on the receiving device 40 can now be carried out in such a way that, on the one hand, the centering device 46 itself includes a fixing portion into which the pallet holder 350 is threaded and where it is locked.

Or the recesses 44 are moved so far in the direction of the centering device 46 by the drive 47 that at least one bolt 48 of the pallet holder 350 is pressed against the side of one of the recesses 44 facing away from the centering device 46 (see the center image in FIG. 2b). Thereby, the pallet holder 350 is fixed with respect to the receiving device 40.

Furthermore, the pallet holder 350 can be fixed on the receiving device 40 by the pressure piece 45 pressing the pallet holder 350 against the side of one of the recesses 44 facing away from the centering device 46 (see the center image of FIG. 2b).

It should be pointed out here that all of the above-mentioned options for fixing the pallet holder 350 with respect to the receiving device 40 may also take place in combination with one another. In addition, it should be pointed out that the above-mentioned options for fixing are not to be understood as exclusive; other options may also be considered here.

It should also be pointed out that the drive 47 is not absolutely necessary in order to fix or center the pallet holder 350. Rather, further options for centering the pallet holder 350 with respect to the receiving device 40 of the transport device 100 may also be used.

Figure 2C:
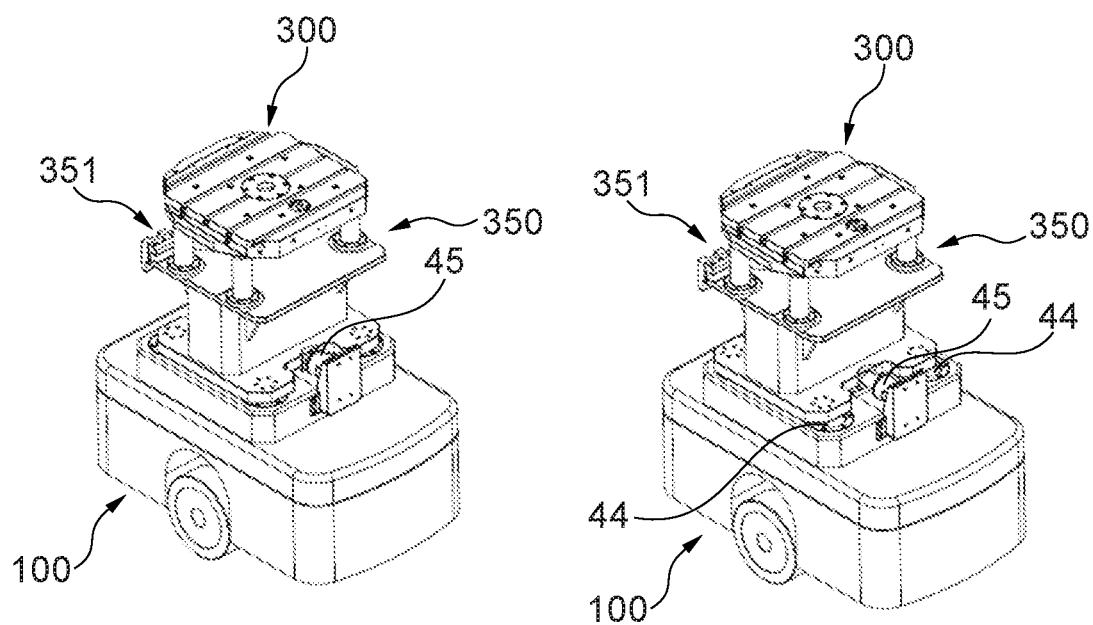
FIG. 2c schematically shows a further embodiment of the receiving device, this time without the drive.

FIG. 2c schematically shows a further embodiment of the receiving device 40, this time without the drive 47.

Here, the receiving device 40 again has at least one recess 44 and a pressure piece 45, wherein the at least one recess 44 cannot be positioned opposite the transport device 100 anymore (as was possible, for example, by means of the drive 47 as described in FIG. 2b).

Instead, only the pressure piece 45 acts as a biasing element which presses the pallet holder 350 against the at least one recess 44 and thereby fixes the pallet holder 350 (and also aligns it to a certain extent) with respect to the receiving device 40 (see right image in FIG. 2c). This relative position of the pallet holder 350 with respect to the receiving device 40 is present when the pallet holder 350 is moved by the transport device 100.

However, if the pallet holder 350 is to be transferred to a receptacle, then, due to the approach of the pallet holder 350 to the receptacle, the pallet holder 350 is (mechanically) aligned with the receiving receptacle by means of the alignment elements 351, compressing the pressure piece 45 at the same time (see left Image of FIG. 2c).

Figure 2D:
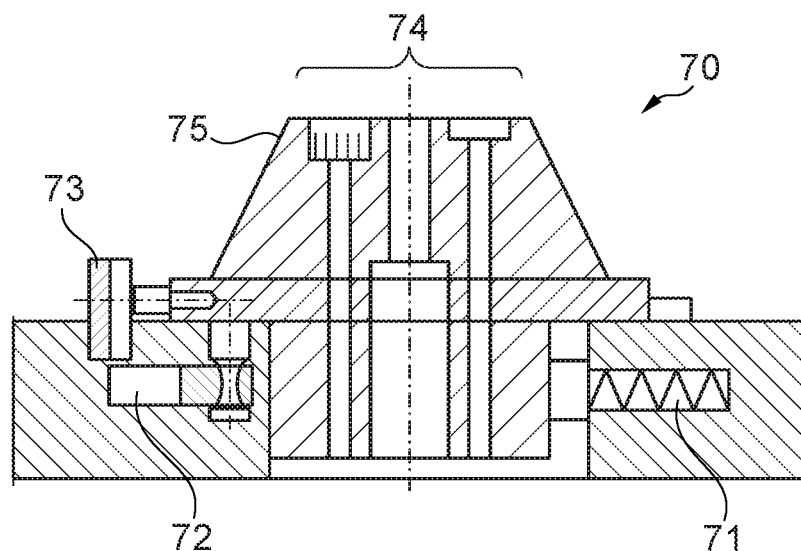
FIG. 2d schematically shows a connector which can transmit media, energy and signals from the receiving device to the received device.

FIG. 2d schematically shows a connector 70 able to transmit media, energy and signals from the receiving device 40 to the received device (e.g., handling device, pallet holder 350 or any other device), automatically establishing the corresponding connections between the receiving device 40 and the received device.

The specialty of the connector 70 is that it is configured in such a way that it can also compensate for any positioning inaccuracies of the transport device 100.

For this purpose, the connector 70 also has a (spring-loaded) pressure piece 71 biasing the floating connector body 75 towards a connector fixation 72, wherein also a mechanical stop 73 against which the connector body 75 is biased may be present. This mechanical stop 73 may, for example, be configured as a prism that additionally allows for the alignment of the connector body 75.

When the transport device 100 is moved under the device and lifted in order to receive the device, the connector 70 can, due to the floating mounting and the conical shape of the connector body 75, be inserted into the correspondingly formed (conical) recess of the pallet holder 350 (or another device) and be aligned such that the connection interfaces 74 of the connector 70 can establish a connection with the corresponding counterparts on the pallet holder 350. Conversely, the connection of the connector 70 (with the connection interfaces 74) can of course be severed from the pallet holder 350 again by lowering the receiving device 40 with respect to the received device.

Figure 3:
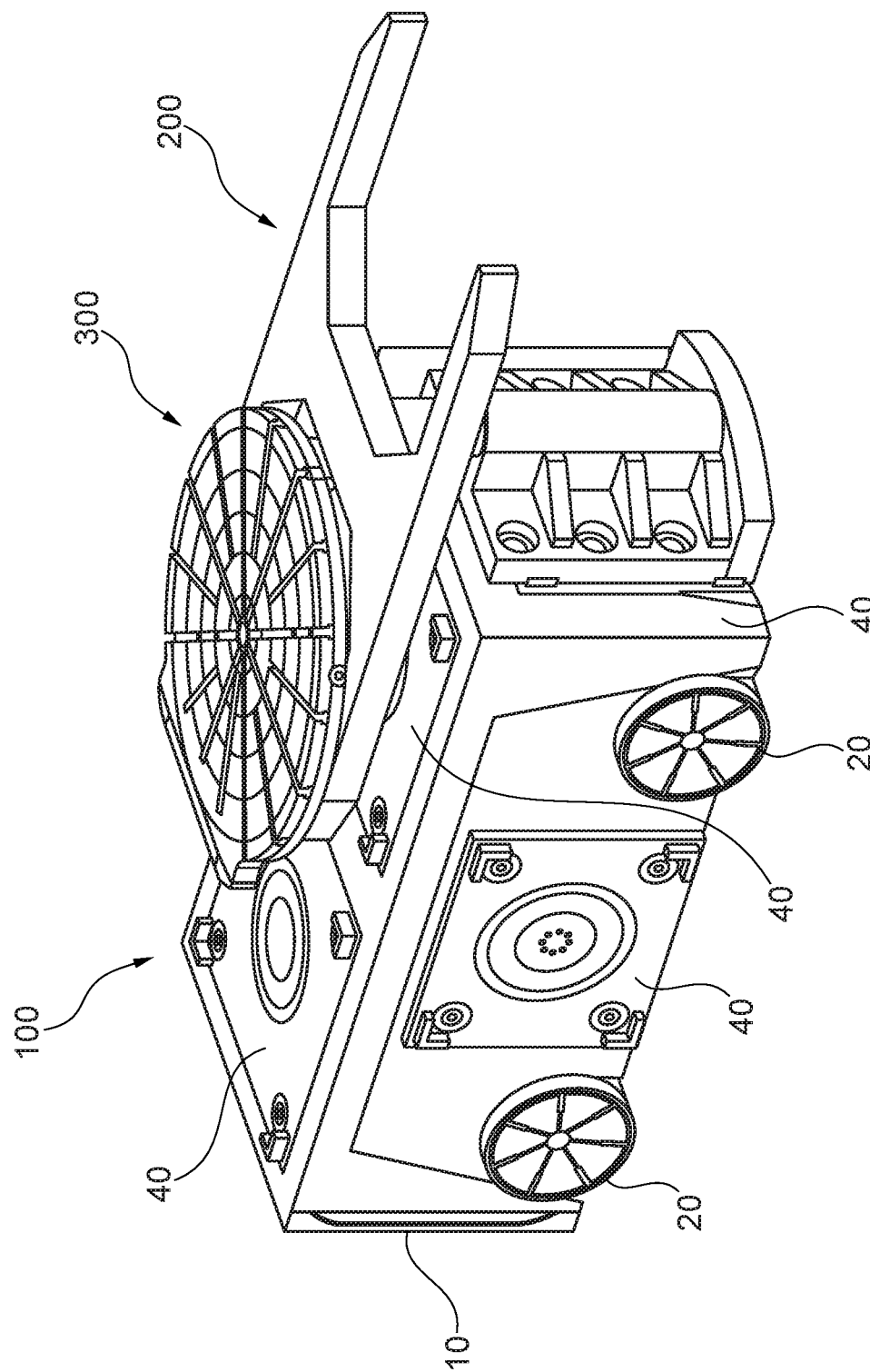
FIG. 3 schematically shows an embodiment of the transport device according to the invention, exemplary with a pallet changer and a pallet.

FIG. 3 schematically shows an embodiment of the transport device 100 according to the invention, as an example with a pallet changer 200 and a pallet 300.

In addition to the already described elements of the chassis 10, the wheels 20 and the receiving devices 40, a pallet changer 200 as a handling device in a double fork design (H-shaped fork; see also FIG. 5) and a pallet 300 are shown as an example.

Here, the handling device (pallet changer 200) on the front side of the transport device 100 was received by one of the receiving devices 40 and mechanically fixed accordingly and connections for energy and signal transmission for controlling and driving the pallet changer 200 were established.

The transport device 100 according to the invention can now move to a corresponding machine tool 1000 (not shown here) using the received pallet changer 200 as a handling device and insert the carried pallet 300 into the machine tool 1000 or exchange it with the pallet 300 already present in the machine tool 1000.

In contrast to transport vehicles with only one fork, a particular advantage of the coupled pallet changer 200, in particular in the case of a plurality of pallet changers 200 being received by the transport device 100, is that necessary displacement motions when exchanging pallets are avoided or reduced.

The pallet changer 200 preferably has corresponding receiving elements for the receiving devices 40 of the transport device 100 including mechanical fixation, positioning, signal transmission and energy transmission. Furthermore, the pallet changer 200 should be configured to match the machine tools to be automated.

The pallet changer 200 preferably includes n+1 receptacles (receiving claw or a fork-shaped receptacle, preferably for different pallet sizes) for pallets 300, the pallet changer 200 also being equipped with a rotary axis allowing for the pallets 300 to be exchanged by a rotary movement.

The pallet changer 200 preferably has a further axis in order to move the pallets 300 out of their clamping position in the machine tool 1000. Usually this is a lifting axis.

A fork-shaped receptacle could also be adjustable in terms of its dimensions in order to be able to receive several variants and sizes of pallets 300. Furthermore, the receiving claw could also be adaptable to the size of the pallet.

Figure 4A:
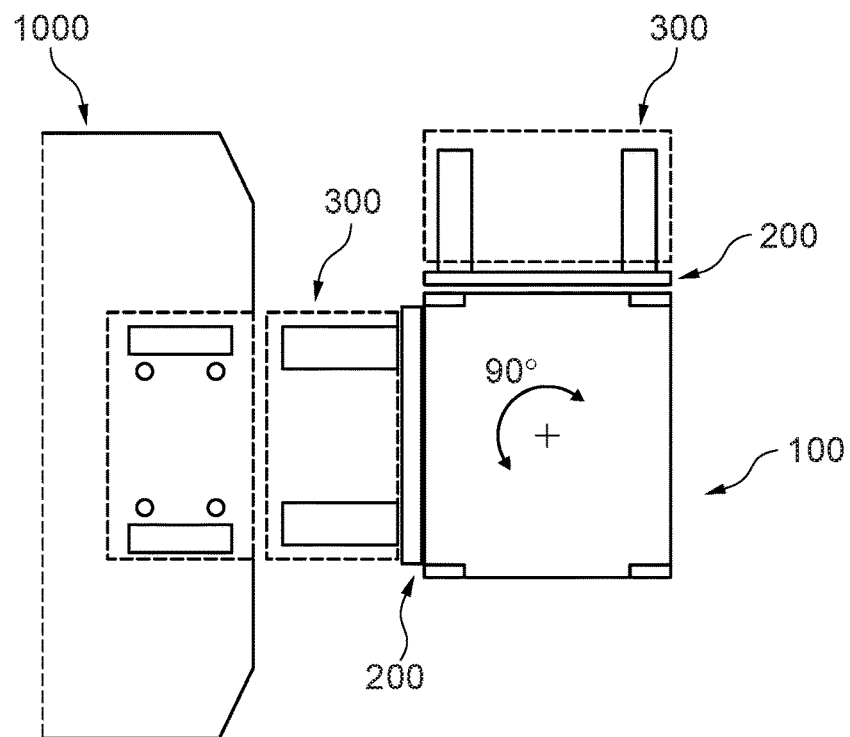
FIG. 4a schematically shows an embodiment of the transport device according to the invention during a pallet change, the transport device carrying out a rotation.

FIG. 4a schematically shows an embodiment of the transport device 100 according to the invention during a pallet change by means of two fork-shaped pallet changers 200, the transport device 100 executing a rotation (in the shown example by 90°, other angles, in particular 180°, also being possible) in order to perform the exchange of the pallets 300.

Here, the transport device 100 moves up to a work space of the machine tool 1000 and positions itself in front of the work space in such a way that the pallet 300 already present in the work space can be received by the empty fork-shaped pallet changer 200 (e.g. by means of a pivoting movement of the transport device 100 or a telescopic mechanism for lifting the pallet 300 received at the transport device 100, or by simply moving the transport device 100). The transport device 100 then rotates by 90° such that the second pallet changer 200 can insert the carried pallet 300 into the work space of the machine tool 1000.

Figure 4B:
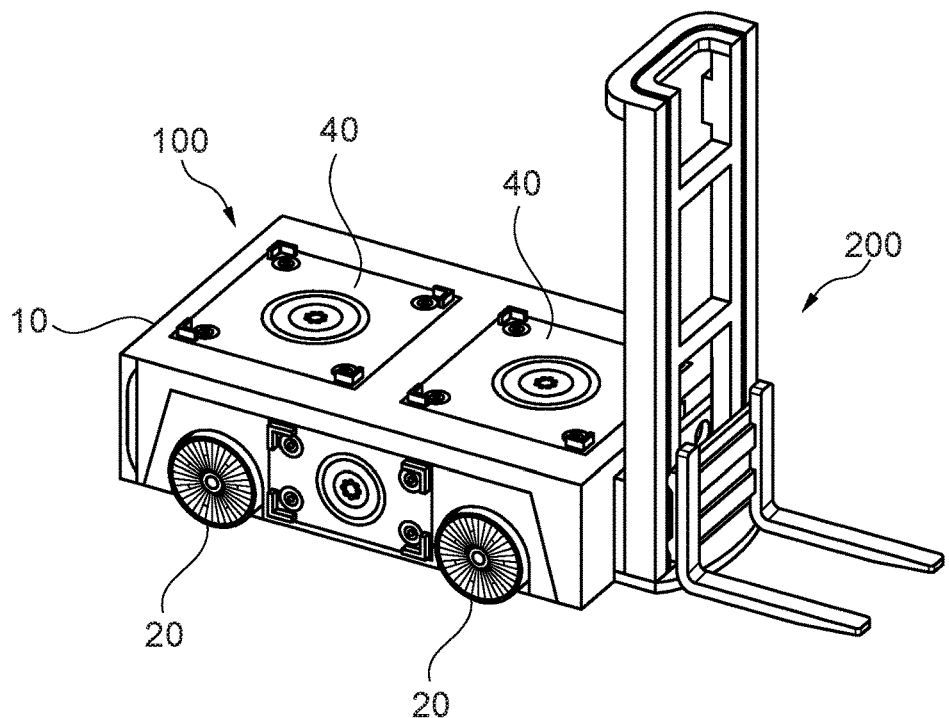
FIG. 4b schematically shows the transport device according to the invention with an embodiment of a fork-shaped pallet changer.

FIG. 4b schematically shows the transport device 100 according to the invention with an embodiment of a fork-shaped pallet changer 200.

In particular, the fork-shaped pallet changer 200 may be configured as a lifting fork, as is known, for example, from forklifts. A lifting mechanism correspondingly provided on the fork-shaped pallet changer 200 may adjust the height of the lifting fork and thus significantly increase the possible usage options of the fork-shaped pallet changer 200. However, the lifting mechanism does not necessarily have to be provided on the fork-shaped pallet changer 200.

FIG. 5 schematically shows an embodiment of the transport device 100 according to the invention during a pallet change, the transport device 100 remaining in its position and the pallet changer 200, an H-shaped pallet changer 200 as shown in FIG. 3, rotating.

As already described in conjunction with FIG. 4a, the transport device 100 moves up to the work space of the machine tool 1000 and positions itself in front of the work space such that the pallet 300 already present in the work space can be received by a free fork of the double-forked (or H-shaped) pallet changer 200.

Then the pallet changer 200 is subsequently rotated on the transport device 100 such that the pallet 300 carried along on the other fork can be inserted into the work space of the machine tool 1000.

Figure 6:
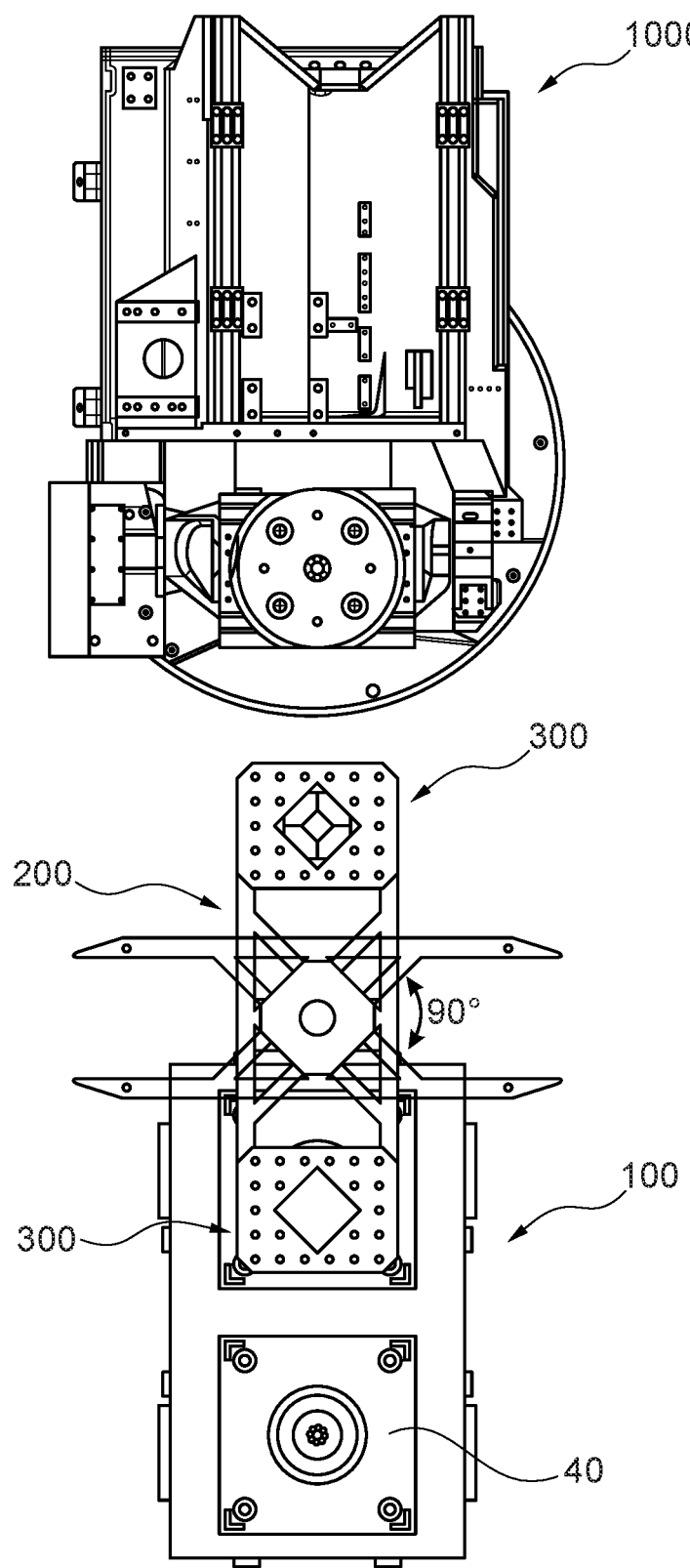
FIG. 6 schematically shows an embodiment of the transport device according to the invention during a pallet change, the pallet changer being configured as double H and being able to rotate as shown.

FIG. 6 schematically shows an embodiment of the transport device 100 according to the invention during a pallet change, the pallet changer 200 being configured as double H and being able to rotate as shown. Essentially the same sequence as described in FIG. 5 is carried out.

Figure 7:
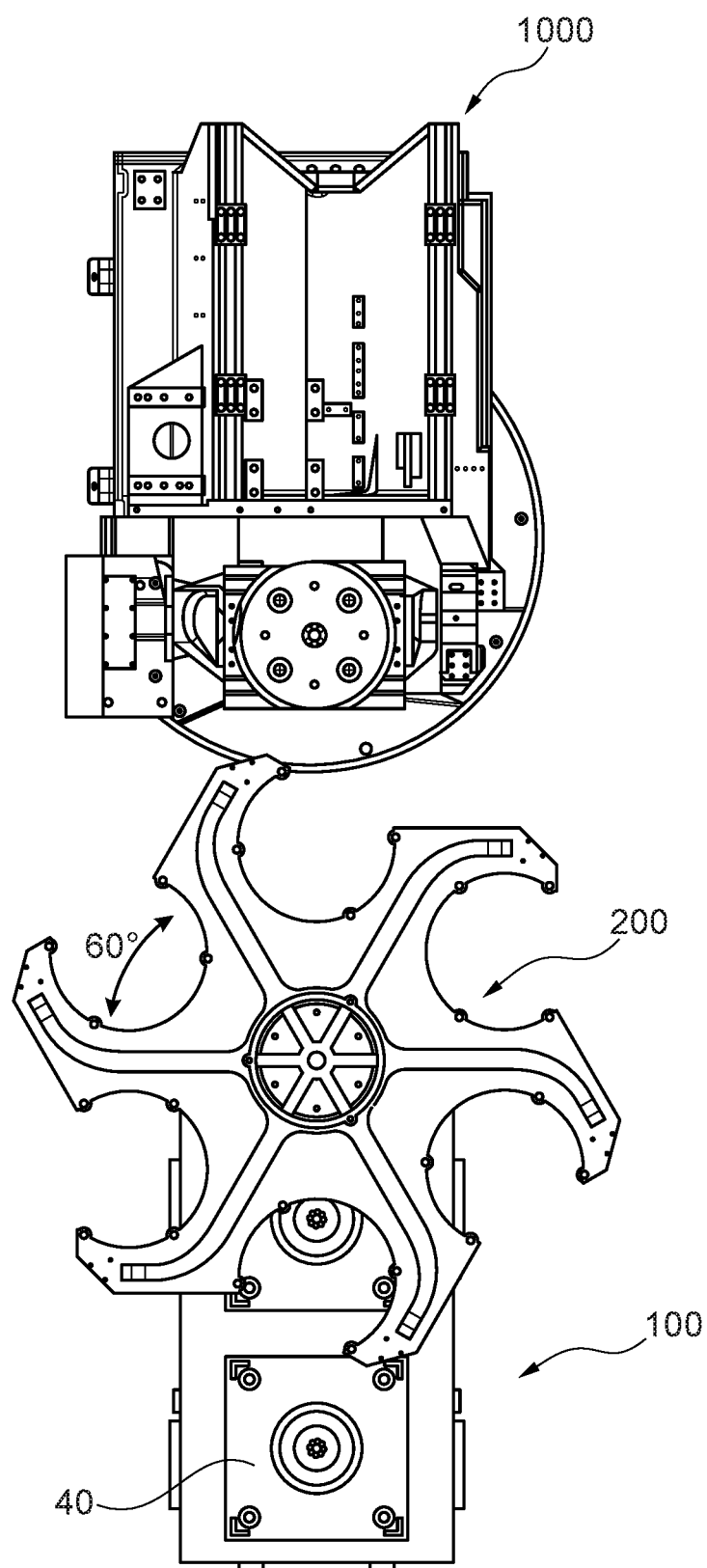
FIG. 7 schematically shows an embodiment of the transport device according to the invention during a pallet change, the pallet changer being able to receive the pallets with a 60° partition.

FIG. 7 schematically shows an embodiment of the transport device 100 according to the invention during a pallet change, the pallet changer 200 now being able to receive pallets 300 with a 60° partition and to rotate as shown. Essentially the same sequence is carried out as described in FIG. 5.

The pallet changers 200 of FIGS. 6 and 7 have the advantage that they can carry significantly more pallets 300 and thus a plurality of machine tools 1000 can be supplied with pallets 300 without the transport device 100 immediately having to return to a setup station or the like to get another pallet 300. This allows for enormous time and energy savings.

FIG. 8 schematically shows an embodiment of the transport device 100 according to the invention (as well as the chassis 10 and wheels 20) with a displaceable pallet changer 200.

Furthermore, it may be advantageous when, in addition to the possibility of rotating the pallet changer 200, there is the possibility of moving the pallet changer 200 relative to the transport device 100 such that, for example, the axis of rotation of the pallet changer 200 can be freely positioned with respect to the transport device 100.

It may additionally be advantageous when the displacement of the pallet changer 200 is not only possible in one direction as shown in FIG. 8, but at least in one further direction extending perpendicularly thereto, in order to position the pallet changer 200 with respect to the transport device 100 and/or the machine tool 1000 even more freely.

Figure 9A:
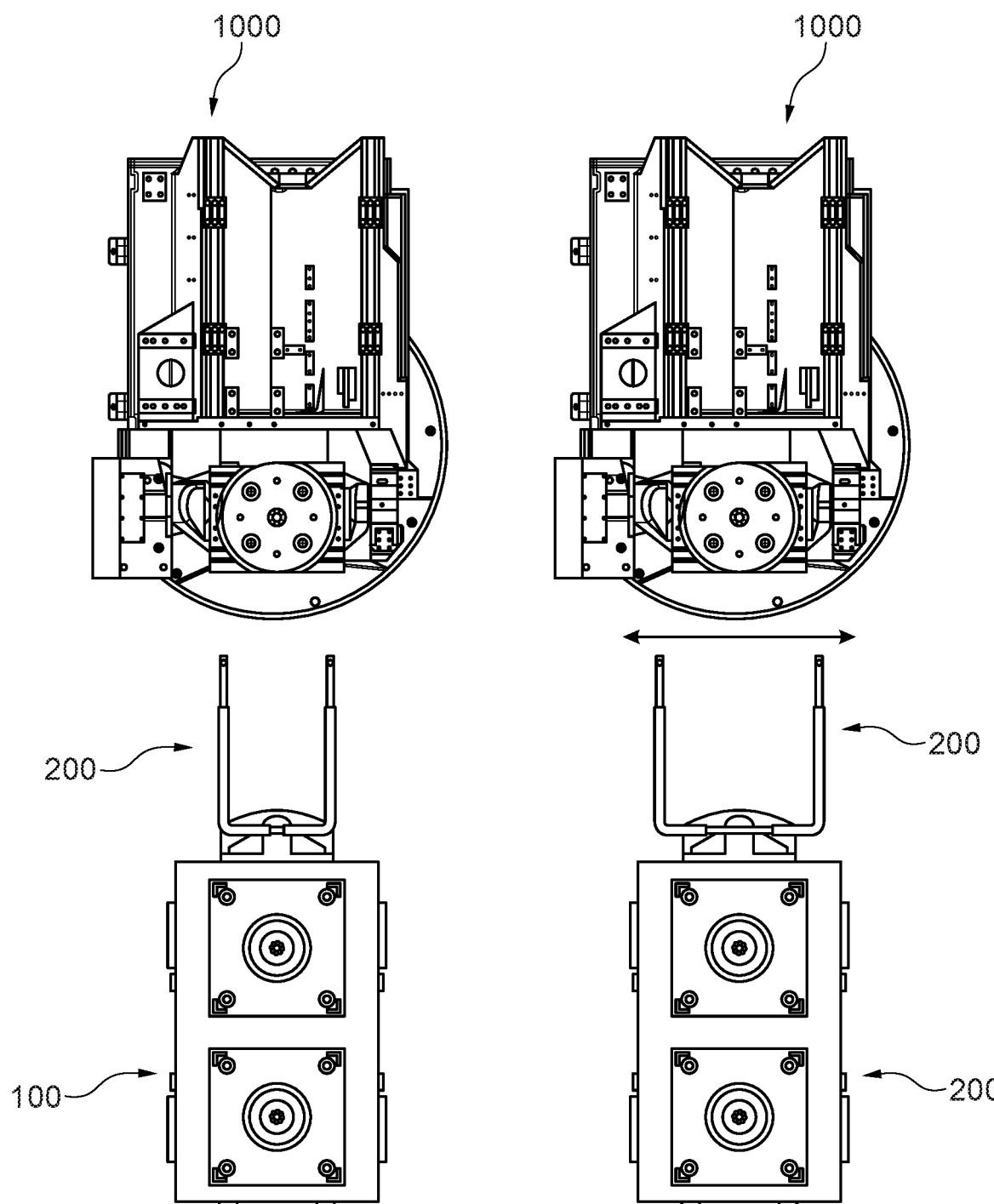
FIG. 9a schematically shows an embodiment of the transport device according to the invention including a pallet changer with an adjustable fork width.

FIG. 9a schematically shows an embodiment of the transport device 100 according to the invention including a pallet changer 200 with an adjustable fork width.

In this way, the pallet changer 200 can now be adapted to the different sizes of the pallet 300 to be transported to the machine tool 1000 by the transport device 100. This further increases the flexibility and the range of applications of a single pallet changer 200.

Figure 9B:
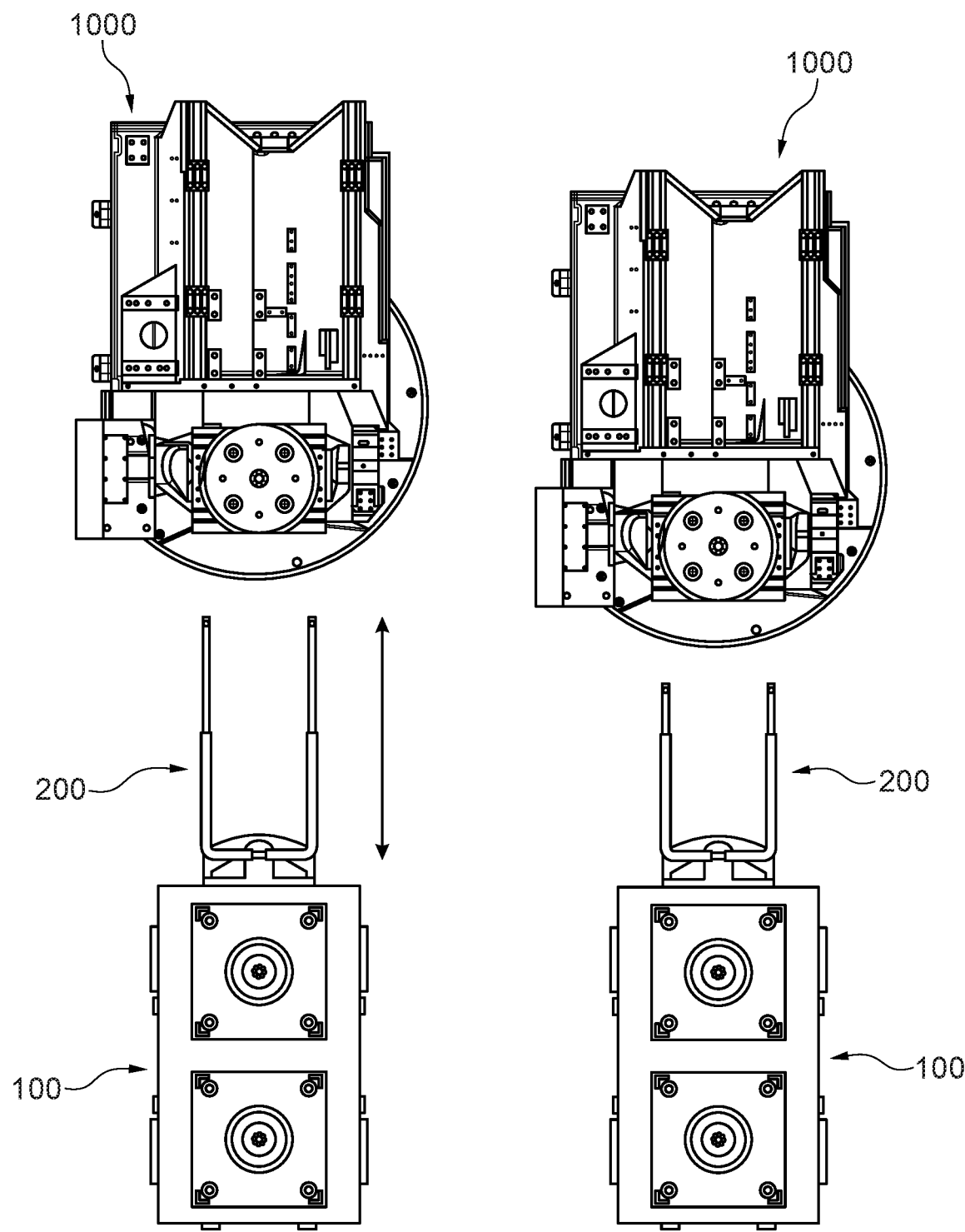
FIG. 9b schematically shows an embodiment of the transport device according to the invention including a pallet changer with an adjustable fork length.

Moreover, as shown in FIG. 9b, the length of the pallet changer 200 can be adjusted in order to adapt it to the different sizes of the pallet 300 also. This further increases the flexibility and the range of applications of a single pallet changer 200.

Furthermore, for example, a variable length of the pallet changer 200 may also be used to place a pallet 300 further into the machine tool 1000. This may be advantageous in the case of certain types of designs of machine tools 1000 or if, for example, the transport device 100 cannot move to a point immediately in front of the pallet receptacle of the machine tool 1000.

Figure 10:
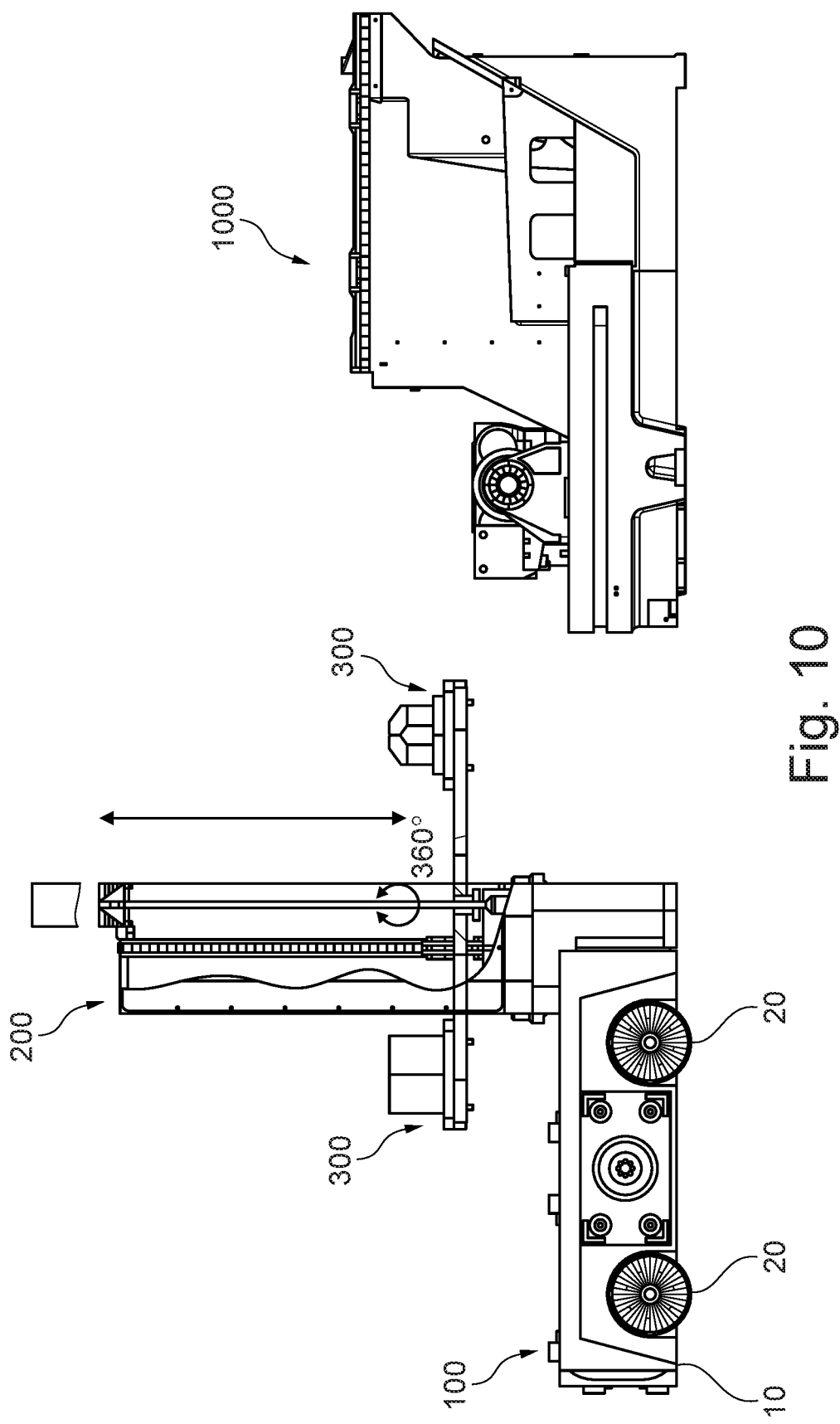
FIG. 10 schematically shows an embodiment of the transport device according to the invention with a pallet changer for a multi-level pallet depository.

FIG. 10 schematically shows an embodiment of the transport device 100 according to the invention (as well as chassis 10 and wheels 20) with a pallet changer 200 for a multi-level pallet depository.

By means of the receiving devices 40, it is also possible to receive a multi-level pallet changer 200 on the transport device 100 and thus to operate multi-level pallet depositories.

For this purpose, a lifting-rotating unit with receptacles for n+1 pallets 300 is preferably provided, with the lifting axis of the pallet changer 200 being usable for the arrangement of n+1 pallets 300 above one other. As a result, a higher packing density of the pallets 300 is obtained compared to a merely planar arrangement of pallets 300.

Figure 11:
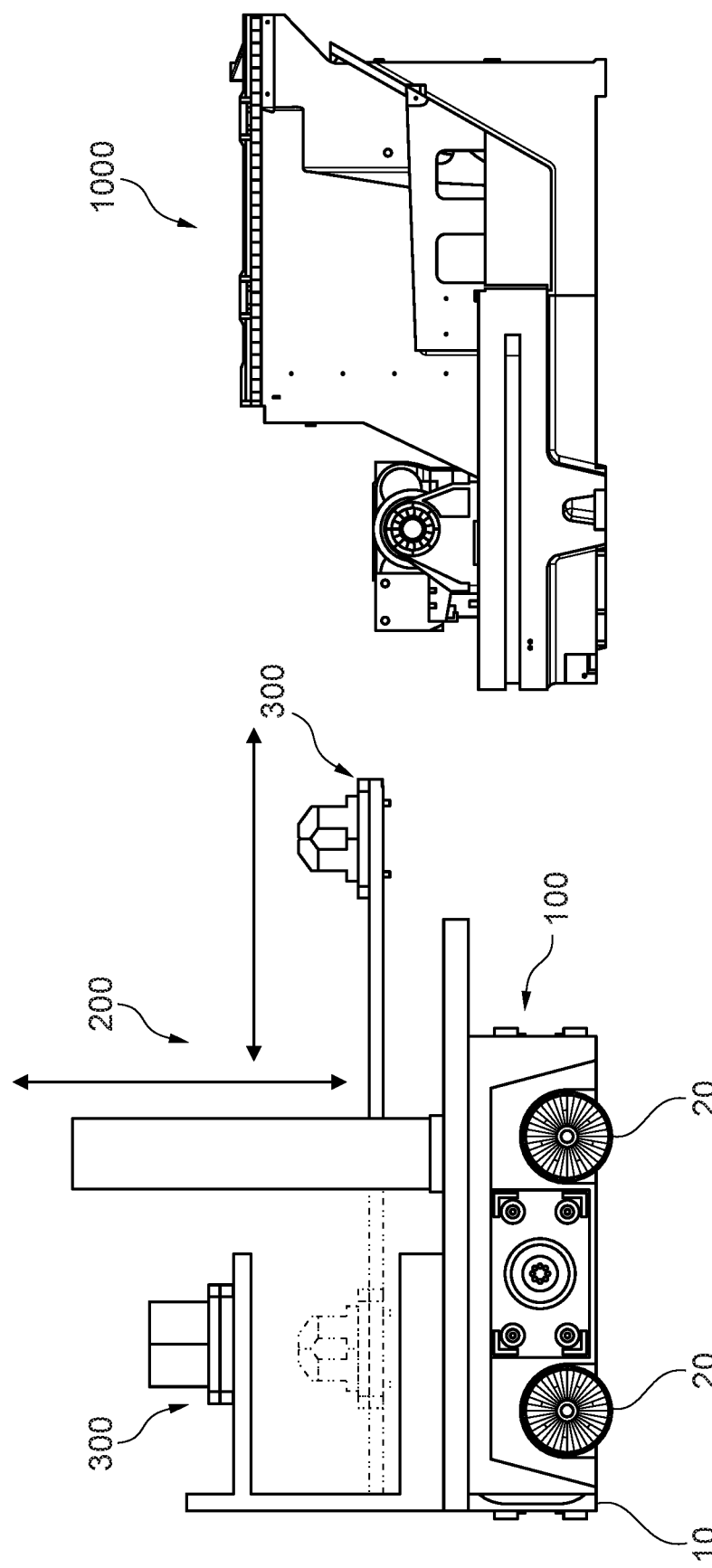
FIG. 11 schematically shows a further embodiment of the transport device according to the invention with a pallet changer for a multi-level pallet depository.

FIG. 11 schematically shows a further embodiment of the transport device 100 according to the invention (as well as chassis 10 and wheels 20) with a pallet changer 200 for a multi-level pallet depository.

Here, the transport device 100 also has its own multi-level pallet depository (shown to the left of the pallet changer 200) in order to have additional storage capacities for pallets 300 and thus to transport more pallets 300.

In addition, it may be advantageous to configure the pallet changer 200 such that it can be used by a lifting-sliding unit for the arrangement of n+1 pallets 300 on top of one another and thus also to operate the multi-level pallet depository provided on the transport device 100 optimally.

Figure 12A:
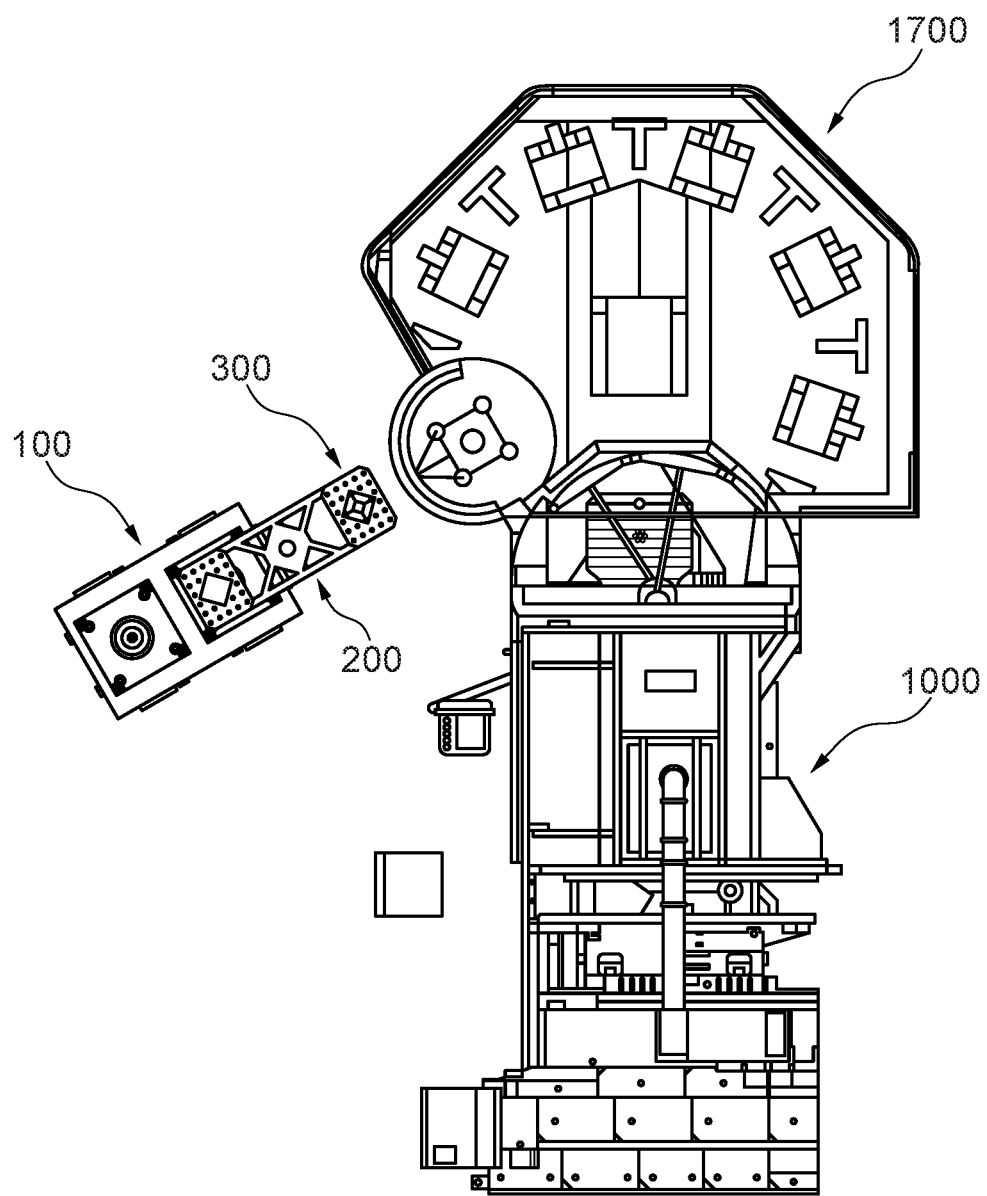
FIG. 12a schematically shows the transport device according to the invention when loading a circular store of a machine tool with pallets.

FIG. 12a schematically shows the transport device 100 according to the invention when loading a circular store 1700 of a machine tool with pallets 300.

This may advantageously show that a transport device 100 equipped with a pallet changer 200 can not only load a machine tool 1000 directly (for example the work space of the machine tool 1000 directly), but can also load various stores (such as a circular store 1700 of the machine tool 1000) with pallets 300.

Figure 12B:
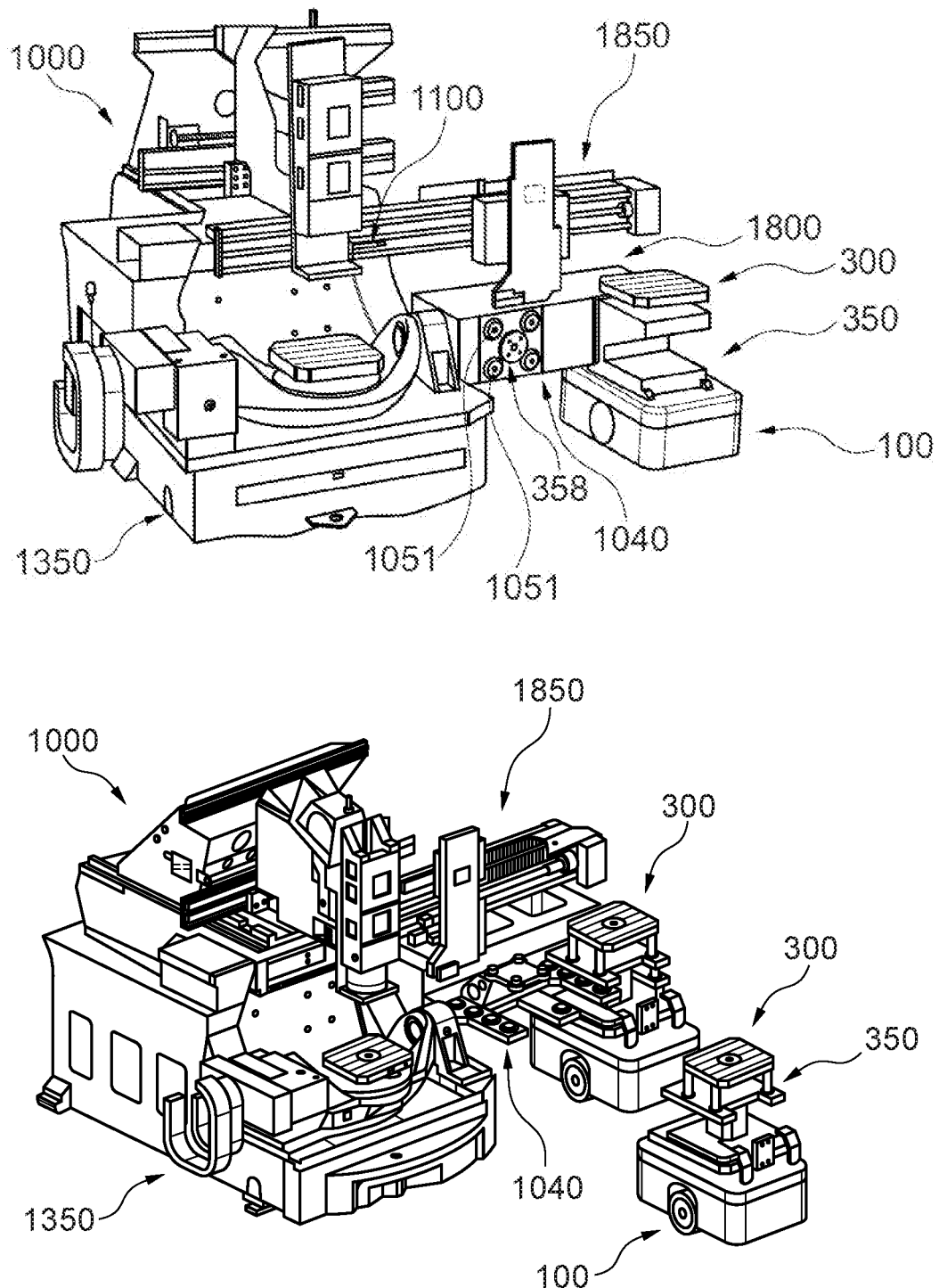
FIG. 12b schematically shows a transport device according to the invention when loading an intermediate storage on which pallets or pallet holders can be provided to a feed device by docking on a receptacle of the intermediate storage.
Figure 16A:
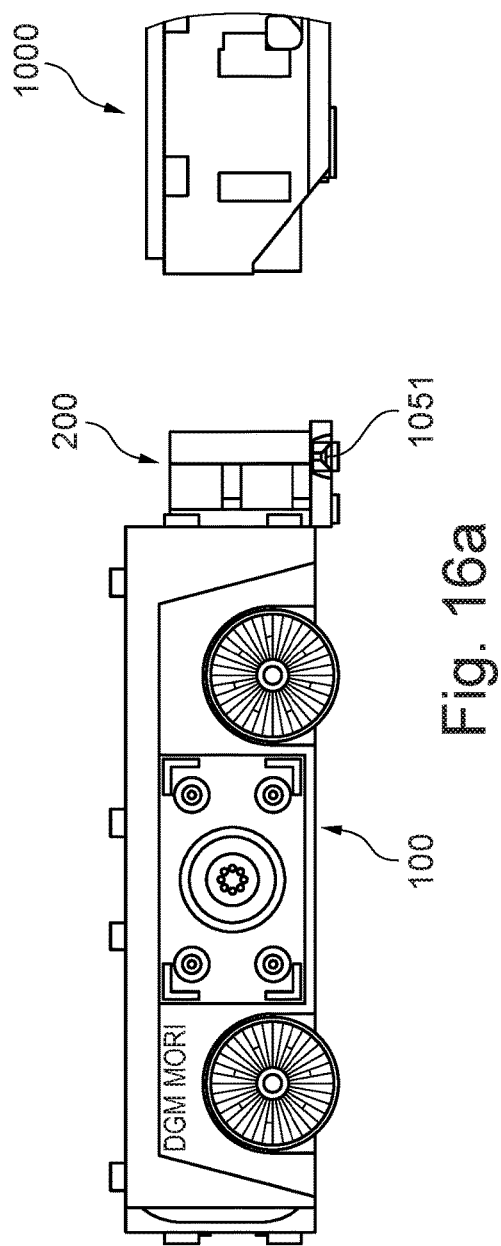
FIG. 16a schematically shows a positioning of the transport device according to the invention on a machine tool by means of conical receptacles.
Figure 16B:
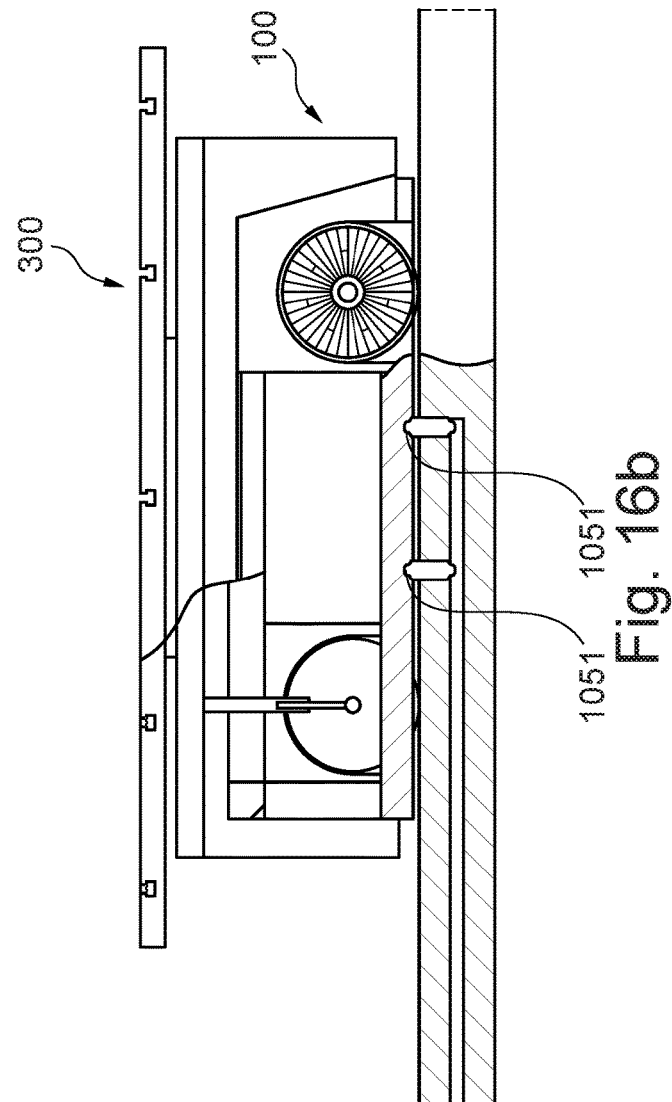
FIG. 16b schematically shows a further embodiment of the transport device according to the invention during positioning and energy and/or signal connection establishment by means of conical receptacles.
Figure 16C:
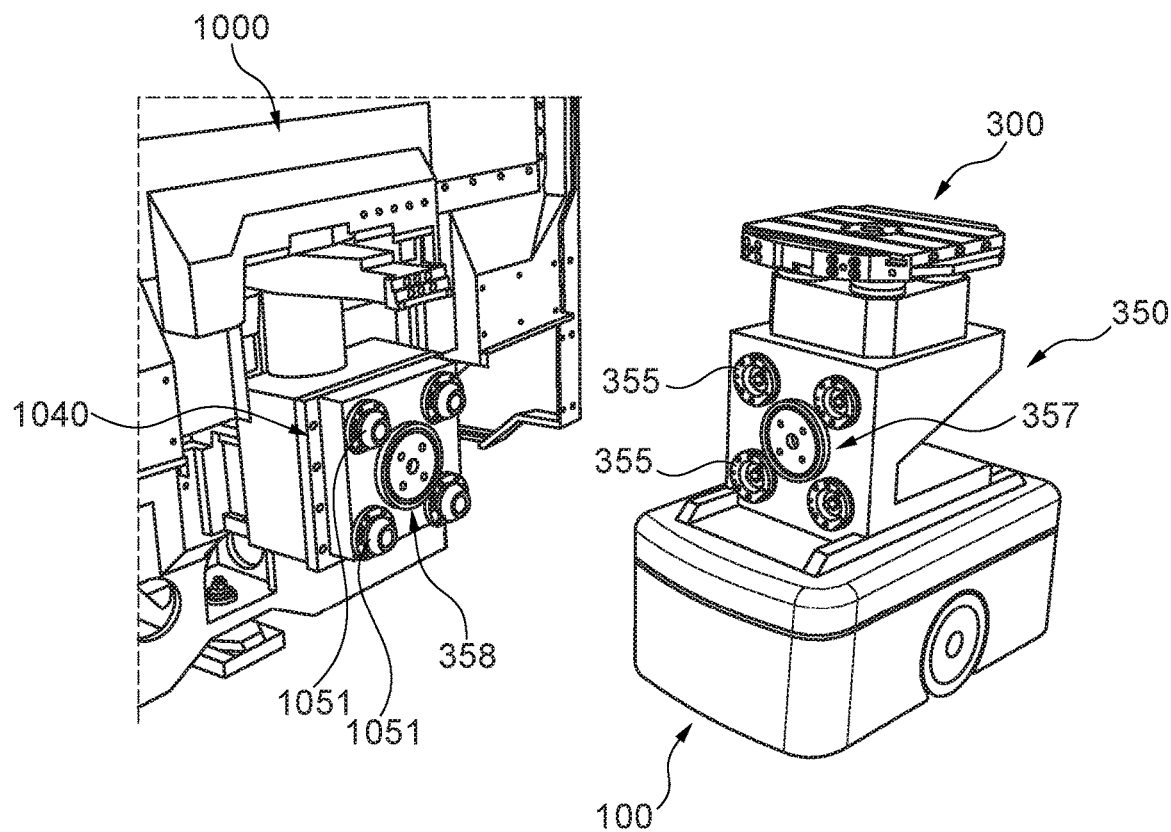
FIG. 16c schematically shows a transport device according to the invention, wherein a pallet holder with a pallet docks to a pallet holder receptacle by means of the transport device.

FIG. 12b shows a transport device 100 according to the invention when loading an intermediate store 1800 at which pallets 300 or pallet holders 350 can be provided to a feed device 1850 (see top image in FIG. 12b) by docking them to a receptacle 1040 (comprising conical receptacles (for example conical receptacles 1051) and an interface 358; see, for example, also FIG. 16c) of the intermediate store 1800. For this purpose, the intermediate store 1800 may advantageously have at least one docking location, but may particularly advantageously provide a plurality of docking locations.

The feed device 1850 can now feed the pallets 300 from the intermediate store 1800 to a pallet receptacle (for example a rotary swivel table or another pallet receptacle) of the machine tool 1000 or exchange a pallet 300 already on the pallet receptacle. This allows for the transport device 100 to not have to remain at the intermediate store 1800, but to be available for other tasks.

Figure 16D:
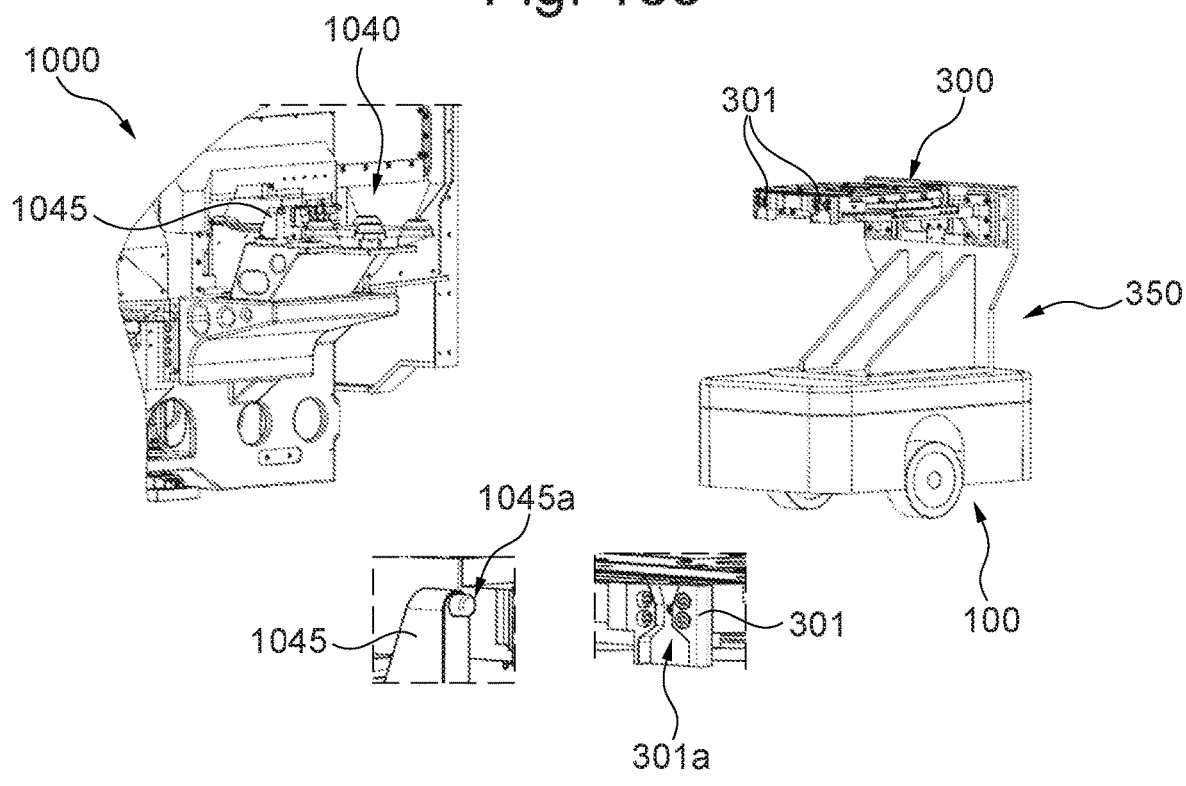
FIG. 16d schematically shows a further embodiment of the transport device according to the invention with a pallet holder.
Figure 16E:
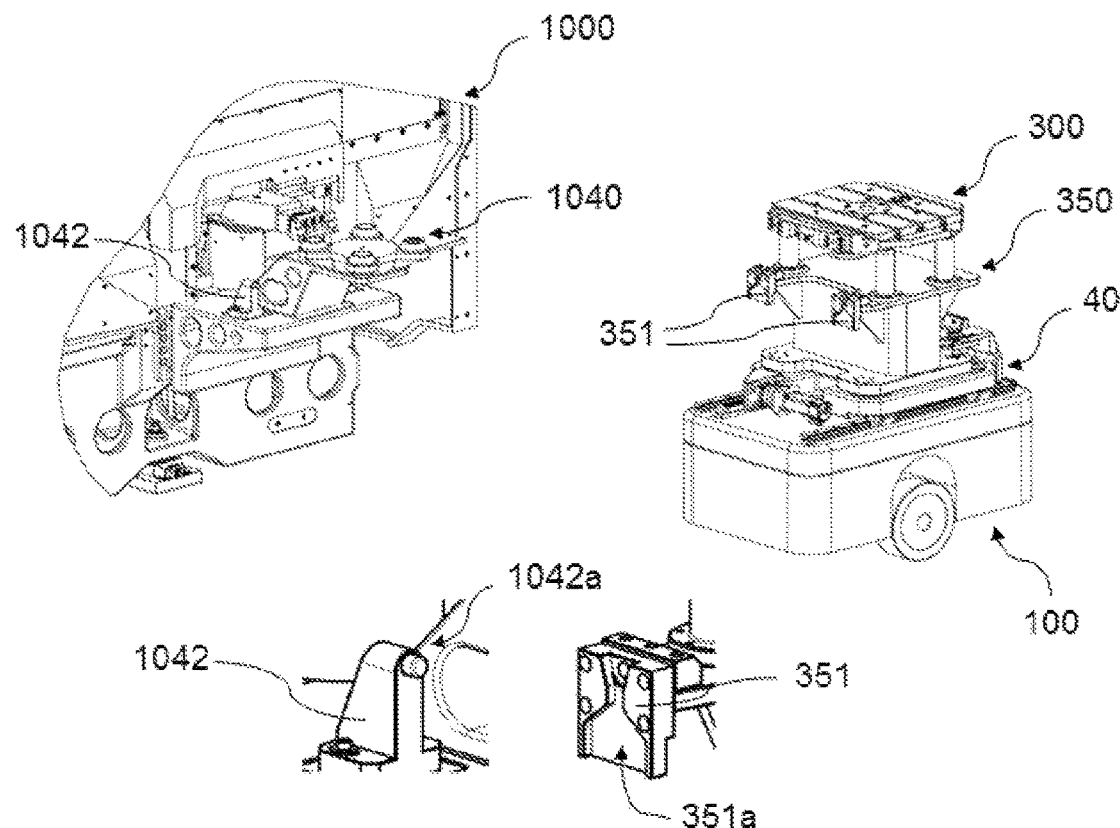
FIG. 16e schematically shows a further embodiment of the transport device according to the invention with a pallet holder.
Figure 16F:
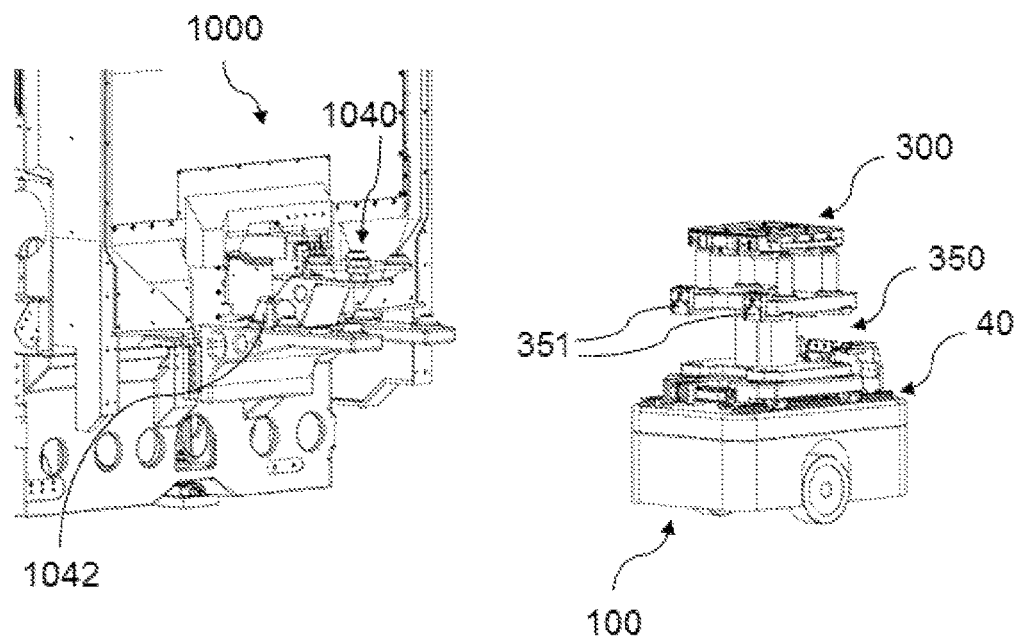
FIG. 16f schematically shows a further embodiment of the transport device according to the invention with a pallet holder, similar to what is already known from FIG. 16e.
Figure 16G:
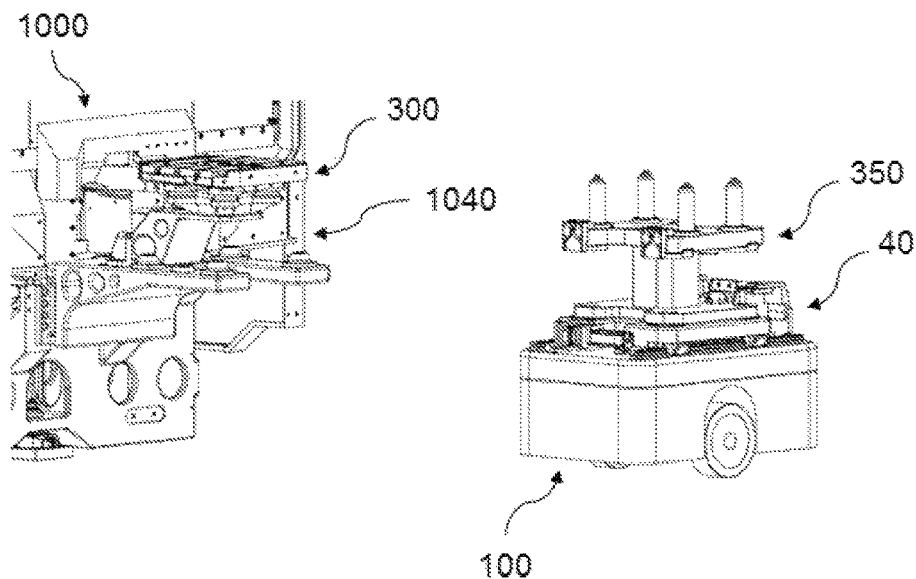
FIG. 16g shows the state of the transport device according to the invention from FIG. 16f when only the pallet was received by the receptacle.
Figure 16H:
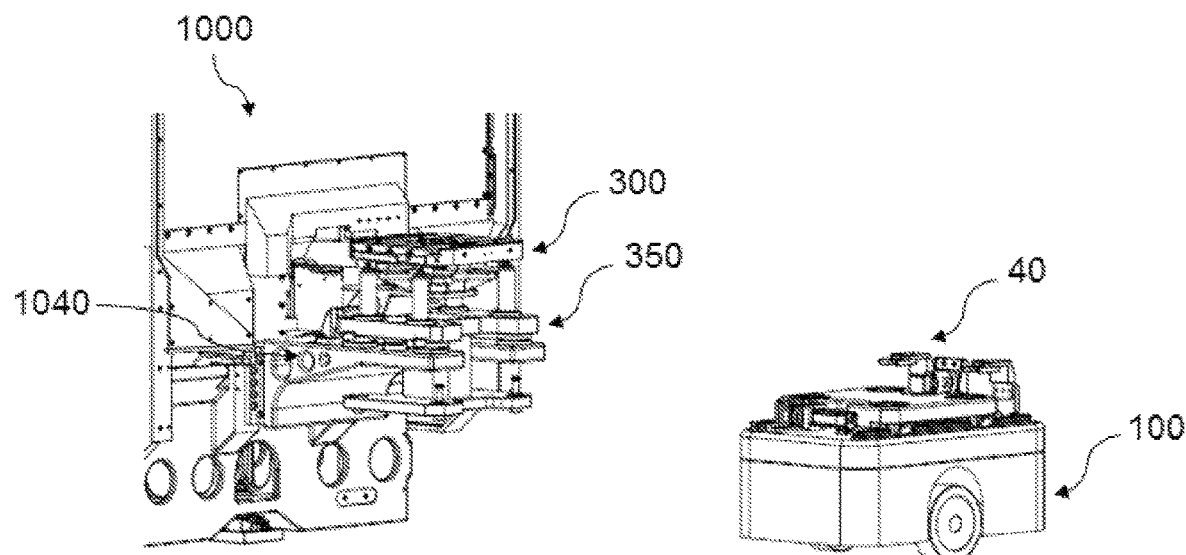
FIG. 16h shows the state of the transport device according to the invention from FIG. 16f when the pallet holder along with the pallet was received by the receptacle.
Figure 16I:
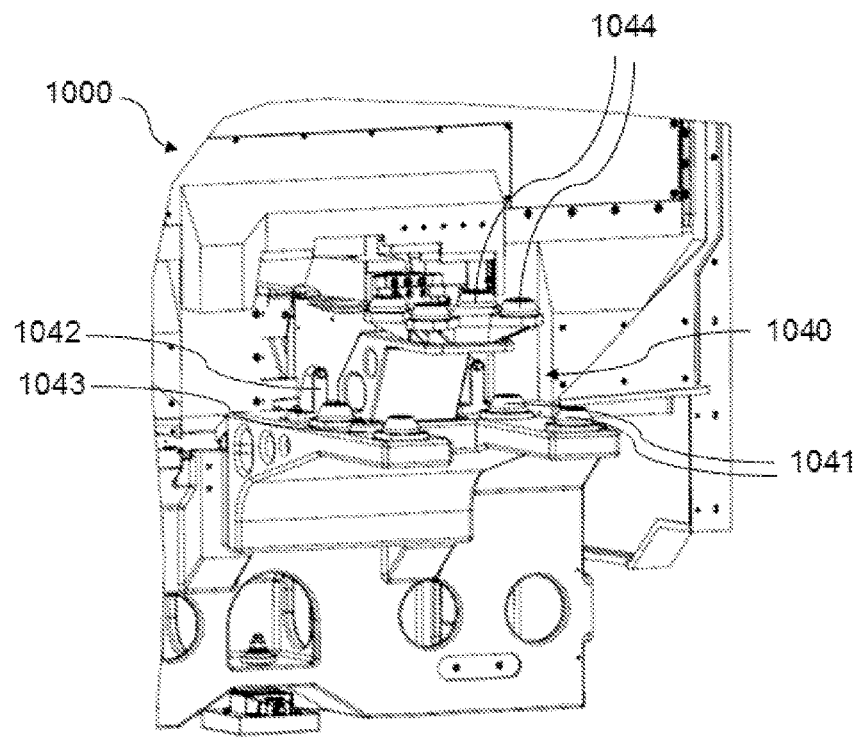
FIG. 16i shows a configuration of a receptacle of a machine tool for receiving a pallet holder and/or pallet.
Figure 16J:
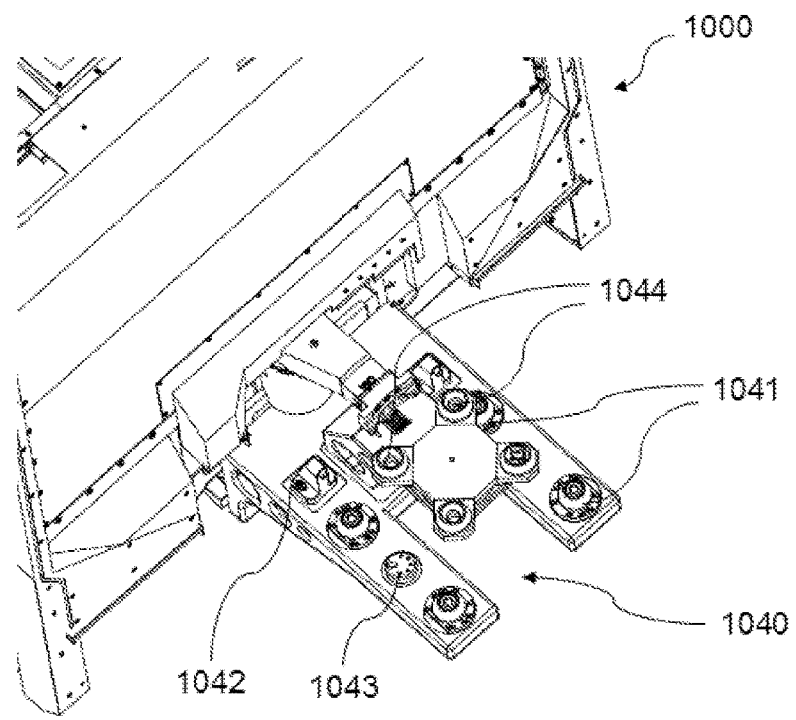
FIG. 16j shows the configuration of the receptacle of a machine tool as shown in FIG. 16i, but from a different perspective for a better overview of the individual components of the receptacle.

In addition to docking to a receptacle 1040 approached via a horizontal movement of the transport device 100, wherein the docking itself is also carried out via a horizontal movement of the pallet holder 350 with respect to the receptacle 1040, the pallet 300/pallet holder 350 may also be positioned above a receptacle 1040 by the transport device 100 and may then be deposited on said receptacle 1040 (see lower image in FIG. 12b), the receptacle 1040 being described in detail in FIGS. 16i and 16j.

For this purpose, the transport device 100 is first pre-positioned on the receptacle 1040, the transport device 100 being raised (for example by a mechanism according to FIG. 17a or 17b).

This is followed by a delivery movement, wherein the pallet 300 or the pallet holder 350 is pushed (for example by means of the alignment elements 351) against a centering device (for example centering device 1042, see FIGS. 16i and 16j) of the machine tool 1000 and an alignment of the pallet holder 350 takes place already at this point, since the pallet holder 350 is, for example, floatingly mounted on the receiving device 40 of the transport device 100.

Now the transport device 100 is lowered, whereby a pre-centering takes place (pallet 300 or the pallet holder 350 align with respect to the receptacle 1040), since, for example, the alignment elements 351 of the pallet holder 350 have a V-shape.

The transport device 100 can now be lowered further until the pallet 300 or the pallet holder 350 is placed on the corresponding pallet cones (for example pallet cones 1044 and/or device cones 1041, see FIGS. 16i and 16j). The cones (pallet cones 1044/device cones 1041) may now have, for example, a docking unit that can lock and secure the received pallet 300 or device (here pallet holder 350) and/or also have media interfaces, similarly as already described in FIG. 2d or as described in FIGS. 16i and 16j.

Then, the transport device 100 may be lowered further until the device/pallet 300 has been received by the receptacle 1040 and the transport device 100 is free. The transport device 100 may then either move away from the machine tool 1000 (or another unit, for example setup station, magazine station, etc.), either with the pallet holder 350 (and without the pallet 300) or completely without the pallet holder 350 and the pallet 300, and take on another/new task.

FIG. 12c schematically shows a transport device 100 according to the invention when loading a pallet changer 200.

The pallet 300 or the pallet holder 350 may be docked to a pallet changer 200 by the transport device 100 by means of the receptacle 1040 already described (see also FIG. 16c) so that the pallet changer 200 can load the machine table with a pallet 300 independently of the transport device 100.

Here too, in addition to docking to a receptacle 1040 via a horizontal displacement movement of the transport device 100 and performing the docking itself via a horizontal movement of the pallet holder 350 with respect to the receptacle 1040, the pallet 300/pallet holder 350 may also be positioned by the transport device 100 via a receptacle 1040 and then be deposited on this receptacle 1040 (see lower image in FIG. 12b), the receptacle 1040 being described in detail in FIGS. 16i and 16j.

In this regard, reference is made to the sequence for docking/receiving a pallet/pallet holder 350 on a receptacle 1040 already described in FIG. 12b. It should also be pointed out here that such concepts of (intermediately) storing pallets 300 are independent of the machine concepts shown (FIG. 12b: machine tool 1000 with machine bed 1350 and vertically arranged work spindle 1100 and rotary swivel table; FIG. 12c: machine tool 1000 with machine bed 1350 and horizontally arranged work spindle 1100 and rotary swivel table) and may therefore also be used on any other machine tool 1000.

Figure 13:
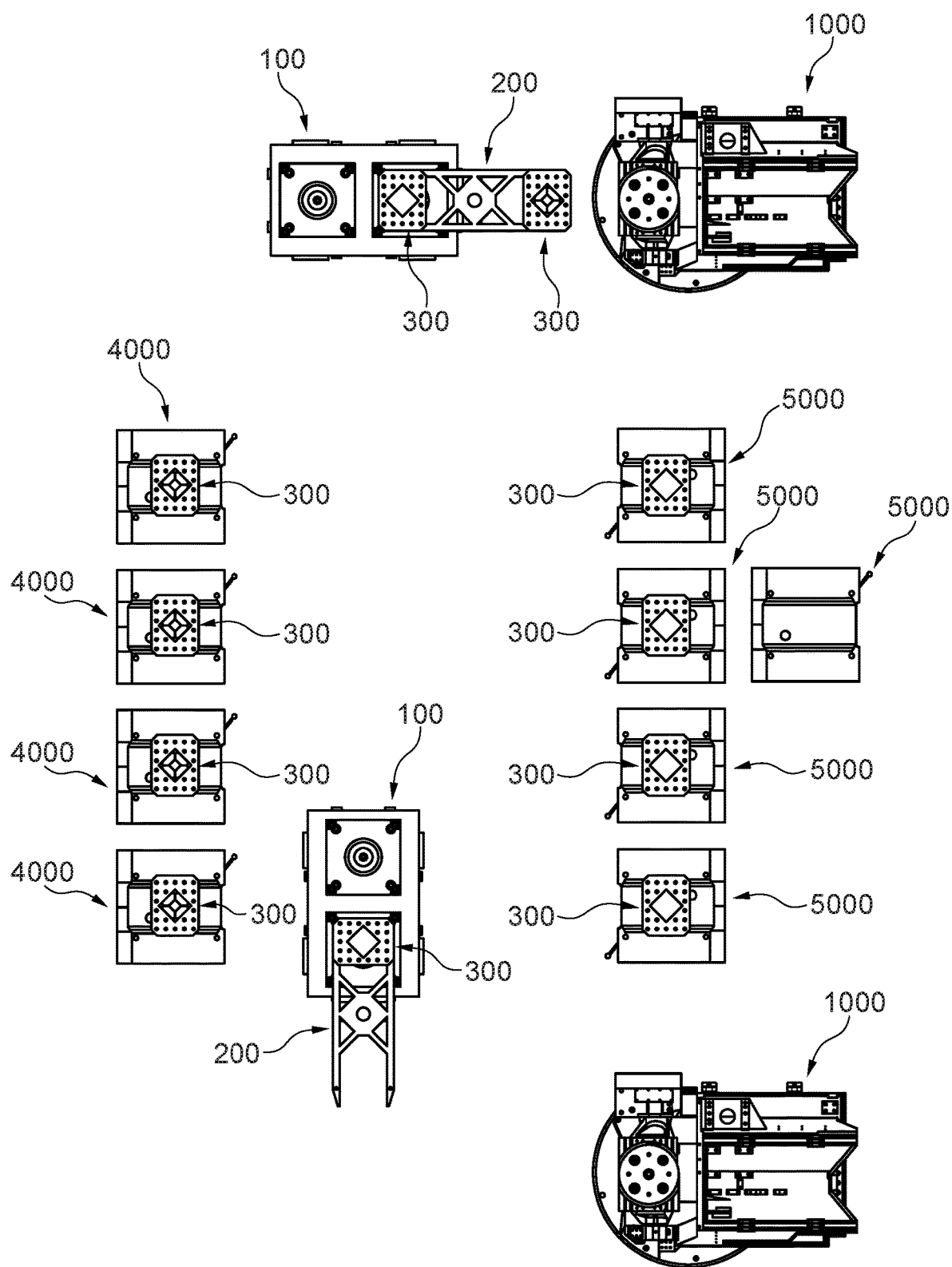
FIG. 13 schematically shows an exemplary embodiment of a linear storage for pallet handling with a plurality of setup stations and storage stations and a plurality of machine tools.

FIG. 13 schematically shows an exemplary embodiment of a linear storage for pallet handling with a plurality of setup stations 4000 and storage stations 5000, which can be served by a plurality of transport devices 100 with corresponding pallet changers 200, wherein correspondingly a plurality of machine tools 1000 can be loaded with pallets 300. Here, for example, both the setup stations 4000 and the storage stations 5000 may be configured as multi-level setup and storage stations.

Each transport device 100 may be loaded with a plurality of pallets 300, as is made possible, for example, by a corresponding pallet changer 200 with a larger capacity (as shown, for example, in FIGS. 5 to 7) or by carrying a pallet depository on the transport device 100 (as shown in FIG. 11). Furthermore, however, a plurality of pallet changers 200 may also be received by the respective transport device 100 in order to be able to transport a plurality of pallets 300 at the same time.

In this way, for example, it can be advantageously achieved that a large number of pallets 300 can be moved with only one transport device 100 to any location within the production facility or within the region to be automated. In addition, the transport devices 100 may also deposit the pallets 300 in front of, next to or behind the respective machine tool 1000 and may also retrieve them again.

In particular, the flexible use and the high degree of automation of the transport devices 100 allow for an unlimited variety of configurations of the linear storage device. Particularly when a plurality of machine tools 1000 of the most varied sizes are linked, the possibility of freely configuring the layout of the linear storage may represent an immense advantage.

Moreover, the transport devices 100 and their monitoring of the environment by means of appropriate sensors means that a casing of the linear storage can be omitted.

Figure 14A:
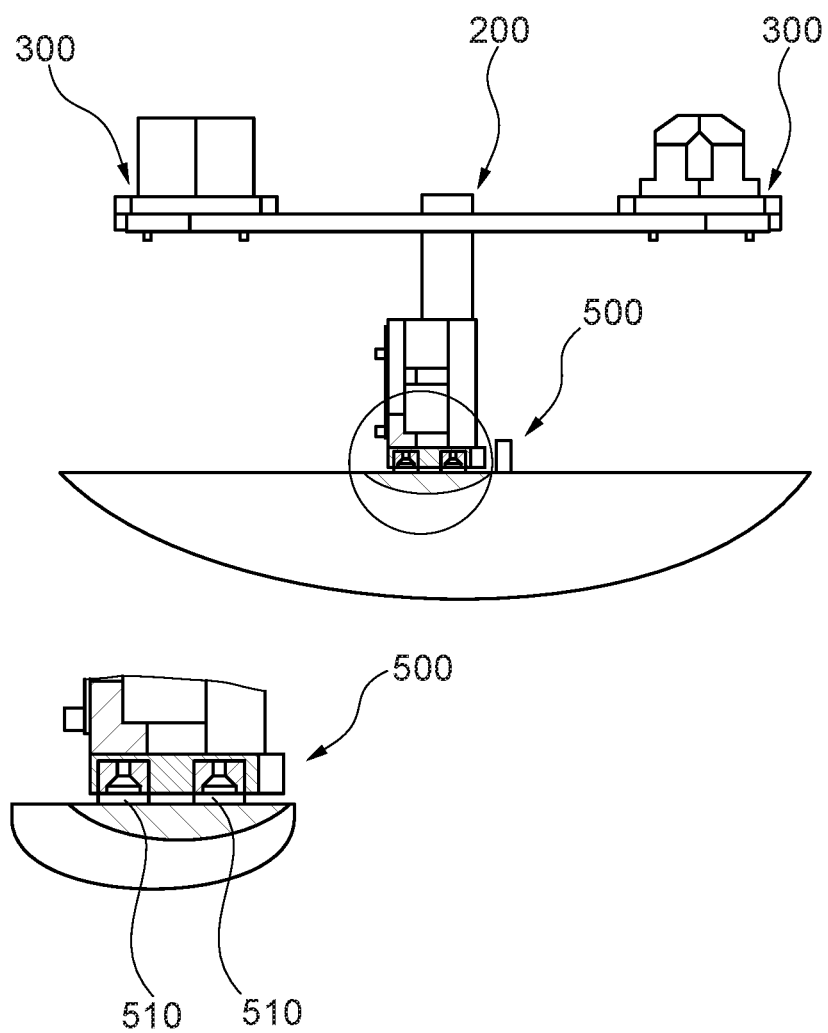
FIG. 14a schematically shows a positioning of a pallet changer at a storage station by means of conical receptacles.
Figure 14B:
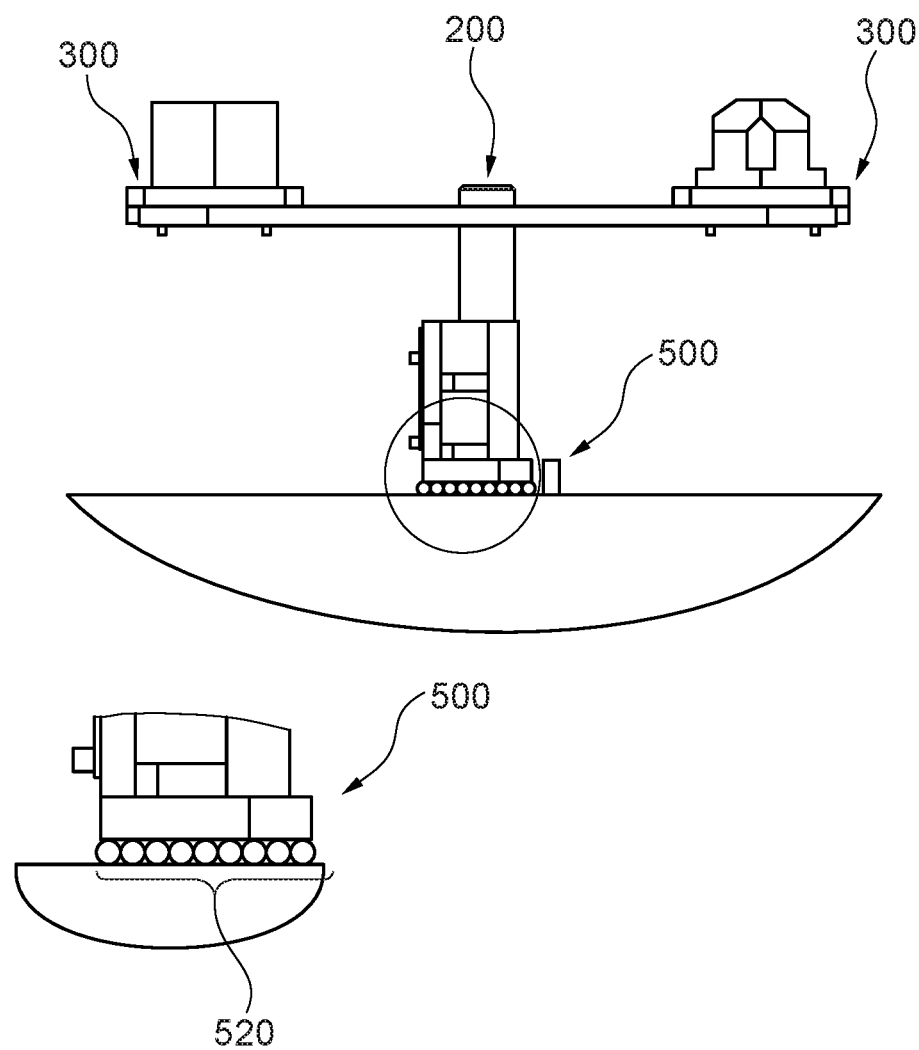
FIG. 14b schematically shows a positioning of a pallet changer in a storage station with roller technology.

FIGS. 14*a* and 14*b* schematically show a positioning of a pallet changer 200 at a storage station 500 by means of conical receptacles 510 (FIG. 14*a*) and at a storage station 500 with roller technology 520 (FIG. 14*b*).

Here, the pallet changers 200 (as indicated on the left edge) have various interfaces for coupling the pallet changer 200 to the transport device 100.

The conical receptacles 510 may also position the pallet changer 200 on all sides, while a depth stop must be provided at the storage station with roller technology 520 so that the pallet changer 200 does not fall from the storage station 500, wherein a positioning of the pallet changer 200 in a direction perpendicular to the plane of the sheet cannot be guaranteed by the roller technology 520.

Figure 15:
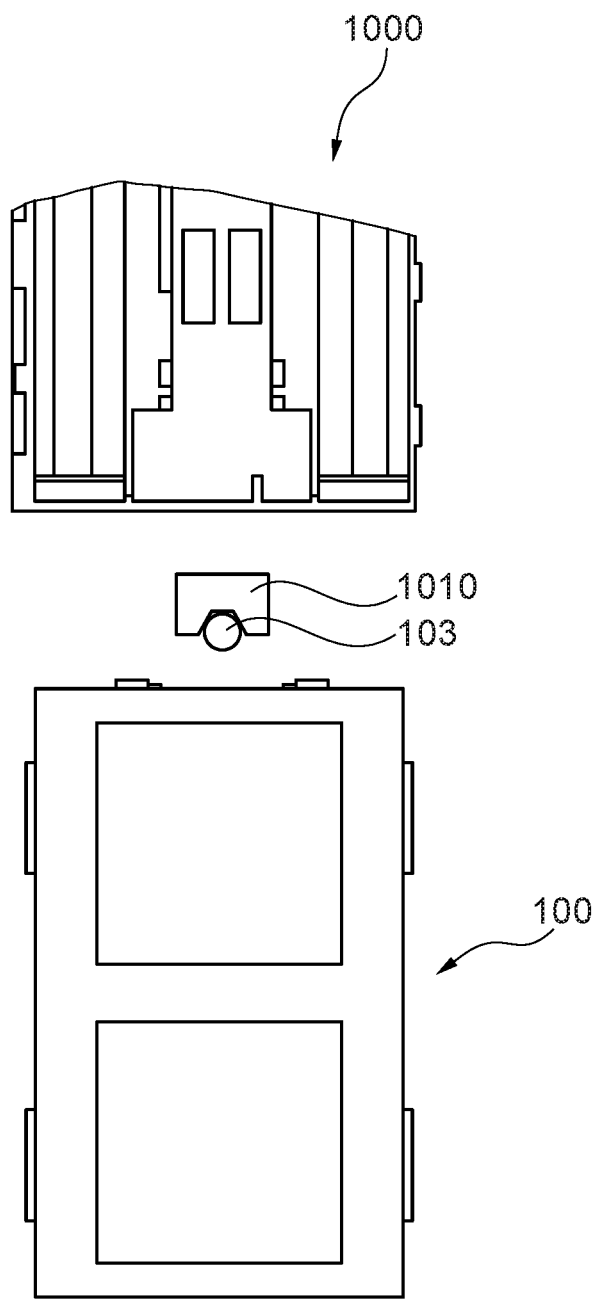
FIG. 15 schematically shows a positioning of the transport device according to the invention on a machine tool by means of a prism.

FIG. 15 schematically shows a positioning of the transport device 100 according to the invention on a machine tool 1000 by means of a prism 1010.

Here, the transport device 100 also has a corresponding counterpart 103 (here a cylindrical counterpart) in order to move into the prism with the counterpart 103 and thus achieve precise positioning in front of the machine tool 1000. However, a plurality of prisms 1010 and correspondingly a plurality of counterparts 103 may be used for such a positioning of the transport device 100 in front of the machine tool 1000, both for positioning in one direction (e.g. in the longitudinal direction of the transport device 100) and in a direction perpendicular thereto (e.g. transverse direction of the transport device 100).

It should be pointed out here that the above-mentioned configuration options for positioning the transport device 100 according to the invention are not limited to the combination of prism 1010 and cylindrical counterpart 103. Rather, for example a part with a V-shaped notch (as an alternative to the prism 1010) could also be used.

FIG. 16*a* schematically shows a positioning of the transport device 100 according to the invention on a machine tool 1000 by means of conical receptacles 1051.

Here, the transport device 100 includes a height adjustment (not shown here, see FIGS. 17 to 19) allowing for the handling device (here, for example, a pallet changer 200) to be placed on the conical receptacles 1051 of the machine tool 1000 and thus for a very precise positioning of the handling device in front of the machine tool 1000 to be achieved.

Furthermore, the conical receptacles 1051 allow for the handling device to bear the load, which is particularly advantageous when the handling device has to carry large masses possibly exceeding the load-bearing capacity of the transport device 100 during usage, for example in the case of pallets 300 with particularly large or heavy workpieces 1 and the load occurring when removing the pallet 300 with the workpiece 1.

The transport device 100 preferably has a defined position in front of the machine tool 1000 or the storage stations 500/setup stations. The positioning can be guaranteed mechanically, by signaling or in combination.

This positioning may preferably be carried out via n mechanical indexes via horizontally arranged movement(s) (see FIG. 15) or vertical movement(s). Alternatively, rotary movement(s) may also be used for this purpose, the movements being coupled with one another or executed one after the other.

Figure 18A:
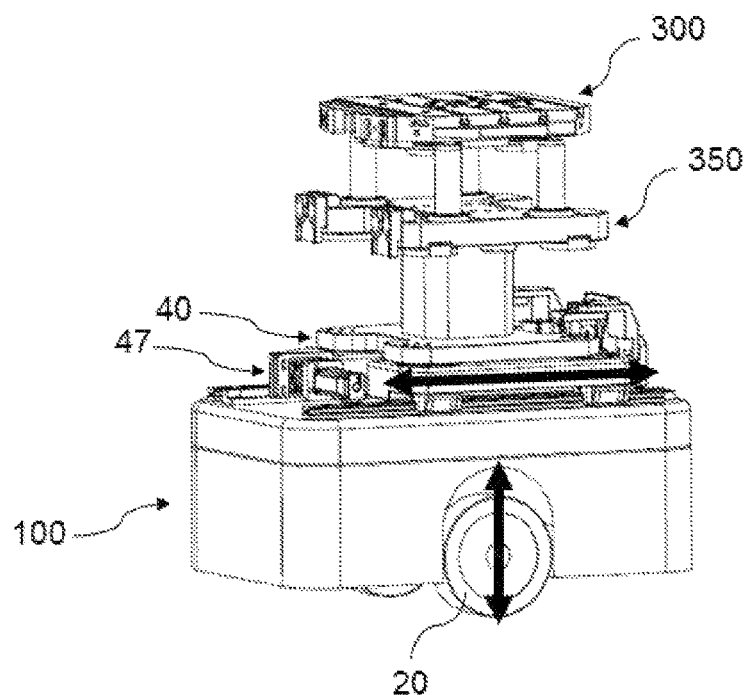
FIG. 18a schematically shows an embodiment of the transport device according to the invention with a pallet holder and a pallet.
Figure 18B:
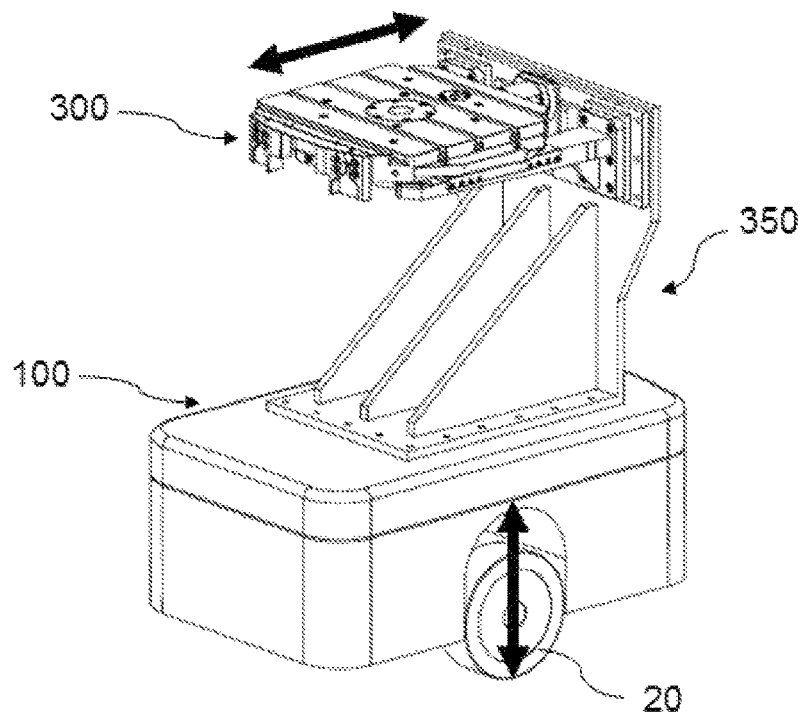
FIG. 18b schematically shows a further embodiment of the transport device according to the invention with a pallet holder and a pallet.
Figure 19:
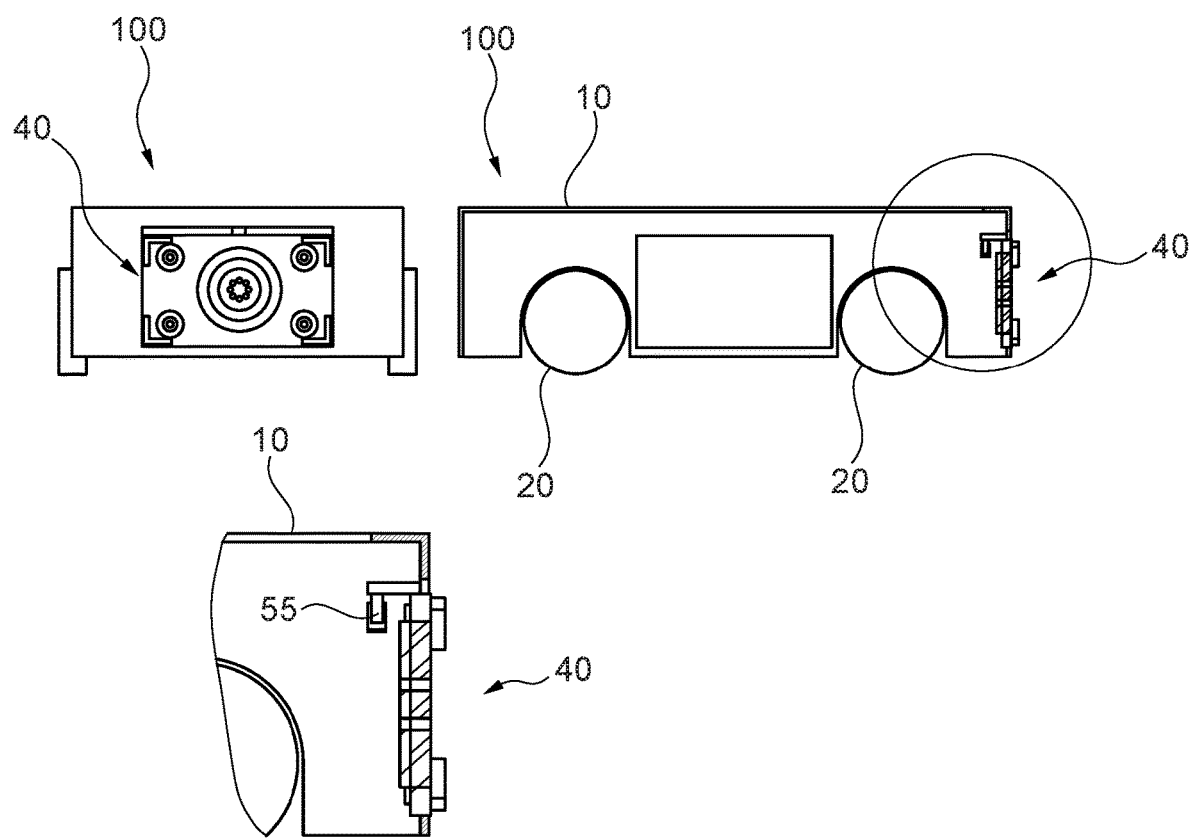
FIG. 19 schematically shows an embodiment of the transport device according to the invention with height adjustment of the receiving device for receiving handling devices of the transport device according to the invention.

In an exemplary embodiment, the positioning is ensured by a vertical movement (see in detail FIGS. 17 to 19).

The indexes may be linked to the machine tools 1000, the storage locations 500, or the setup stations. The indexes are preferably connected to the hall floor to prevent any disturbances such as vibrations, shocks to affect the machine tool 1000 or the stations while the transport device 100 is positioned.

The indexes are preferably configured to be conical (conical receptacles 1051). This ensures positioning in all necessary planes. The conical receptacles 1051 are preferably positioned in such a way that they are not in the actual entry area in front of the machine tool 1000 and therefore do not impede the operator ergonomically when working manually.

Preferably, the conical receptacles 1051 are also used to absorb vertical loads that arise, for example, during pallet change due to the pallet 300 to be removed. As a result, the transport device 100 can be configured for the maximum transport capacity and does not have to absorb any additional loads that arise at short notice due to exchange processes.

Furthermore, the conical receptacles 1051 (see also FIGS. 16*b* and 16*c*) may be used to establish a connection between the machine tool 1000, stations and the transport device 100. This connection may be used for signal transmission or for energy exchange, if it cannot be designed contactless.

Furthermore, the above mentioned connection may also be implemented through another receptacle docked by the cone lift.

In addition, the conical receptacles 1051 may be locked and unlocked in order to additionally stabilize the positioning or to increase its accuracy.

The vertical movements of the transport device 100 may be driven and controlled by using the media present on the transport device 100. Each of the receiving devices 40 may preferably carry out the vertical movement autonomously and independently of one another (see FIG. 19 in this regard).

Alternatively, the vertical movement may be performed by lifting the frame/carriage of the FTS relative to the wheels (see FIGS. 17 and 18).

The lifting movement may move freely to all necessary positions in order to find a suitable sequence. In an exemplary embodiment, three main positions are provided:

Lift top: position in which the transport device 100 can move.

Lift center: Position in which the handling devices are placed on the cones.

Lift bottom: depositing handling devices/material carriers/boxes directly on the floor.

Furthermore, the lifting movement may also be used to dock the transport device 100 on a charging station (not shown here) and to enable the charging process there.

Furthermore, the handling device may be temporarily transferred directly to the machine tool 1000 by the transport device 100. Here, the handling device is supplied via the interface integrated in the conical receptacles 1051 (see also FIGS. 16*b* and 16*c*) for establishing a connection from the machine tool 1000 and the transport device 100 can take on other tasks and other handling devices. In this case, the transport device 100 serves as a feeder for temporary handling devices for various machine tools 1000.

FIG. 16*b* schematically shows a further embodiment of the transport device 100 according to the invention with positioning and establishment of energy and/or signal connection by means of conical receptacles 1051.

Here, conical receptacles 1051 of the machine tool are shown, which, in addition to positioning the transport device 100 when it is lowered above the conical receptacles 1051 by means of its lifting cylinders (see FIGS. 17 and 18) can establish a connection via which energy and/or signals for controlling or monitoring the transport device 100 can be transmitted to the transport device 100 and vice versa from the transport device 100 to the machine tool 1000.

By means of the conical receptacles 1051, for example, as shown here, the pallet 300 or any other handling device could be positioned precisely on the machine tool 1000 and, and this is particularly advantageous, the transport device 100 or the received pallet 300 could be controlled without straining the internal energy store (not shown here) of the transport device 100, since the energy is provided by the machine tool 1000 and is fed into the transport device 100 via the connection described.

Furthermore, the transport device 100 may include a type of charging station at which it can refill or renew its energy sources (energy store 30; not shown here). This can be done, for example, by docking on the conical receptacles 1051.

FIG. 16*c* schematically shows a further embodiment of the transport device 100 according to the invention, wherein a pallet holder 350 with a pallet 300 docks to a pallet holder receptacle 1040 by means of a transport device 100. The pallet holder receptacle 1040 may be provided on the machine tool 1000, for example.

In particular, this embodiment differs from the one shown in FIG. 16*a* in that the pallet holder 350 (or another device that is/can be transported by the transport device 100) is docked to the pallet holder receptacle 1040 by a movement of the transport device 100 in the horizontal plane.

Docking can take place, for example, by means of conical receptacles 1051 (here for example clamping cones) on the pallet holder receptacle 1040 or on the pallet holder 350 and correspondingly designed conical recesses 355 on the pallet holder 350 or on the pallet holder receptacle 1040. The advantages already described, such as the alignment/centering of the pallet holder 350 with respect to the pallet holder receptacle 1040, also result from the conical receptacles 1051/conical recesses 355 here.

After the pallet holder 350 (or another device that is/can be transported by the transport device 100) has been docked, the transport device 100 may, for example, decouple again from the transported device (here pallet holder 350) and be used for another transport task.

Furthermore, the pallet holder 350 may have, as is also the case for the transport device 100 itself or the handling device for example, an interface 357 for transmitting mechanical energy and/or electrical, hydraulic and/or pneumatic energy between the pallet holder receptacle 1040 and the pallet holder 350. The pallet holder receptacle 1040 may accordingly have a counterpart (interface 358) to the interface 357 of the pallet holder 350.

Furthermore, for example, operating means such as cooling lubricant could also be fed from the pallet holder receptacle 1040 to the pallet holder 350. For this purpose, for example, corresponding fastening means and connections conducting electricity and/or fluid (comparable to fastening means and connections 43) may be provided.

In addition, the interface 357 may advantageously include a device for contactless transmission of signals between the pallet holder receptacle 1040 of the machine tool 1000 (or another device) and the pallet holder 350. This device for contactless signal transmission may be configured, for example, as a transmitter/receiver coil or as an inductive coupler with I/O link for contactless transmission of the signals.

Here, the device may be provided at any location on the interface 357 or also outside of the interface 357, with the device for contactless signal transmission being provided centrally in the interface 357.

It should be pointed out here, however, that the receptacle designated as pallet holder receptacle 1040 on the machine tool 1000 may also receive a variety of other devices, handling devices or the like, or also the transport device 100 itself by docking. The pallet holder receptacle 1040 is therefore not limited to receiving pallet holders 350.

It should further be pointed out that in a particularly preferred manner the receptacle described for docking (with conical receptacles 1051, conical recesses 355, and interfaces 357/358) with the receptacle devices 40 (see FIG. 2) is configured to be uniform or standardized so that any components or handling devices with correspondingly uniformly configured receiving elements can be attached and essentially the same quick-release couplings can be used for energy or signal transmission in this case.

FIG. 16*d* schematically shows a further embodiment of the transport device 100 according to the invention with a pallet holder 350.

Here, the transport device 100 includes a pallet holder 350 which cannot be received by a machine tool 1000 (or by a setup station, magazine station, etc.) and always remains on the transport device 100.

This pallet holder 350 is configured to place a pallet 300 on a receptacle 1040 of the machine tool 1000 by positioning the pallet 300 by means of the transport device 100 (in the raised state) over the receptacle 1040 and then lowering the transport device 100 until the pallet 300 is received from the receptacle 1040.

Already when positioning the pallet 300 above the receptacle 1040, an alignment (precentering) of the pallet 300 with respect to the receptacle 1040 by alignment elements 301 located on the pallet 300 is performed. When the pallet 300 is positioned over the receptacle 1040, these alignment elements 301 are pressed against a centering device 1045 so that the pallet 300 rests completely against the centering device 1045. If the pallet 300 is now lowered further by the transport device 100, the centering device 1045 threads itself into the alignment elements 301 (since these have a V-shaped recess, for example) so that a lateral offset of the pallet 300 with respect to the receptacle 1040 is also compensated. As a result, the pallet 300 is pre-centered with respect to the receptacle 1040, and in particular with respect to the cones (here pallet cones 1044).

For example, the pallet 300 itself may rest on the pallet holder 350 (which may be configured in the shape of a fork, for example) by a pressure piece (not shown here) such that it is biased in the direction of the aligning elements 301 on the fork. This bias may be used advantageously, for example, to secure/fix the pallet 300 on the fork of the pallet holder 350.

If the pallet 300 or the alignment elements 301 are pressed against the centering device 1045 of the receptacle 1040 (by the positioning movement of the transport device 100), the pressure piece is compressed further and the fixation of the pallet 300 with respect to the fork is cancelled. Thus, the pallet 300 may be deposited on the receptacle 1040.

FIG. 16e schematically shows a further embodiment of the transport device 100 according to the invention with a pallet holder 350.

The sequence of positioning/precentering the pallet 300 with respect to the receptacle 1040 is substantially the same as the sequence described in FIG. 16d. However, it is not the pallet 300 itself that is aligned/precentered on the receptacle 1040, but the pallet holder 350 carrying the pallet 300.

Here, too, the pallet holder 350 cannot be deposited on the machine tool 1000 (or on another device) and remains on the receiving device 40 of the transport device 100.

For aligning/precentering the pallet 300 with respect to the receptacle 1040, the pallet holder 350 now has alignment elements 351 that are pressed against the centering device 1042 during the positioning movement of the transport device 100 with respect to the receptacle 1040 and also have, for example, a V-shaped recess into which the centering device 1042 can be threaded. This results in the precentering/alignment of the pallet holder 350 with respect to the receptacle 1040, which forms the basis for the alignment of the pallet 300 with respect to the receptacle 1040.

At the same time, a pressure piece (not shown here, but comparable to that described in FIGS. 2b and 2c) can be further compressed by pressing the pallet holder 350 against the receptacle 1040, for example, in order to release the pallet holder 350 from its fixation with respect to the receptacle device 40 and to allow for the pallet holder 350 to be positioned with respect to the receptacle 1040.

If the transport device 100 now is lowered further after the pallet 300 has been precentered, the pallet 300 can be deposited on the corresponding cones (for example pallet cones 1044, see FIGS. 16i and 16j). The transport device 100 is now free and can turn to a new task, for example receiving a new pallet.

FIG. 16f schematically shows another embodiment of the transport device 100 according to the invention with a pallet holder 350, similar to what is already known from FIG. 16e.

However, the pallet holder 350 together with the pallet 300 can now be deposited on the machine tool 1000 (or another device).

For this purpose, as already described in FIG. 16e, the pallet holder 350 is aligned/precentered with respect to the receptacle 1040 by the alignment elements 351 and the centering device 1042. Here, too, it may be advantageous if a pressure piece is further compressed and thus on the one hand allows for the pallet holder 350 to be positioned with respect to the receptacle 1040 and at the same time for the pallet holder 350 to be lifted off the receiving device 40.

If the transport device 100 is now lowered further, the pallet 300 may, for example, be received directly by the receptacle 1040 (pallet cones 1044) or the pallet holder 350 along with the pallet 300 is first removed from the receptacle 1040 (device cones 1041, see FIGS. 16i and 16j) and then the pallet 300 is received by means of the pallet cones 1044.

FIG. 16g shows the state of the transport device 100 according to the invention as shown in FIG. 16f when only the pallet 300 has been received by the receptacle 1040. The transport device 100 may now move away from the machine tool 1000 with the pallet holder 350 received on the receiving device 40 and take on a new task.

FIG. 16h shows the state of the transport device 100 according to the invention as shown in FIG. 16f when the pallet holder 350 along with the pallet 300 has been received by the receptacle 1040. The transport device 100 can now move away from the machine tool 1000 again and take on a new task, for example by receiving a new device (for example a new pallet holder 350, a handling device, another device as shown in FIGS. 22 to 36, for example).

However, the embodiments of the transport device 100 according to the invention shown and described in the previous figures and exemplary embodiments are not restricted thereto and can expressly be combined with one another as desired.

FIG. 16i shows a configuration of a receptacle 1040 of a machine tool 1000 for receiving a pallet holder 350 and/or pallet 300.

Here the receptacle also includes, in addition to at least one pallet cone 1044 for receiving a pallet 300, at least one device cone 1041 allowing for entire devices (such as a pallet holder 350) to be received 1040 so that the transport device 100 can again be used for other tasks after the device has been deposited at the machine tool 1000.

Furthermore, the receptacle 1040 includes at least one centering device 1042 at which the device can align itself with respect to the receptacle 1040 before it is placed/deposited on the at least one device cone 1041 and/or the pallet 300 is placed/deposited on the at least one pallet cone 1044.

Here, both the at least one pallet cone 1044 and the at least one device cone 1041 may have a docking unit which locks/fixes the pallet 300 or the device and/or has media connections similar to what is shown in FIG. 2d.

Furthermore, the receptacle 1040 may also have one or more separate media interfaces 1043 configured to transmit signals and/or energy from the machine tool 1000 to the device received.

Here, the media interface 1043 may transmit signals and/or energy contactlessly (for example inductively or optically), be embodied as plugged connection(s), and carry out transmissions by radio. Any combination thereof is possible just as the expansion to include the supply of fluids (for example cooling lubricant) or the like.

Furthermore, the receptacle 1040 may also additionally include at least one centering device 1045 (not shown here, see FIG. 16d) for aligning the pallet 300 with respect to the receptacle 1040.

FIG. 16j shows the configuration of the receptacle 1040 of a machine tool 1000 as shown in FIG. 16i, but from a different perspective for a better overview of the individual components of the receptacle 1040.

FIG. 17a schematically shows an embodiment of the transport device 100 according to the invention with height adjustment of the transport device 100 according to the invention by means of lifting cylinders 50.

The chassis 10 is raised by the lifting cylinder 50 with respect to the wheels, so that the handling devices received also change their height with respect to the wheels 20 or to the machine tool 1000 (not shown here).

FIG. 17b schematically shows a further embodiment of the transport device 100 according to the invention with height adjustment of the transport device according to the invention by means of lifting cylinders 50.

Herein, an alternative is to be shown in which, in addition to the lifting cylinders 50, a suspension 60 (e.g. based on a lever mechanism) is also provided in order to lift the chassis 10 of the transport device with respect to the wheels 20 so that the handling devices carried along also change their height.

FIG. 18a schematically shows an embodiment of the transport device 100 according to the invention with a pallet holder 350 and a pallet 300.

Here, it is to be clarified which movements the transport device 100 performs during the depositing/receiving processes for depositing/receiving a pallet 300 at a receptacle 1040 (not shown here).

For this purpose, the transport device 100 is raised by means of a mechanism, as shown in FIGS. 17a and 17b, with respect to the wheel or wheels 20 (suspension lift, vertical arrow) in order to correspondingly position the pallet 300 and/or the pallet holder 350 above a receptacle 1040 and then deposit it on the receptacle 1040 by lowering the transport device 100.

During positioning, there may be contact between the pallet holder 350 or pallet 300 to align the pallet holder 350/pallet 300 with respect to the receptacle so that a positioning movement (approximately horizontal arrow) of the pallet holder 350 with respect to the receiving device 40 of the transport device 100 is also carried out. This positioning movement may, however, depend on the extent to which there is a drive 47 (as described in FIG. 2b) for supporting the fixing and/or positioning of the pallet holder 350 with respect to the receiving device 40 of the transport device 100.

FIG. 18b schematically shows a further embodiment of the transport device 100 according to the invention with a pallet holder 350 and a pallet 300.

Here, too, the transport device 100 is raised by means of a mechanism, as shown in FIGS. 17a and 17b, with respect to the wheel or wheels 20 (suspension lift, vertical arrow) in order to position the pallet 300 accordingly above a receptacle 1040 and then depositing it on the receptacle 1040 by lowering the transport device 100.

During positioning, there may be contact between the pallet 300 to align the pallet 300 with respect to the receptacle so that a positioning movement (approximately horizontal arrow) of the pallet 300 with respect to the pallet holder 350 is also carried out. This movement may act against a pressure piece (similar to the pressure piece 45 described in FIGS. 2b and 2c) which is thereby pressed in further and loosens the fixation of the pallet 300 with respect to the pallet holder 350 and allows for the pallet 300 to be aligned with respect to the receptacle 1040 and the pallet to be received by the receptacle 1040.

FIG. 19 schematically shows an embodiment of the transport device 100 according to the invention with height adjustment of the receiving device 40 for receiving handling devices of the transport device 100 according to the invention.

Here, the position of the chassis 10 with respect to the wheels 20 of the transport device 100 is not changed, but the receiving device 40 changes its position with respect to the chassis 10 or with respect to the platform carrier.

This has the advantage that the lifting cylinders 55 can be downsized since they do not have to bear the weight of the chassis 10 and the other handling devices and other additional weights.

Figure 20A:
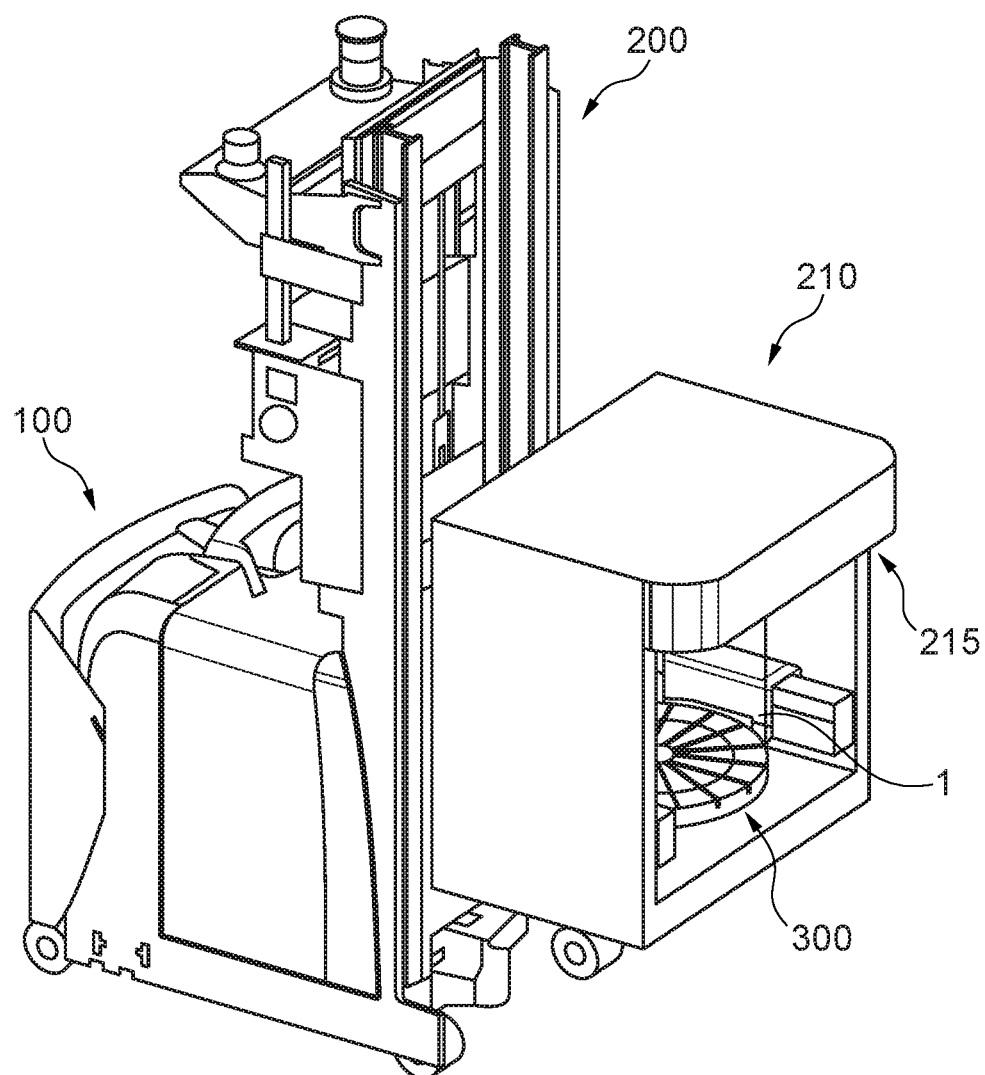
FIG. 20a schematically shows a further embodiment of the transport device according to the invention with a pallet changer and a hood to protect the pallet being transported.

FIG. 20a schematically shows a further embodiment of the transport device 100 according to the invention with a pallet changer 200 and a hood 210 for protecting the transported pallet 300, preferably for protecting all sides of the pallet 300.

The hood 210 protects the transported pallet 300 from external influences such as dirt, air currents or even rougher mechanical influences, etc. Conversely, the hood 210 also protects the surroundings from any chips or dripping cooling lubricant that may, for example, fall from the pallet 300 and could still adhere to the pallet 300 after machining of a workpiece 1 on the pallet 300 is completed.

For this purpose, the hood 210 may also include a closing device 215 fort closing the opening of the hood 210 at said opening through which the pallet 300 is introduced into the hood 210 by the pallet changer 200.

For this purpose, the closing device 215 may be configured in the form of a roller door, at least one folding door, at least one wing door, a flap pivotable about a horizontal axis, or a sliding door. However, the above list should not be understood as exhaustive and may be supplemented by further configuration options.

FIG. 20b shows a further embodiment of the transport device 100 according to the invention transporting a pallet 300 into a work space of a machine tool 1000.

Here, the work space is separated from the surroundings by a housing 1060 and has an opening on one side, here for example the end face of the machine tool 1000, through which, for example, a machine operator can operate in the work space and through which the pallet 300 can be inserted into the work space of the machine tool 1000. To close this opening, for example, a roller door, a sliding door, a single-leaf or double-leaf revolving door or a comparable device may be used.

Furthermore, the machine tool 1000, in particular the housing 1060, has an access extending from the hall floor to the work space and into which the transport device 100 can move in order, for example, to insert a pallet 300 into the work space of the machine tool 1000.

In order to protect the access for the transport device 100 from chips and/or cooling lubricants, in particular during the machining of the workpiece transported on the pallet 300, the transport device 100 or the pallet holder 350 may also have a collecting cover 360 for collecting the chips and/or of the cooling lubricant. In an advantageous manner, the collecting cover 360 can then close the access at the upper end (transition from access to the work space) so that chips and cooling lubricant that are spreading/have spread in the work space can be trapped in the collecting cover 360 of the transport device 100 or the pallet holder 350.

In addition, it may be possible that a cover panel is located on the end of the transport device 100 or the pallet holder 350 facing away from the access when the transport device 100 enters the access in order to additionally close the access from the outside after the transport device 100 has driven into the access of the housing 1060.

However, if the pallet 300 is removed from the work space by the transport device 100, chips and cooling lubricant can still fall off/flow off, for example, from the inside of the walls of the housing 1060 and be collected in the area of the access. In order to prevent these chips/cooling lubricants from contaminating the access for the transport device 100, it may be advantageous to provide a steel cover 1065 at the transition from the access of the housing 1060 to the work space of the machine tool 1000, the steel cover being pushed back by the transport device 100 (or by the handling device carried by the transport device 100, such as the pallet holder 350, etc.) when the transport device 100 enters the access in order to position/insert the pallet 300 or the pallet holder 350 in the work space of the machine tool 1000 (cf., for example, the lower image in FIG. 20b).

Here, the steel cover may advantageously have several segments that can be slid into one other so that they are relatively compact when pushed together. When the transport device 100 is moved out of the access, a spring mechanism (not shown here), for example, may push out the segments or the steel cover 1065 as a whole to close the upper end of the access (see, for example, the upper image in FIG. 20b).

Furthermore, the steel cover 1065 may have, at its end facing the transport device 100 entering the access, a cover section having cutouts in the form of the receptacle used for docking (comprising the conical receptacles 1051/conical recesses 355 and the interfaces 357/358; see also FIG. 16c).

Like the steel cover 1065 itself, the cover section is displaced when the transport device 100 moves in, wherein the conical receptacles 1051 and, correspondingly, the interface 358 of the receptacle of the machine tool 1000 pass through the cutouts in the cover section so that the transport device 100 or the handling device carried by the transport device 100 (for example a pallet holder 350; see also FIG. 16c) can dock to the receptacle of the machine tool 1000.

Figure 20C:
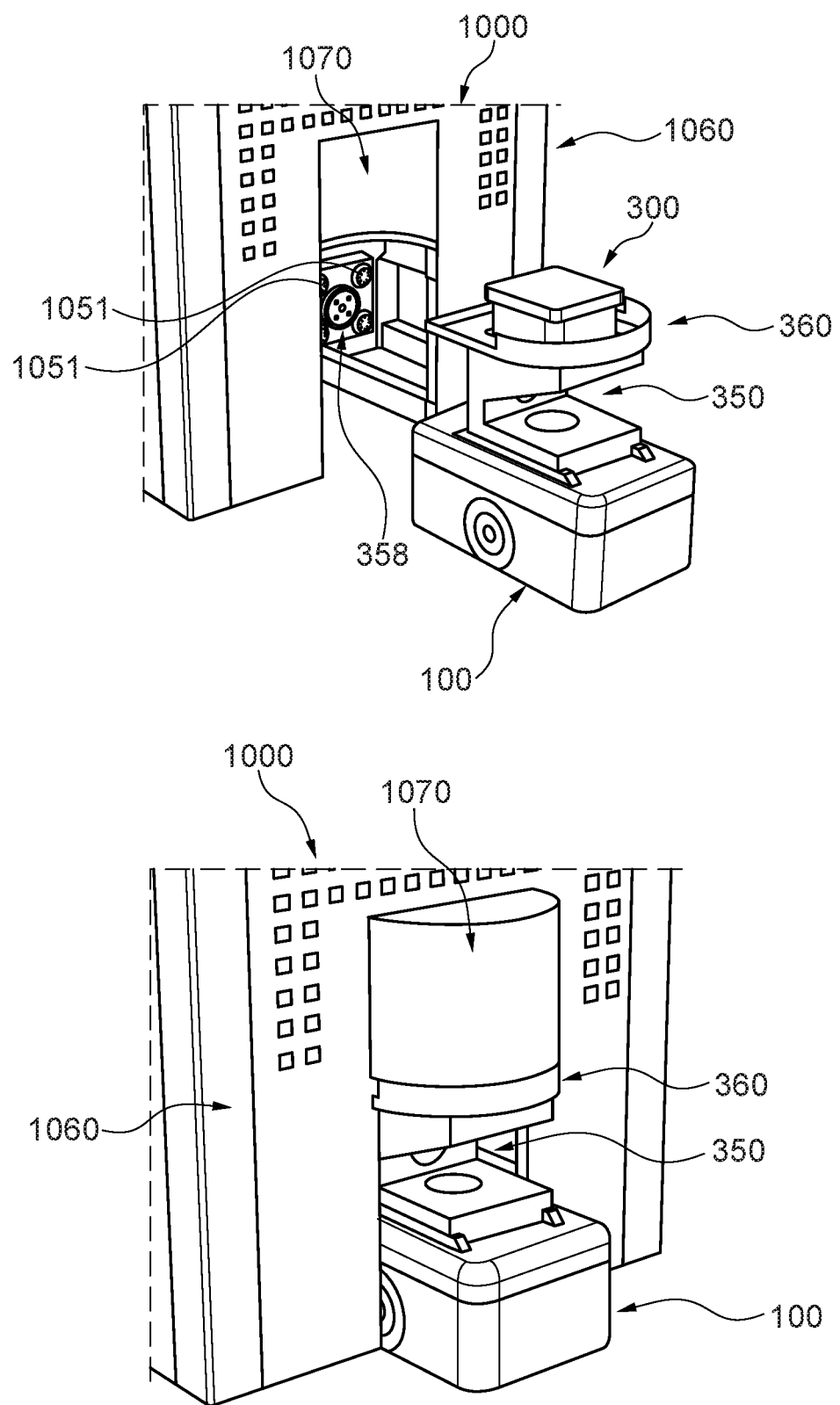
FIG. 20c schematically shows a further embodiment of the transport device according to the invention which transports a pallet into a work space of a machine tool.

FIG. 20c shows a further embodiment of the transport device 100 according to the invention transporting a pallet 300 into a work space of a machine tool 1000.

A round door 1070 is provided to close the opening through which, for example, a machine operator could reach into the work space of the machine tool 1000 or through which the pallet 300 is inserted into the work space of the machine tool 1000.

If the round door 1070 is in the open state (as shown in the upper picture of FIG. 20c), the semicircle of the round door 1070 faces, for example, the work spindle 1100 (not shown here) of the machine tool 1000 and thus separates the work spindle 1100 from the opening in the housing 1060. In this way, it can be prevented, for example, that the machine operator unintentionally touches a tool inserted in the work spindle 1100 and is possibly injured.

For docking the handling device (such as a pallet holder 350 or another device) transported by the transport device 100 to the machine tool 1000, as has already been described in FIG. 16c, a receptacle (including the conical receptacles 1051/conical recesses 355 and the interfaces 357/358) may be used.

However, other connection options between machine tool 1000 and transport device 100 or handling device may also be provided, such as conical receptacles 1051 which are provided on the hall floor (see also FIGS. 16a and 16c)

If the transport device 100 with the pallet 300 has moved through the opening of the housing 1060 into the work space of the machine tool 1000, the round door 1070 closes the opening of the housing 1060 by a rotary movement about an axis of rotation (as shown in the lower figure of FIG. 20c), in particular by a rotary movement about the axis of symmetry of the round door 1070, which may be oriented vertically, for example.

Advantageously, the collecting cover 360 may be formed, in particular with regard to the use of the round door 1070 to close the opening of the housing 1060, taking into account the shape of the round door 1070 in order to ensure an improved sealing of the work space of the machine tool 1000 from the environment with regard to stirred up chips and cooling lubricant.

For this purpose, it would also be advantageous if a comparable semicircle is provided at the end of the collecting cover 360 of the pallet holder 350, at which the round door 1070 is positioned in the closed state. An optimized sealing between the round door 1070 and the collecting cover 360 and thus between the work space and the environment of the machine tool 1000 could thus be obtained.

The receptacle used for docking on the machine tool 1000 (including the conical receptacles 1051 and the interface 358; see also FIG. 16c) can function without an additional cover (as described for example in FIG. 20b). However, a combination of the steel cover 1065, as described in FIG. 20b, and the round door 1070 may also be used in order to provide additional sealing in the housing 1060 of the work space of the machine tool 1000.

Figure 21A:
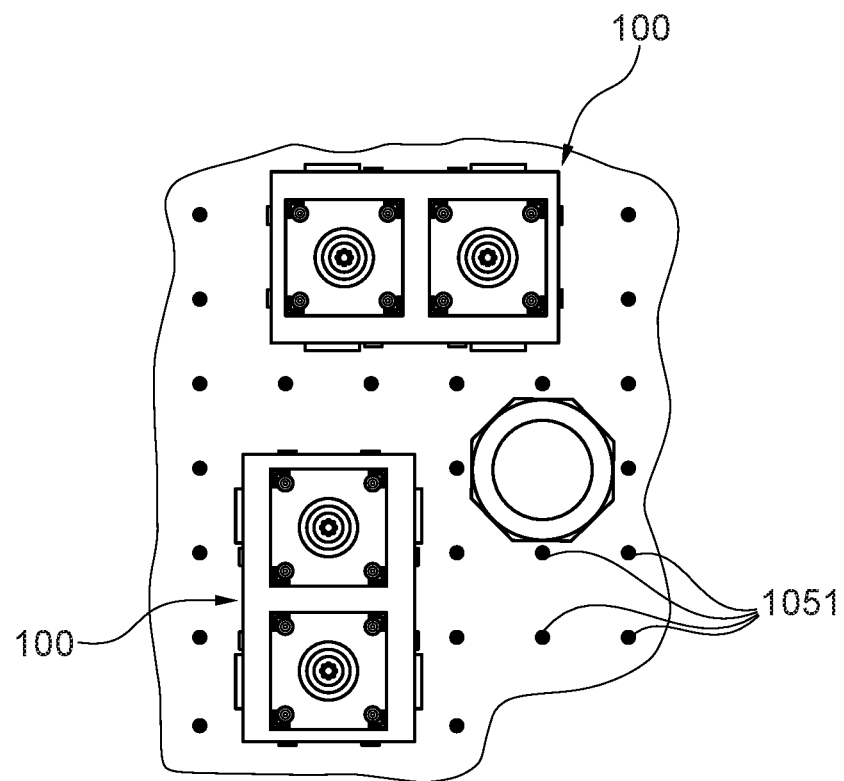
FIG. 21a schematically shows a hall floor/plate with cones in a grid-like arrangement for positioning the transport devices or handling devices.

FIG. 21a schematically shows a hall floor with cones 1051 in a grid-like arrangement for positioning the transport devices 100 or the handling devices.

As already explained with reference to FIG. 16, the transport device 100 can be lowered such that either the transport device 100 itself or the handling device received by the transport device 100 is positioned by means of the cones 1051.

Another possibility is to configure the cones 1051 to be retractable, for example if the cones 1051 interfere with the movements of the transport devices 100 on the hall floor. For this purpose, the cones 1051 would have to have their own lifting device (for example pneumatic, hydraulic, electrical or mechanical) so that they can be lifted out of the hall floor or sunk into it. In addition, a combined lifting movement of the cones 1051 and the transport device 100 could also be performed in order to carry out the positioning.

Figure 21B:
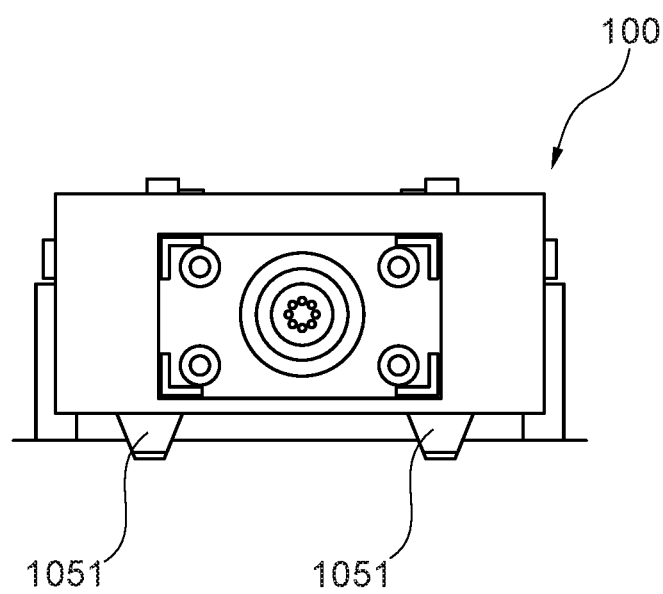
FIG. 21b shows a further option of providing the cones on the underside of the transport device for positioning.

FIG. 21b shows a further option of providing the cones 1051 on the underside of the transport device 100 and only providing corresponding recesses for the cones 1051 in the hall floor.

In this way, the lifting movement could now be performed by the transport device 100 or the receiving device 40 in order to carry out the positioning. Furthermore, however, it may also be possible for the cones 1051 on the underside of the transport device 100 to be sunk into the recesses in the hall floor in order to allow for the transport device 100 or the handling device to be positioned.

In these cases, there is no longer any interfering contour on the hall floor so that the transport devices 100 can travel over the hall floor without restriction. In addition, in the embodiment, as shown in FIG. 21b, an additional lifting device (for example for the cones on the hall floor) can be omitted.

Figure 22A:
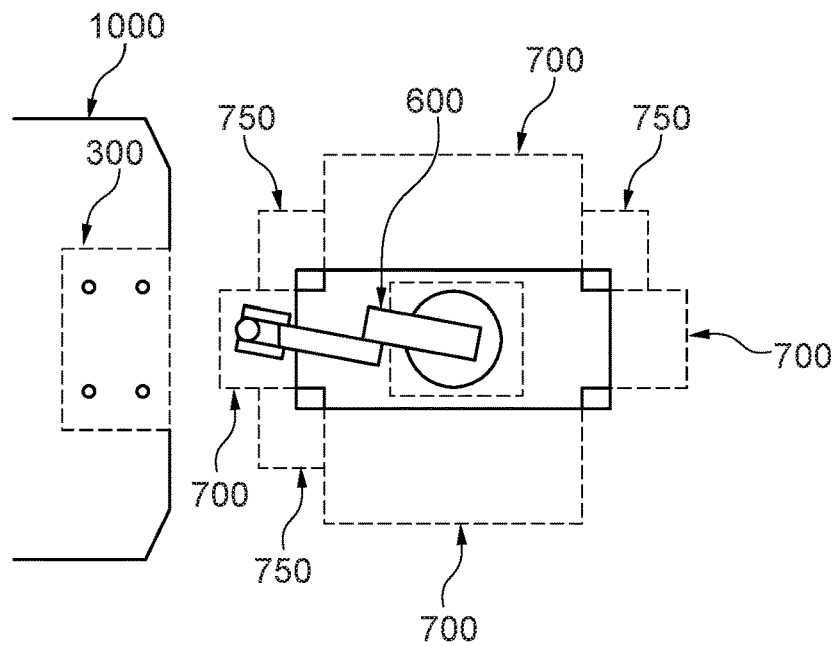
FIG. 22a schematically shows a further embodiment of the transport device according to the invention with an industrial robot as the handling device.

FIG. 22a schematically shows a further embodiment of the transport device 100 according to the invention with an industrial robot 600 as the handling device.

In addition to or instead of a pallet changer 200 as a handling device, a robot 600 (industrial robot) may also be received by the receiving devices 40 of the transport device 100. It may be used for a wide variety of tasks within the production process and may be further adapted depending on the application. Further examples thereof are described in FIGS. 23 to 28 and 35.

Moreover, it is advantageous that the transport device 100 has a large number of receiving devices 40, wherein different modules/handling devices are receivable at each receiving device 40.

As shown in FIG. 22a, various material pallets 700, machine pallets 700 or mesh boxes 700 can be received by the transport device 100. Furthermore, various auxiliary modules 750 (such as deburrers, storage boxes for tools, exchange grippers, etc.) can be received by the transport device 100, which the robot 600 may use, for example, to carry out equipment work on the machine tool 1000 or post-processing on a workpiece 1 manufactured by the machine tool 1000.

It should also be explicitly pointed out here that the transport device 100 may also be equipped as a pure material feeder or tool feeder, for example as a type of workpiece/tool cart exclusively loaded with one or more material pallets 700 and/or tool pallets and/or mesh boxes 700, which can accordingly travel to processing stations or other destinations of the workpieces/tools.

Due to the possibility of receiving a pallet changer 200 and a robot 600 on a transport device 100, workpiece and pallet handling may advantageously be combined as desired and circumstances in the production chain can be addressed in a customized manner.

Figure 22B:
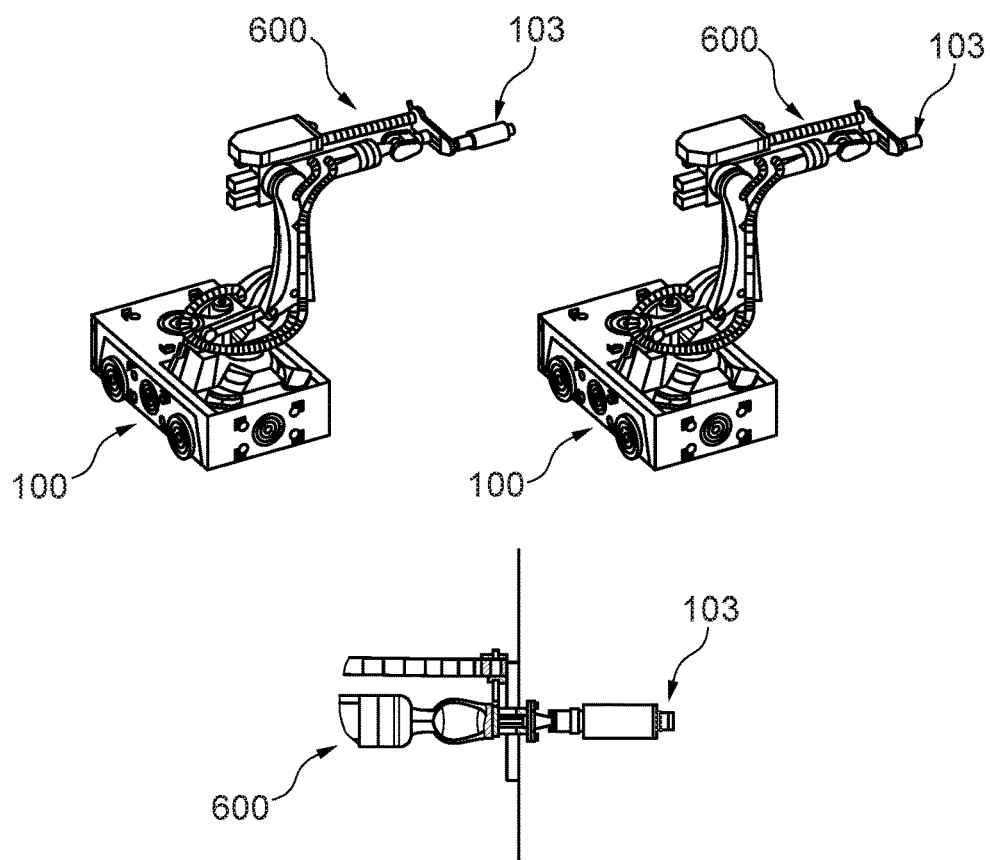
FIG. 22b schematically shows two more specific exemplary embodiments of the transport device according to the invention with a robot for handling tools or workpieces.

FIG. 22b schematically shows two more specific exemplary embodiments of the transport device 100 according to the invention with robots 600 received, both robots 600 being configured both for tool handling and for workpiece handling. In particular for moving tools 102, for example, a tool changer may be received by the robot 600 (see, for example, the detailed view in FIG. 22b). Said robot could, for example, also exchange the tool 102 in the work spindle 1100 of the machine tool 1000.

Figure 23:
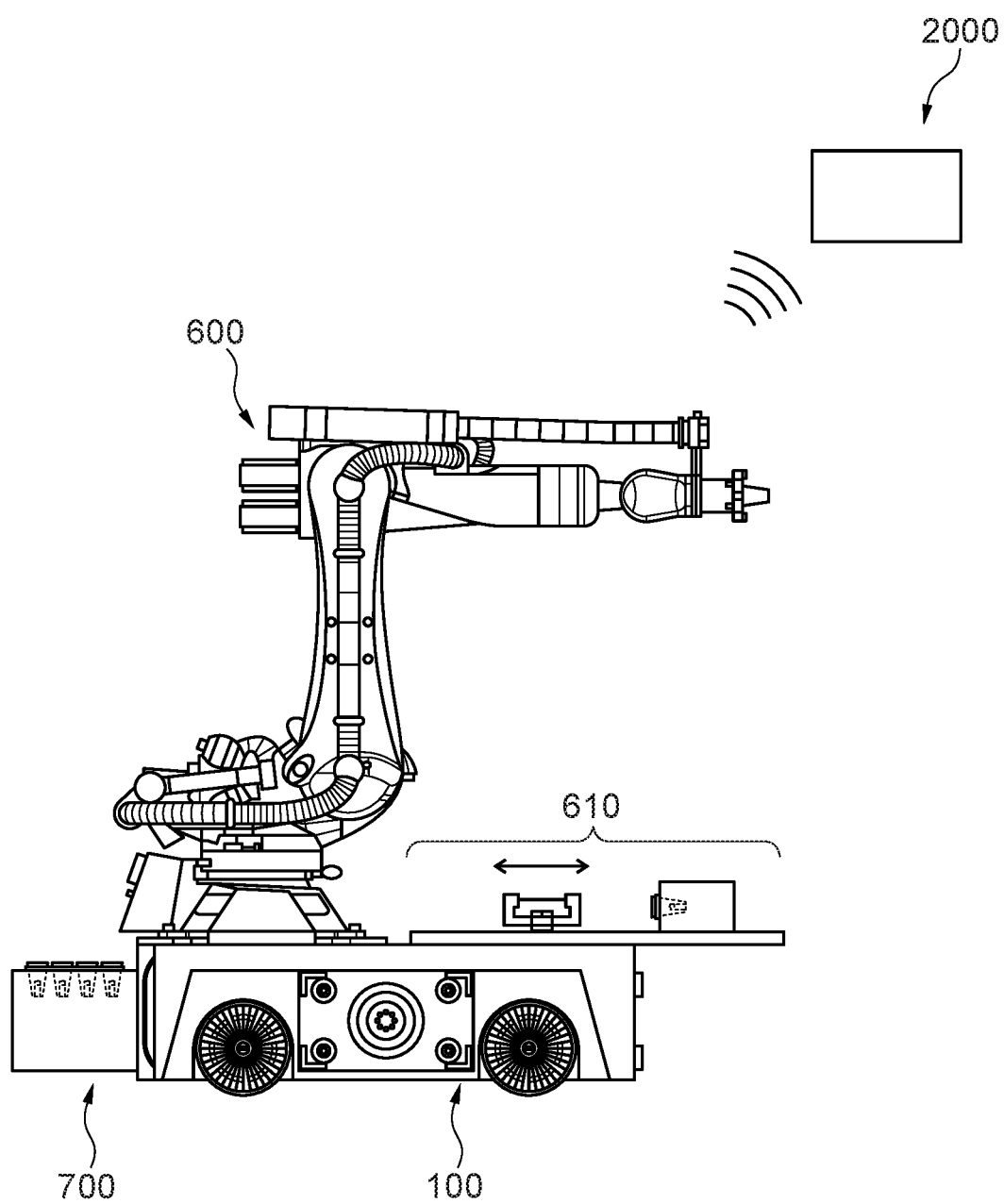
FIG. 23 schematically shows a further embodiment of the transport device according to the invention with an industrial robot and a measuring unit for tool testing.

FIG. 23 schematically shows a further embodiment of the transport device 100 according to the invention with an industrial robot 600 and a measuring unit 610 for tool testing.

With the configuration of the transport device 100 shown in FIG. 23 with a robot 600 and a measuring unit 610 for tool testing and a module 700 with buffer spaces for the tools, the transport unit 100 can remove, measure and test the tools from a machine tool 1000 (not shown here).

The test may be carried out in a tactile or non-contact manner. Writing and reading units may also identify the tool and assign it accordingly.

The information obtained and the results of the test may now be transmitted via radio signals to a host computer control 2000 and may be processed accordingly.

Figure 24A:
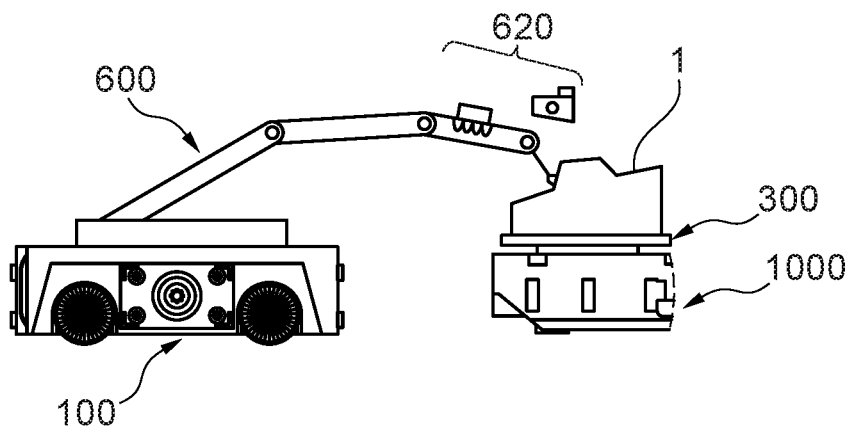
FIG. 24a schematically shows a further embodiment of the transport device according to the invention with an industrial robot and measuring and testing means for component testing.
Figure 24B:
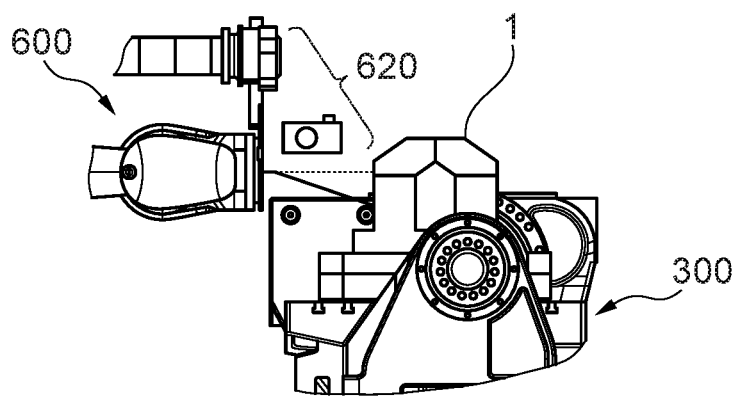

FIG. 24a schematically shows a detailed view of a further embodiment of the transport device 100 according to the invention with an industrial robot 600 and measuring and testing means 620 for testing components 1 manufactured on a machine tool 1000 (here with pallet 300), as is also shown in detail in FIG. 24b.

The component 1 may be tested by the robot 600 both in a tactile manner and by scanning. Furthermore, an optical unit may test the component 1 using an optical method.

The data and information obtained may again be transmitted by radio, by induction or by appropriate connections/ports in the conical receptacles (not shown here).

Figure 25:
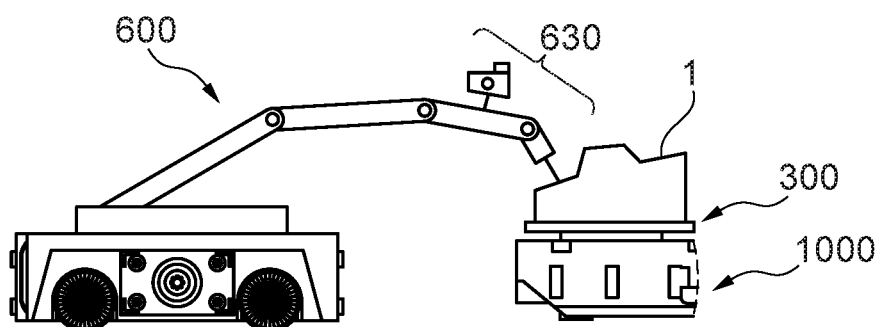
FIG. 25 schematically shows a further embodiment of the transport device according to the invention with an industrial robot and an attachment for post-processing components.

FIG. 25 schematically shows a further embodiment of the transport device 100 according to the invention with an industrial robot 600 and an attachment 630 for post-processing components 1 manufactured on a machine tool 1000 (here with pallet 300).

The attachment 630 may include a tool (e.g. a brush or a deburrer) with which the component can be post-processed automatically. Optical or sensor monitoring ensures the corresponding quality of the finished component 1 and checks whether further post-processing is necessary.

Figure 26:
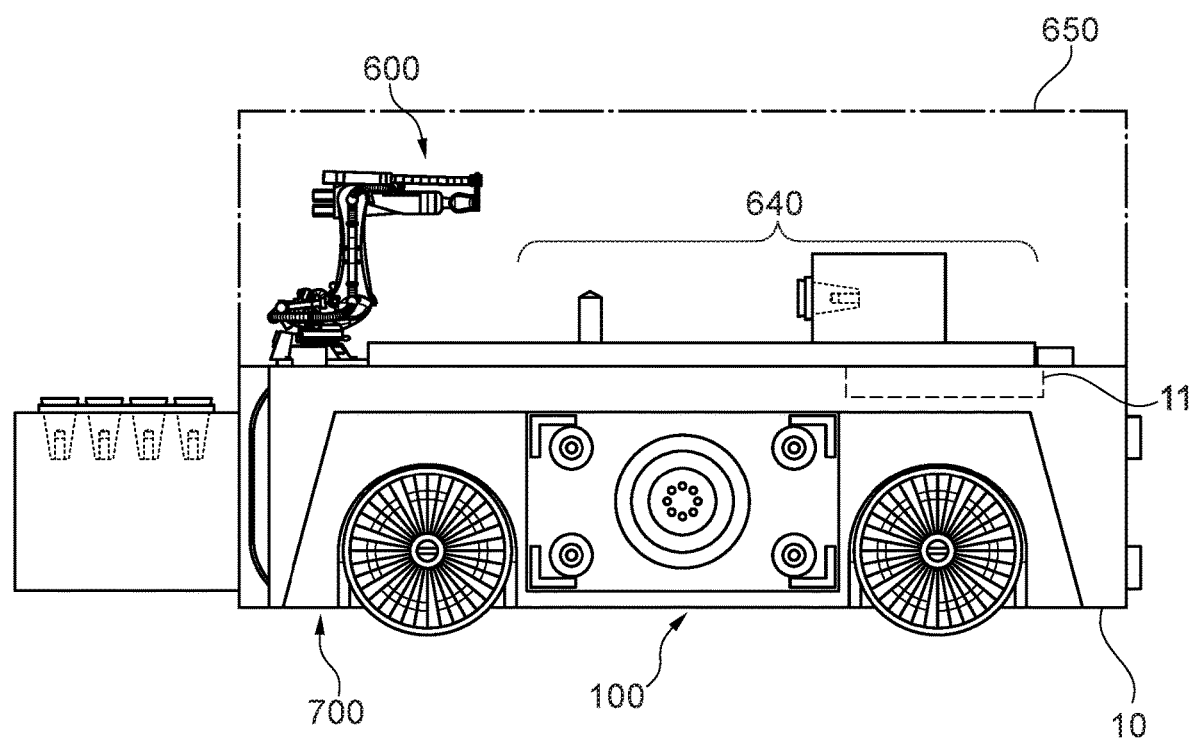
FIG. 26 schematically shows a further embodiment of the transport device according to the invention with an industrial robot and a unit for sharpening and dressing tools.

FIG. 26 schematically shows a further embodiment of the transport device 100 according to the invention with an industrial robot 600 and a unit 640 for sharpening and dressing tools.

In addition to the robot 600 and the unit 640 for sharpening and dressing tools, the transport device 100 also includes a protective enclosure 650 here with which the environment is protected from stirred up chips that result from the sharpening or dressing process. Advantageously, a flap (as indicated on the left side of the protective enclosure 650) may be provided through which the robot may reach and interact, for example, with a work spindle of a machine tool (both not shown here).

Since the sharpening and dressing process involves machining steps, it is advantageous if the chassis 10 also includes an internal cooling lubricant tank 11 in order to cool and lubricate the machining process, as is common for a machine tool, and thus reduce tool wear. Furthermore, it may be advantageous to also provide a module 700 with buffer spaces for storing tools on the transport device 100.

Figure 27:
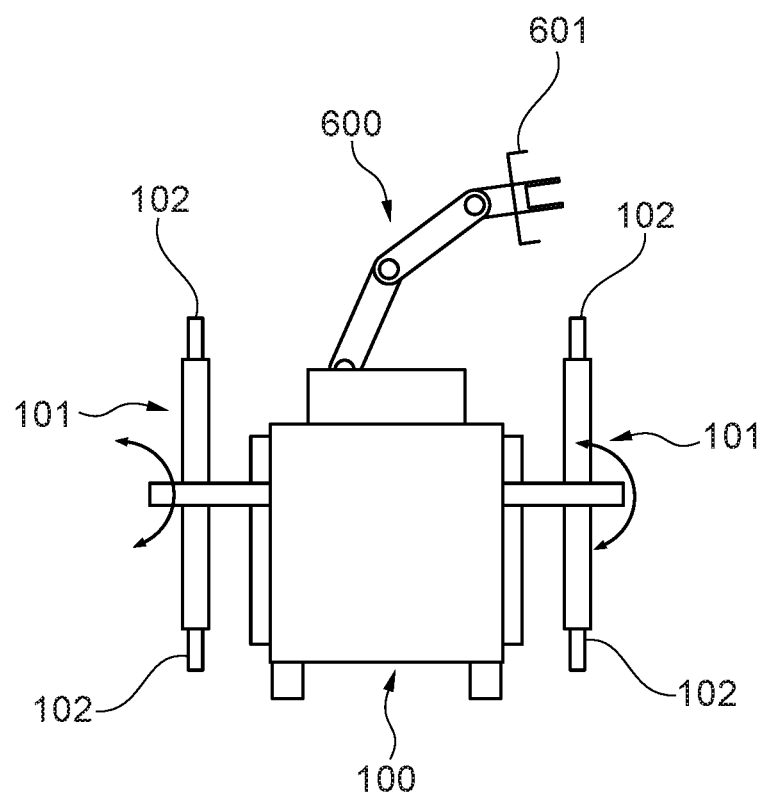
FIG. 27 schematically shows a further embodiment of the transport device according to the invention with an industrial robot and a magazine for carrying along various tools.

FIG. 27 schematically shows a further embodiment of the transport device 100 according to the invention with an industrial robot 600 and a magazine 101 for carrying along various tools 102.

In this way, tools 102 can be inserted directly into a work spindle of the machine tool (not shown here) or into the magazine 101. The magazine 101 may be configured as a wheel, tower, plate or chain magazine. However, further variants of magazines 101 may also be used.

In particular, instead of or in addition to a magazine 101 for depositing tools 102, tool pallets (not shown here) may also be received by the transport device 100 and used accordingly for a variety of applications.

It should be expressly pointed out here that one or more tool pallets may also be received by the transport device 100 and delivered to their destinations independently of the presence of an industrial robot 600.

Figure 28:
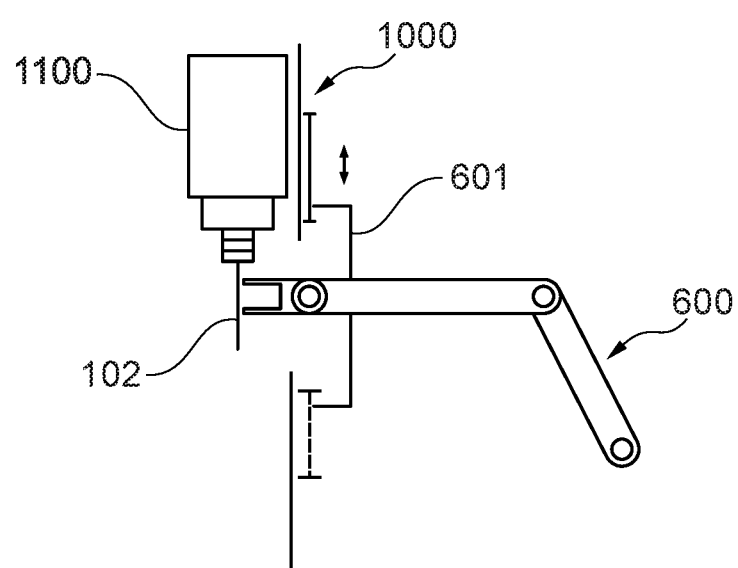
FIG. 28 schematically shows the embodiment of the transport device according to the invention in FIG. 21 during the interaction of the industrial robot with a work spindle of a machine tool, for example in order to exchange the tool.

In a particularly advantageous manner, the robot 600 may be provided with a closing plate 601 in order to ensure safety during a tool change on a work spindle 1100 of the machine tool 1000 (as shown in FIG. 28).

FIG. 28 schematically shows the embodiment of the transport device 100 according to the invention in FIG. 27 during the interaction of the industrial robot 600 with the work spindle 1100 of the machine tool 1000, for example in order to exchange the tool 102.

Here, the advantage the closure plate 601 offers for ensuring the safety of the machine tool 1000 during the tool exchange is shown once again.

FIG. 29 a schematically shows a further embodiment of the transport device 100 according to the invention for chip removal on a chip cart 1400 of a machine tool 1000.

A module 800 for collecting the chips is mounted on the transport device 100, the module 800 also having a tilting mechanism 810 for unloading the collected chips at a defined location.

The tilting mechanism may be configured in various ways. Both electrical and hydraulic or pneumatic drives may be provided. Furthermore, rack and pinion gears, screw gears or simply corresponding pneumatic or hydraulic lifting cylinders may be used to generate the tilting movement of the module 800. However, other drives/gears may also be used in various combinations with one another.

A further embodiment of the transport device 100 according to the invention with the module 800 for collecting the chips is shown in FIG. 29b, the transport device 100 here also being provided with a lifting mechanism 820 able to lift a chip container 825 filled with chips and empty it into the module 800. Here, the chip container 825 can now advantageously stay on the chip cart 1400 of the machine tool 1000 until it is filled appropriately and information is sent, for example to the central main computer control 2000, which then sends the transport device 100 with the module 800 and the lifting mechanism 820 to empty said chip container 825.

In addition, the transport device 100 may also be configured to couple an additional container cart 830 and to use it for collecting and transporting chips.

Figure 29C:
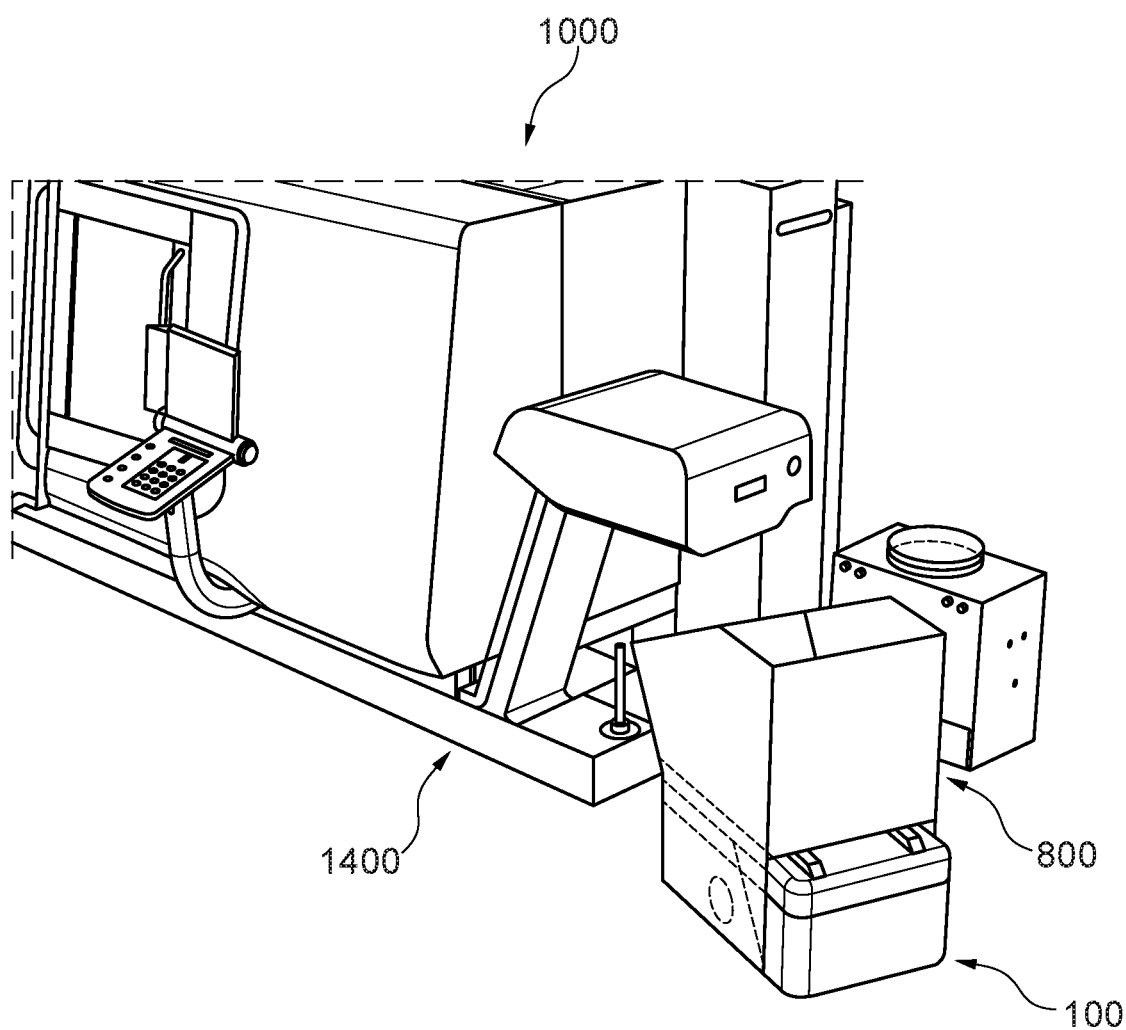
FIG. 29c schematically shows a further embodiment of the transport device, wherein the module for trapping the chips is received on the upper side of the transport device.

FIG. 29c shows a further embodiment of the transport device 100, wherein the module for collecting the chips 800, as already shown in FIGS. 29a and 29b, is received on the upper side of the transport device 100. Advantageously, the module 800 shown can be placed on a wide variety of chip carts/chip collectors 1400 by means of two setup portions on the side. If the chip cart 800 has been filled appropriately, the signal can be sent to the transport device 100 to receive the module 800 again and to deliver the chips to further treatment and/or disposal.

For the positioning of the module 800 on the chip cart 1400 by the transport device 100, for example, again conical receptacles 1051 present in/on the hall floor may be used. Furthermore, the conical receptacles 1051 may also have the properties already described in FIGS. 16a and 16c.

Figure 30:
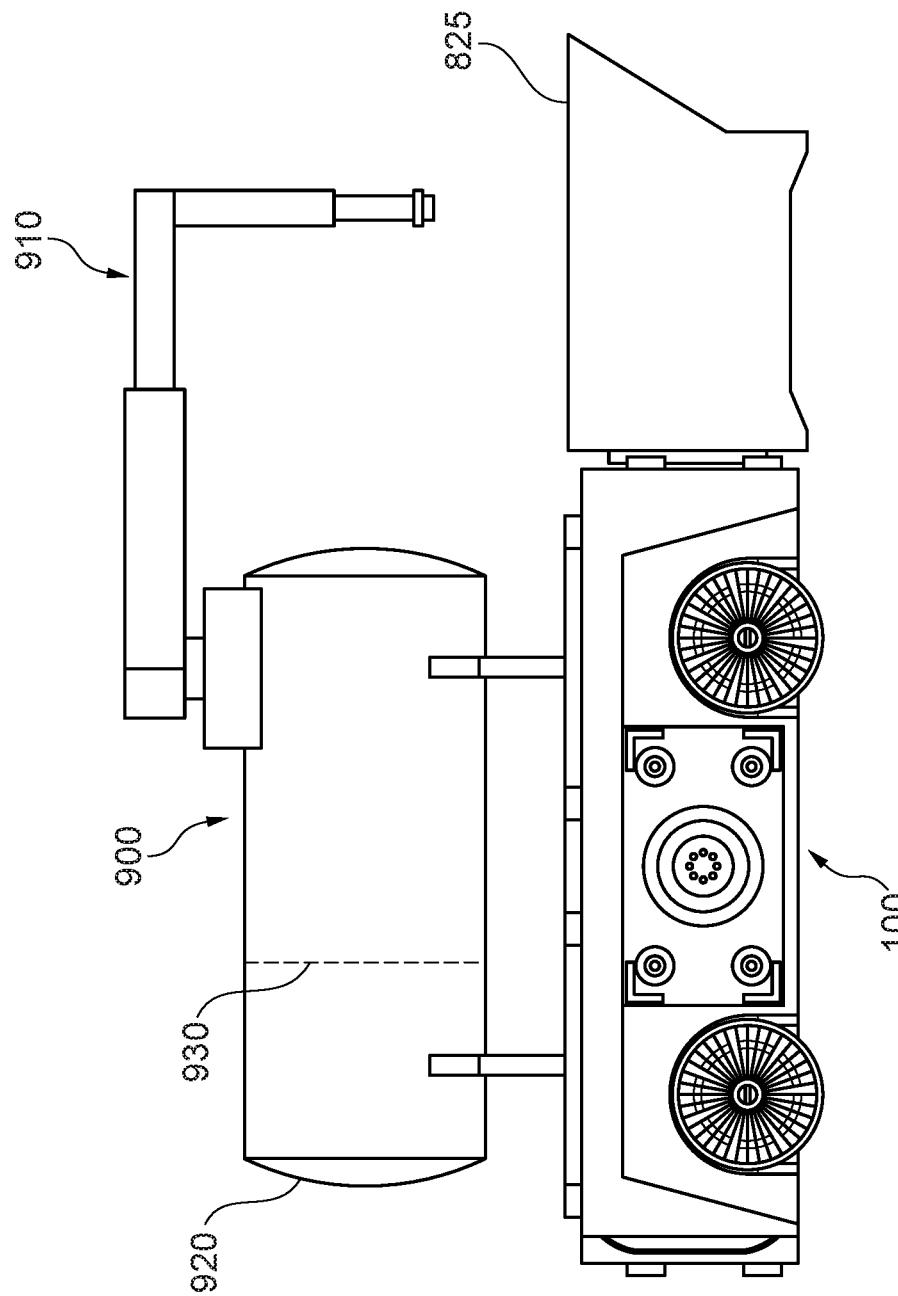
FIG. 30 schematically shows a further embodiment of the transport device according to the invention for conditioning and refilling a machine tool with cooling lubricant.

FIG. 30 schematically shows a further embodiment of the transport device 100 according to the invention for conditioning and refilling a machine tool 1000 with cooling lubricant.

Here, the transport device 100 includes a module 900 for collecting or sucking in the used cooling lubricant from the machine tool, wherein the module 900 may further include a tank 920 and a filter 930 for conditioning the used cooling lubricant. A suction device 910 may be connected directly to the machine tool 1000 and suck the used cooling lubricant into the tank 920. Furthermore, the suction device 910 may also be configured to suck cooling lubricant accumulated in the chip container 825 back out of the chip container 825 and deliver it to the conditioning.

Figure 31:
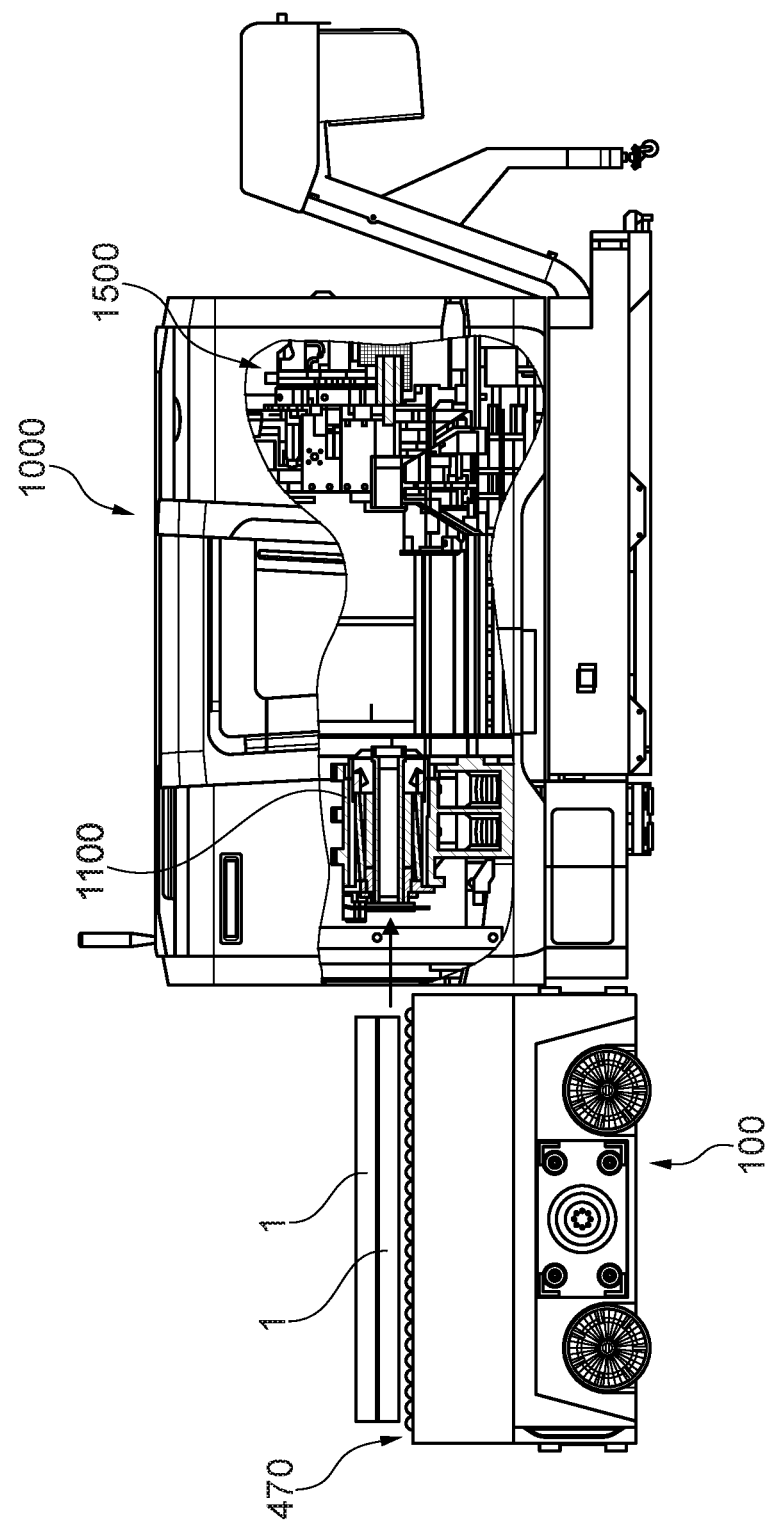
FIG. 31 schematically shows a further embodiment of the transport device according to the invention for delivering and inserting workpieces into a machine tool for turning.

FIG. 31 schematically shows a further embodiment of the transport device 100 according to the invention for delivering and inserting workpieces 1 into a machine tool 1000 for turning.

Here, the workpieces 1 may be bar material, for example, which is fed to the turning machine tool 1000 by a bar loader 470 received by the transport device 100.

For proper interaction of the bar loader 470 and the machine tool 1000, in particular the work spindle 1100, it is advisable again to position the transport device 100 by means of the already described conical receptacles 1051 (not shown here) provided at the corresponding point on the machine tool 1000.

This ensures that the bar material (workpieces 1) is correctly inserted into the machine tool 1000 or into the work spindle 1100 so that the automated manufacturing process can proceed smoothly.

As shown in FIG. 31, the machine tool 1000 may further be equipped with a tool turret 1500 which can deliver the tool necessary for the respective processing step to the rotating bar material. In addition, the conical receptacles 1051 may again have the options for establishing a connection for energy and/or signal transmission already described, so that the energy store 30 (not shown further here) of the transport device 100 is no longer burdened by the process of supplying material.

Figure 32A:
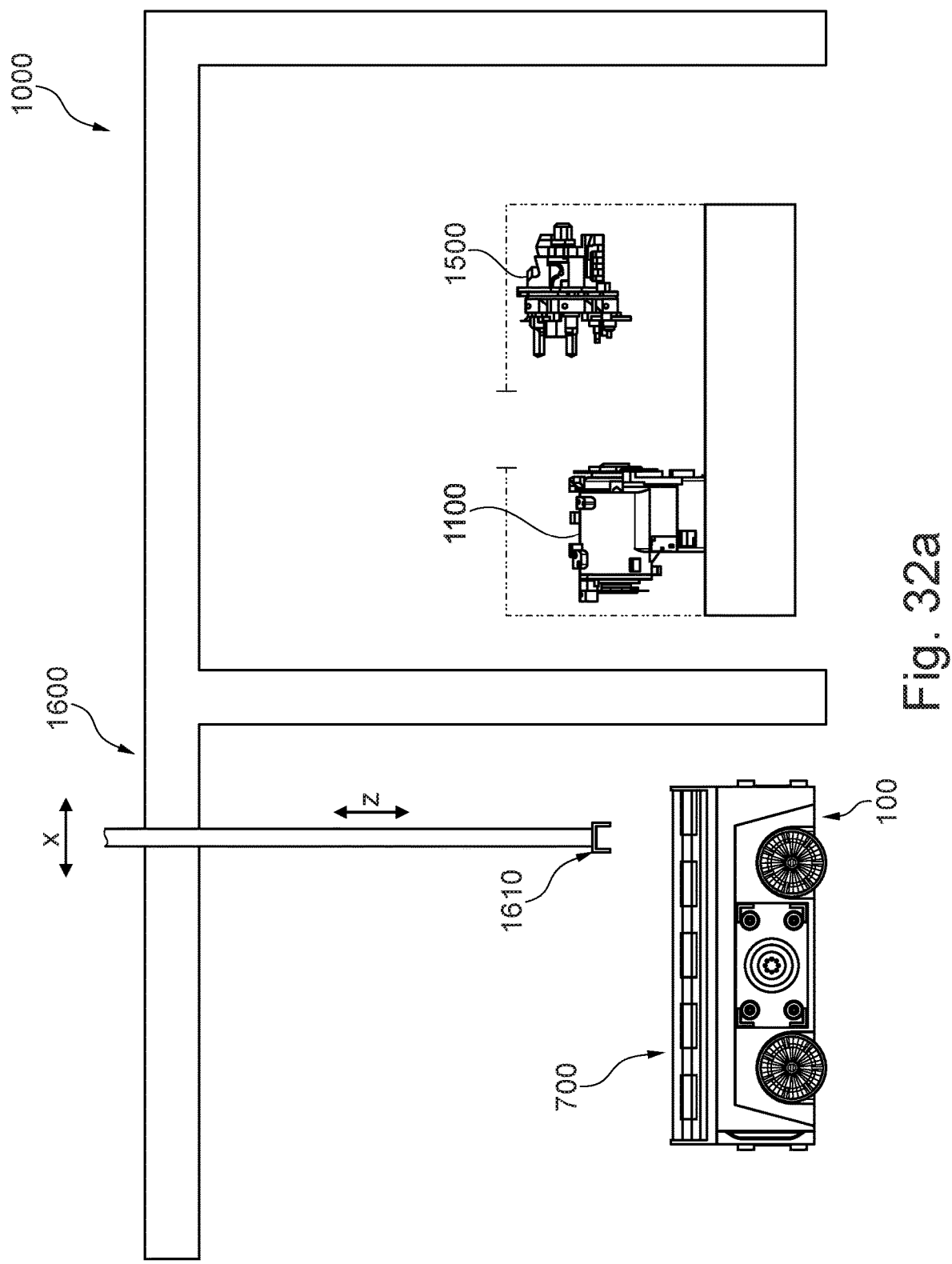
FIG. 32a schematically shows a further embodiment of the transport device according to the invention as a material store for a machine tool with a gantry loader.

FIG. 32a schematically shows a further embodiment of the transport device 100 according to the invention as a material store 700 for a machine tool 1000 with a gantry loader 1600.

Here, the material store 700 may be received by different receiving devices 40 of the transport device 100, which is to be clarified by the two transport devices shown. Furthermore, one of the transport devices 100 may also provide the unfinished parts to the machine tool 1000 or the gantry loader 1600, while the other transport device 100 receives the finished parts/workpieces.

With this configuration of the parts or material handling, the autonomous machine runtimes can be increased since the unfinished parts and/or the finished parts can now be transported automatically.

The gantry loader 1600 includes a gripper 1610 which, for example, can be moved along an x and a z direction and which feeds the unfinished parts to the work spindle 1100 until they are clamped in the workpiece receptacle of the work spindle 1100. Here, too, a tool turret 1500 may again deliver the tool required for the current processing step to the unfinished part/workpiece.

However, this embodiment of the transport device 100 is not only suitable for turning machines, but may also be used for known milling machines.

Furthermore, this embodiment of the transport device 100 is particularly advantageous in that a large part of the gantry loaders that are already used on a machine tool 1000 can be adapted to the transport devices 100 for material handling without great effort.

Figure 32B:
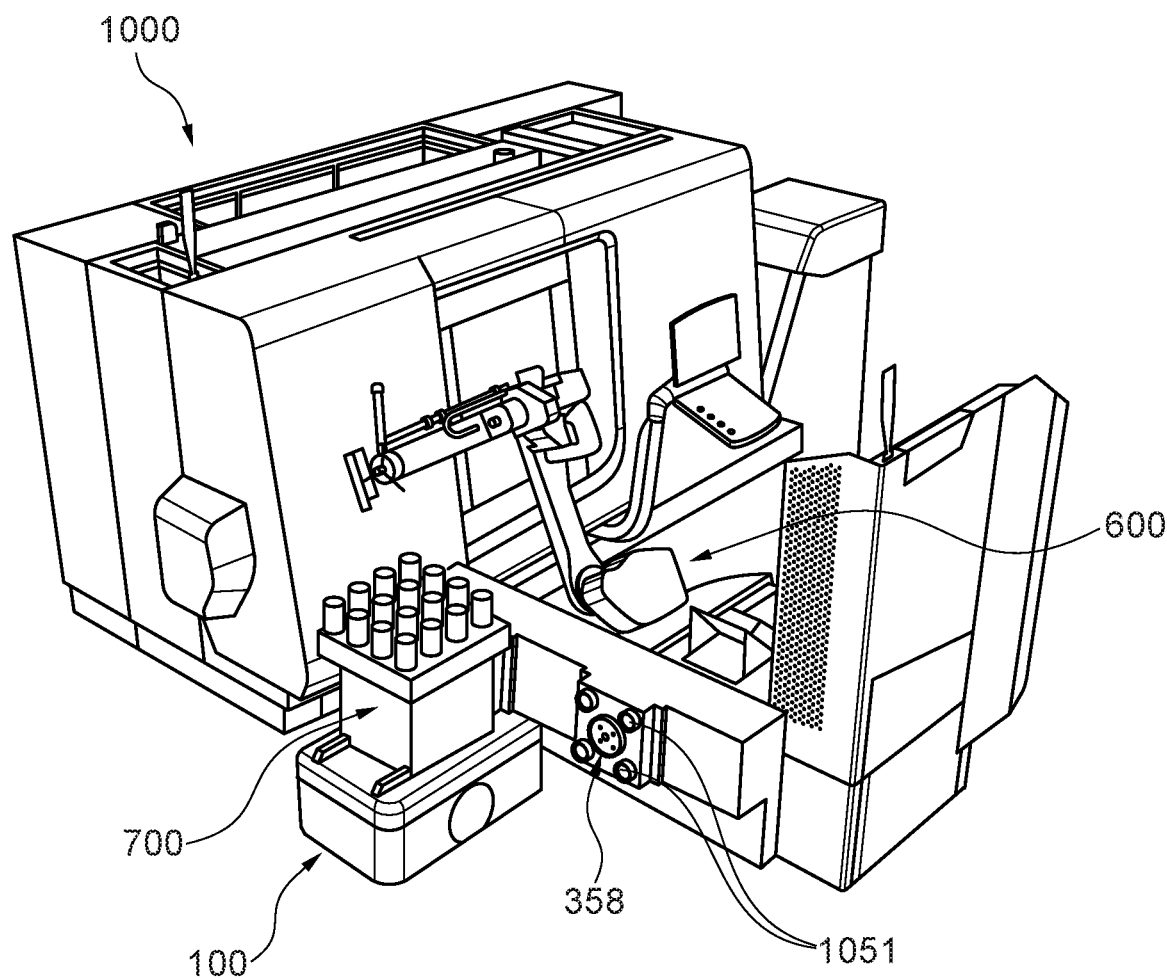
FIG. 32b schematically shows a further embodiment of the transport device according to the invention as a material store for a machine tool with a robot for exchanging workpieces in the machine tool.

FIG. 32b shows a further embodiment of the transport device 100 according to the invention as a material store 700 for a machine tool 1000 with a robot 600 for exchanging workpieces in the machine tool 1000.

As already described in FIG. 16c, the transport device 100 may dock here with the handling device or, in this case, with a module 700 received by the transport device 100 (here store for unfinished material) on the machine tool 1000 (by means of the conical receptacles 1051 and the interface 358).

Furthermore, the transport device 100 can now, if necessary, first "deposit" the material store 700 on the machine tool 1000 in order to be available for other tasks. Only when the unfinished material stored in the material store 700 has been used up, the transport device 100 would have to come back and receive the module 700 again and transport it away accordingly.

For this purpose, the machine tool 1000 advantageously has at least one, but particularly advantageously at least two docking stations. Thus, the transport device 100 may dock a new material store 700 filled with unfinished parts on the machine tool 1000 and then receive an emptied material store 700 from the other docking station and transport it away accordingly.

However, the concept of the machine tool 1000 shown here is not limited to the robot 600 being arranged outside of the machine tool 1000; rather, the robot 600 may also be provided in the work space of the machine tool 1000 and, if necessary, reach out of the machine tool 1000 into the docked material store 700 for a new unfinished part. However, completely different machine concepts can also be supplied with the transport device 100 with the material store 700 (or another module 700).

Figure 33A:
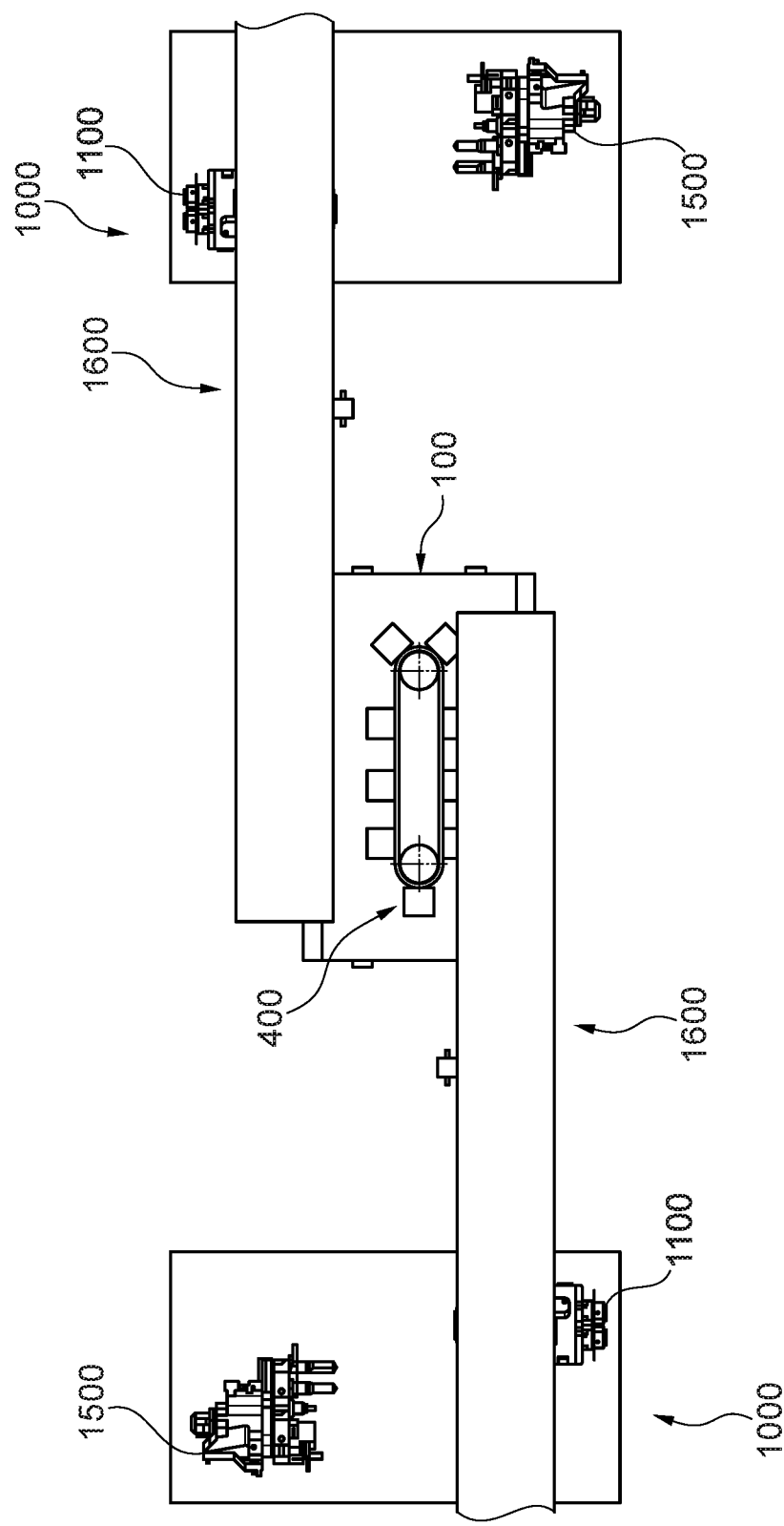
FIG. 33a schematically shows a further embodiment of the transport device according to the invention as a conveyor belt between two machine tools with gantry loader.

FIG. 33a schematically shows a further embodiment of the transport device 100 according to the invention with a conveyor belt 400 between two machine tools 1000 with gantry loaders 1600. Furthermore, the two machine tools 1000 each include, for example, a work spindle 1100 and a tool turret 1500.

Here, the conveyor belt 400 received by the transport device 100 may further be provided with receptacles for components or workpieces (see, for example, the detailed illustration in FIG. 33b). In addition, it is particularly advantageous that the transport device 100 with the conveyor belt 400 can be used as a "stand-alone" unit, for example in order to exchange unfinished parts or workpieces already machined between two machine tools 1000. Furthermore, it is possible for the conveyor belt to hold certain areas ready for setup (setup stations) through which the conveyor belt 400 can be equipped with unfinished parts/machined workpieces.

In addition, it may be particularly advantageous that the conveyor belt 400 can be lined up (folded) at the transport device 100 by a corresponding mechanism (not shown further here) (see for example FIG. 33c), for example in order to bridge larger distances. For this purpose, a plurality of transport devices 100 may then also be provided with conveyor belts 400 arranged in series in order, for example, to establish a type of conveyor bridge.

Furthermore, it should be pointed out here that the embodiment of the conveyor belt 400 is not limited exclusively to the embodiment shown. Rather, a type of conveyor chain or the like may also be used instead of a conveyor belt.

Furthermore, it may also be possible for the conveyor belt 400 to be rotatably mounted with respect to the transport device 100, which has received and transported the conveyor belt, so that an alignment of the conveyor belt 400 for the respective purpose can take place separately from the positioning of the transport device 100 (see FIG. 33c). This allowed for an increased flexibility for the use of the conveyor belt 400 to be achieved.

Figure 34:
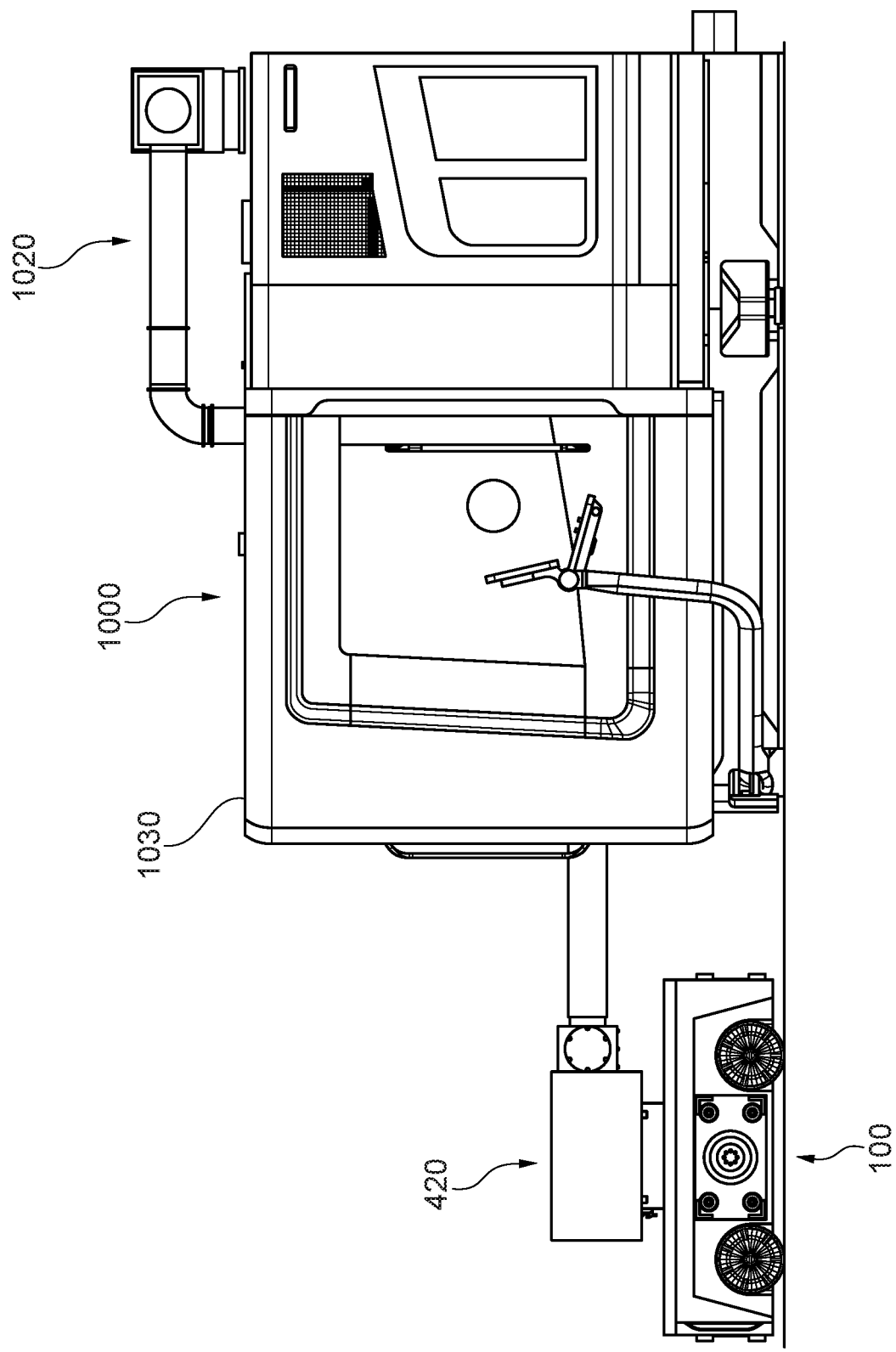
FIG. 34 schematically shows a further embodiment of the transport device according to the invention for the auxiliary suction of the work space of a machine tool.

FIG. 34 schematically shows a further embodiment of the transport device 100 according to the invention for the auxiliary suction 420 of the work space of a machine tool 1000.

For this purpose, it is advantageous that the transport device 100 can receive a corresponding suction 420 and can position itself accordingly at an access in the housing 1030 of the machine tool 1000 in order to suck off dirt and impurities generated before, during and after machining a workpiece.

The suction 420 is primarily intended to support the standard suction 1020 that is often already present in a machine tool 1000. However, should the latter be defective or not even present, the suction 420 can replace it. The sucked off and collected dirt may be stored in a container and emptied if necessary.

Figure 35:
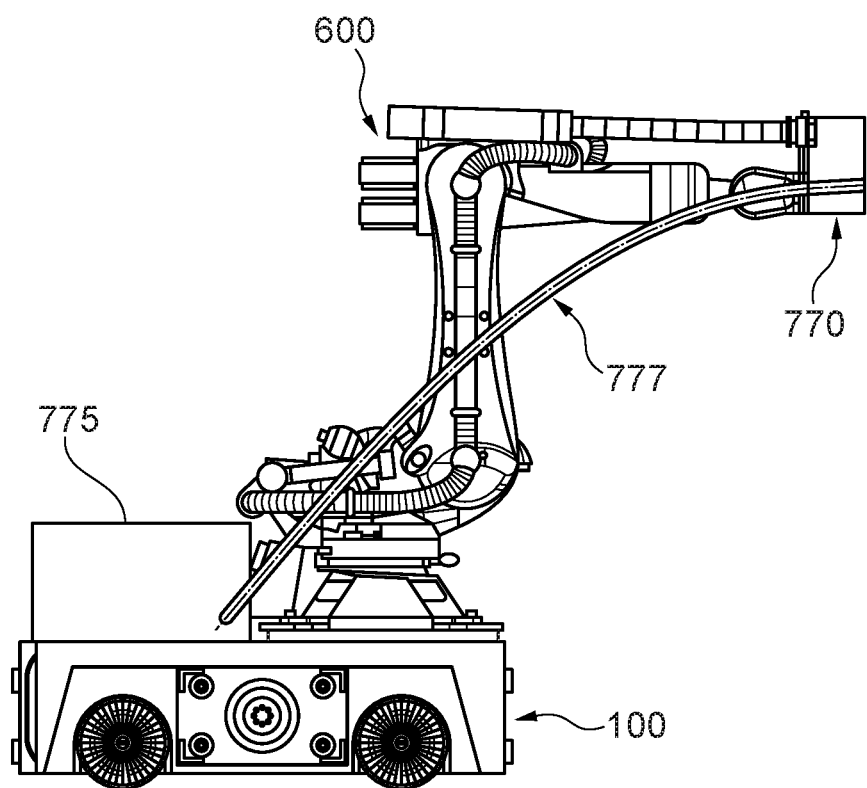
FIG. 35 schematically shows a further embodiment of the transport device according to the invention with a robot and an application device for additive manufacturing received by the robot.

FIG. 35 schematically shows a further embodiment of the transport device 100 according to the invention with a robot 600 and an application device 770 received by the robot 600.

Using the application device 770, a component/workpiece can now be additively manufactured on a machine tool 1000, for example, since the application device 770 is configured for deposition welding (or another additive manufacturing method), for example. For this purpose, the transport device 100 may, for example, also receive a powder or media tank 775 storing the material to be applied (for example metal powder, etc.). A feed or suction 777 between the powder or media tank 775 and the application device 770 ensures that material is guided from the powder or media tank 775 to the application device 770 or that excess material is sucked off again during the manufacturing process and fed to the powder or media tank 775.

The advantage of mobile additive manufacturing is that essentially every machine tool 1000 can be expanded by such additive manufacturing without the corresponding machine tool 1000 having to be converted. Furthermore, for additive manufacturing, the machine cabin and/or suction already present on the machine tool 1000 may advantageously be used as protection for the manufacturing process and for the operator.

It should be noted, however, that a machine tool 1000 does not necessarily have to be present in order for mobile additive manufacturing to be usable. For example, the application device 770 may additively manufacture the desired component/workpiece on any base or in any environment. Or the transport device 100 may move to the workpiece/component that is already present and machine it in place using the application device 770 received.

As already described above, cones 1051 (not shown here) could for example again be used to optimally position the transport device 100 at the machine tool 1000 or at the component/workpiece in order to ensure quality manufacture.

Figure 36:
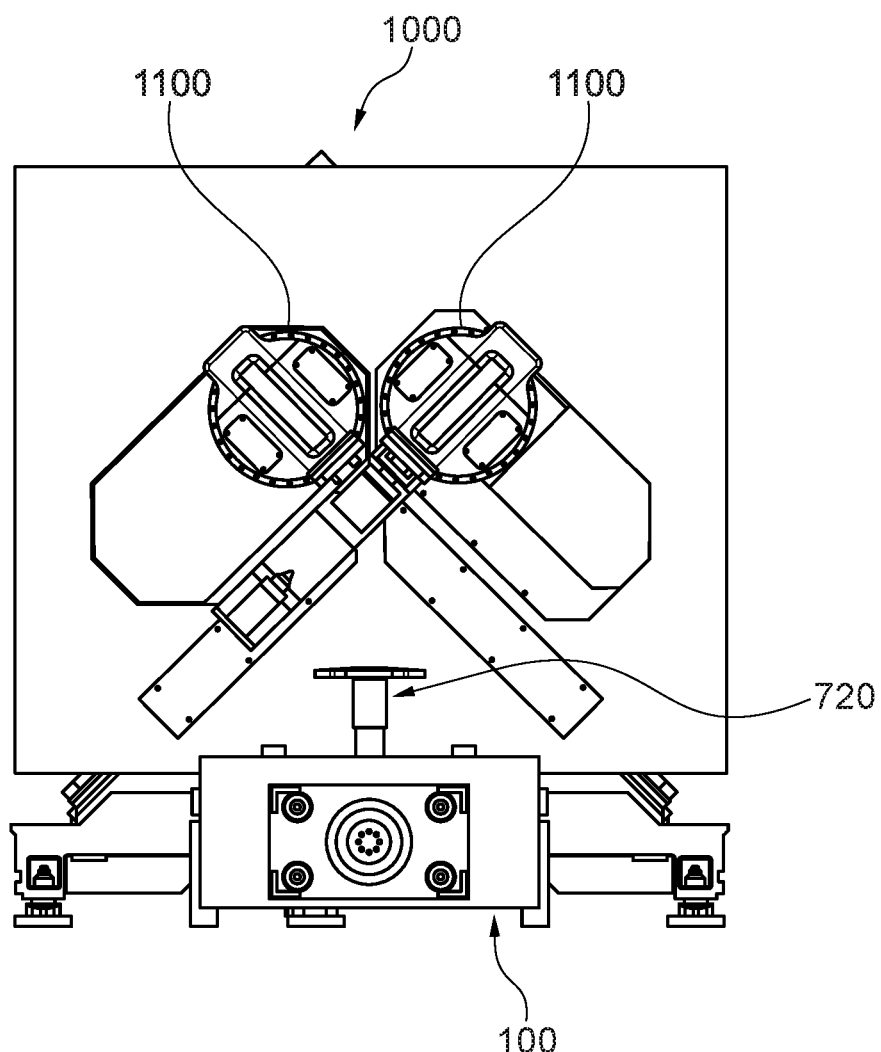
FIG. 36 schematically shows a further embodiment of the transport device according to the invention with a tool changer, a changer-storage combination ora tool store.

FIG. 36 schematically shows a further embodiment of the transport device 100 according to the invention with a tool changer 720.

Here, for example, the transport device 100 may approach the machine tool 1000, in particular the work spindle 1100, with a tool received in the tool changer 720 and carry out the tool exchange there by rotating the tool changer 720.

Furthermore, instead of the tool changer 720, a changer-storage combination 720 may also be transported by the transport device 100 to the machine tool 1000. The advantage is that this changer-storage combination 720 has a significantly larger capacity for receiving tools than a simple tool changer such as a fork gripper or a hook gripper.

Now, if the changer-storage combination 720 is positioned in front of the machine tool 1000 or the work spindle 1100, the work spindle 1100 can remove the desired tool from the changer-storage combination 720 (for example a chain magazine or wheel magazine with corresponding drives), the changer-storage combination 720 being able to accelerate or simplify the tool change, for example by rotating the desired tool with respect to the work spindle 1100.

However, the transport device 100 may only have a tool store 720 (for example as a chain magazine, wheel magazine or shelf magazine etc.) which is transported to the machine tool 1000 and from which the work spindle 1100 of the machine tool 1000 may independently pick up the desired tool.

Furthermore, the above options may also be combined with one another so that, for example, a transport device 100 with a tool store 720 along with a transport device 100 with a tool changer 720 are positioned in front of the machine tool 1000 and perform the tool exchange at the machine tool 1000 in cooperation with one another.

Furthermore, the above-mentioned options are not restricted to tools since, for example, instead of the tools, workpieces or tools and workpieces may be stored and/or exchanged at the same time.

Figure 37:
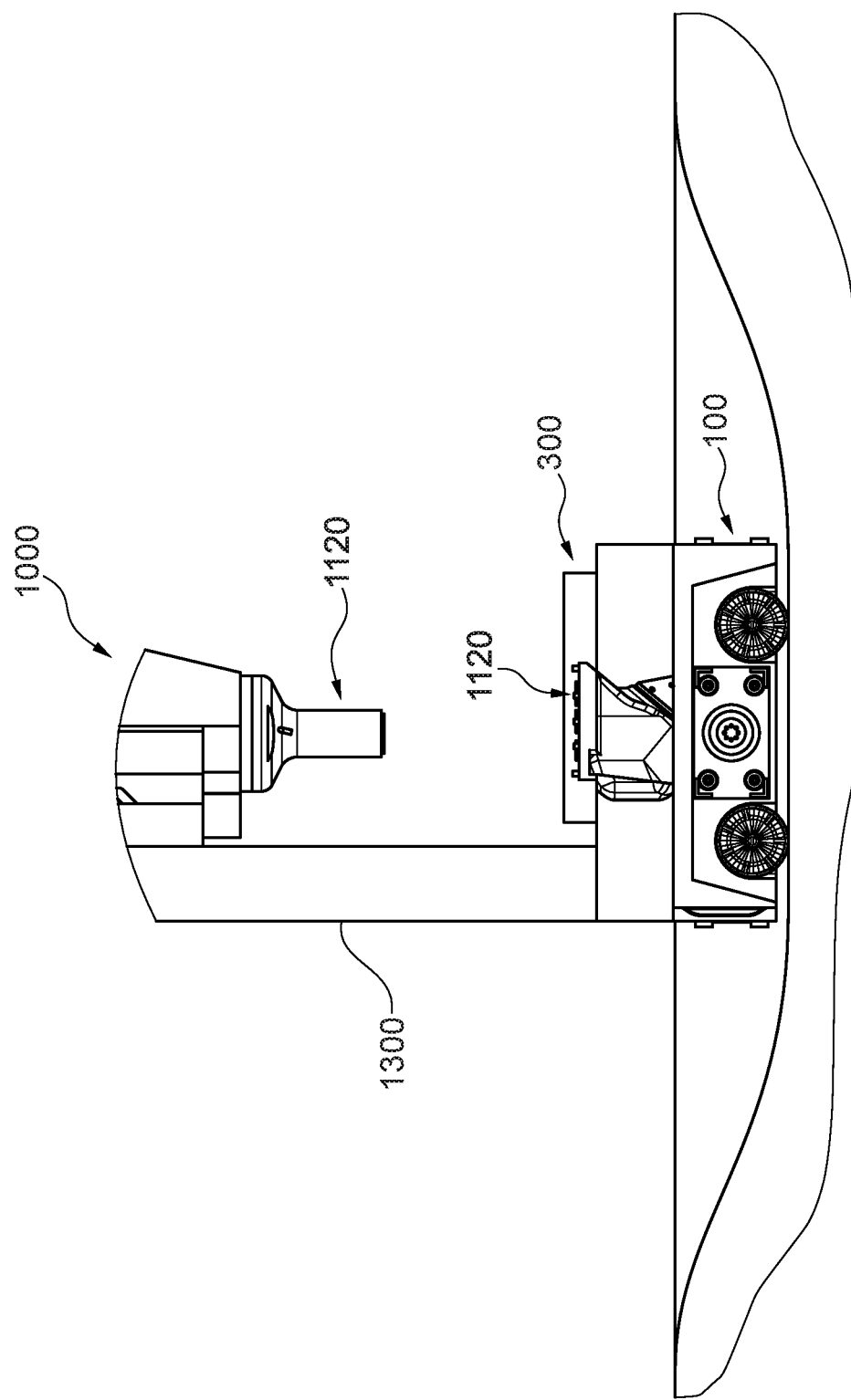
FIG. 37 schematically shows a further embodiment of the transport device according to the invention for transporting milling heads to a machine tool.

FIG. 37 schematically shows a further embodiment of the transport device 100 according to the invention for transporting milling heads 1120 to a machine tool 1000 with stand element 1300 and pallet 300 (but may also be designed as a machine table).

Here, it is particularly advantageous that the milling heads 1120 can be transported quickly and easily to the respective machine tool 1000 due to the flexibility of the transport devices 100. Where previously a terminus station was required in order to provide the milling heads 1120 appropriately, the milling heads can be "ordered" by means of the transport devices 100 in conjunction with the main computer control 2000 (not shown here) and then arrive by transport unit 100 at their respective location of usage. A terminus station is thus completely superfluous.

In addition, this configuration of the transport devices 100 allows for milling heads 1120, in particular special milling heads, to be exchanged between all machine tools 1000 with a head interface. In addition, the respective milling heads do not need to be purchased multiple times, ensuring a high potential for cost savings.

For example, the transport devices 100 may pass under the machine tool 1000 in order to bring the milling heads 1120 to their desired location, but other ways of delivering the milling heads 1120 to the machine tool 1000 may also be chosen.

Figure 38:
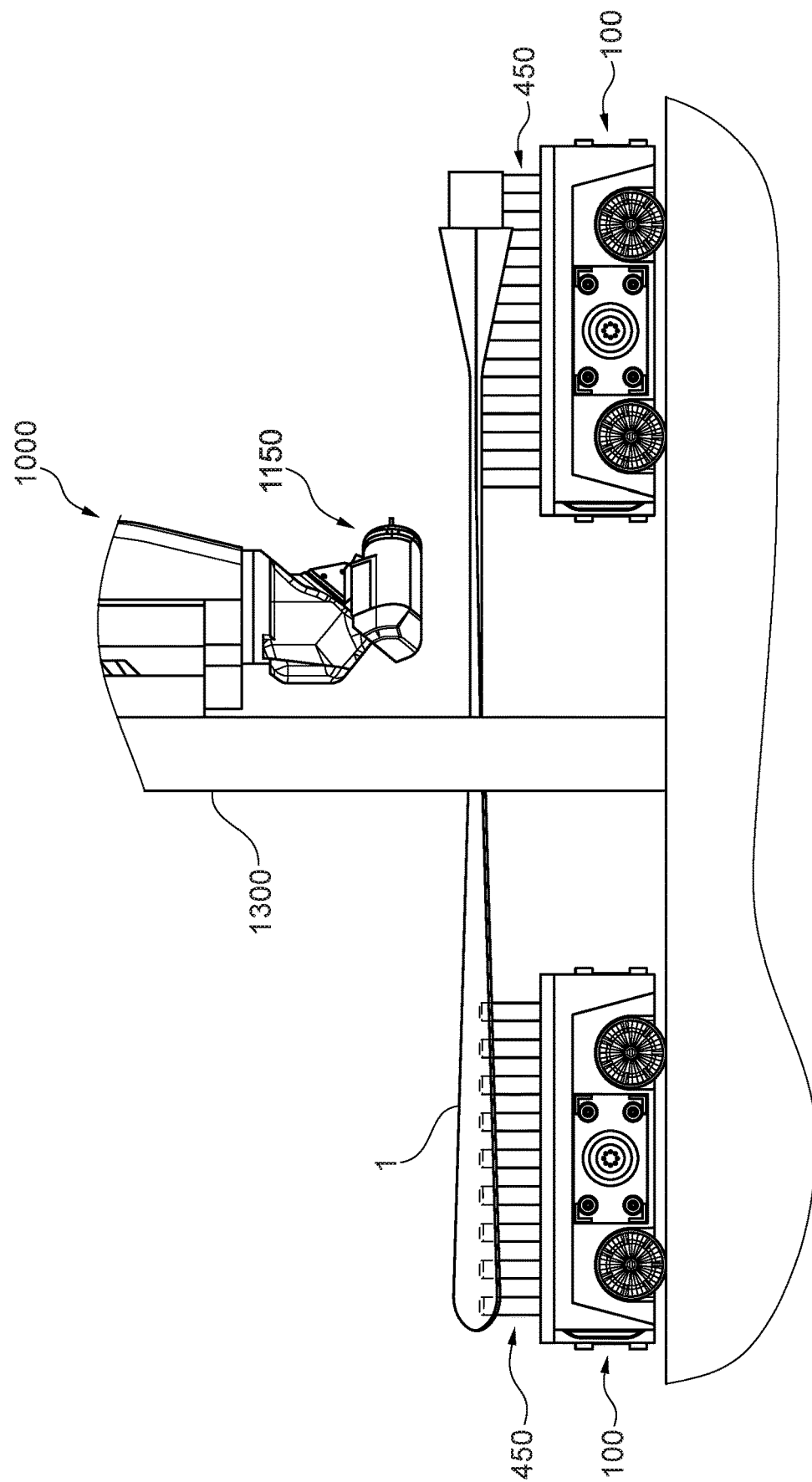
FIG. 38 schematically shows a further embodiment of the transport device according to the invention with a workpiece receptacle for large parts.

FIG. 38 schematically shows a further embodiment of the transport device 100 according to the invention with a workpiece receptacle 450 for large parts.

Here, a plurality of transport devices 100 may cooperate again in order to transport the large parts (here marked as workpiece 1) appropriately. For this purpose, the workpiece receptacles 450 may be equipped with clamping devices (hydraulic, pneumatic, vacuum, mechanical clamps, etc.) by which the large parts are held on the transport devices 100 and are fed to a processing machine configured for this purpose (machine tool 1000, here with stand elements 1300 and a grinding attachment 1150).

In addition, as already described, conical receptacles 1051 (not shown here) may, in addition to positioning the transport devices 100 under the grinding attachment 1150 of the machine tool 1000, again enable a connection for the transmission of energy and/or (control) signals from the machine tool 1000 to the transport device 100.

By using the workpiece receptacle 450, the transport devices 100 combine the concept of a workpiece changing device with a machining table to form a type of modular machine tool 1000 in order to make the processing of large parts as efficient and flexible as possible.

FIG. 39 schematically shows a further embodiment of the transport device 100 according to the invention as a component of various machine concepts of a (modular) machine tool 1000.

It is particularly advantageous here if the transport device 100 receives a pallet 300 and can then be used directly as a workpiece or machine table carrier in a machine tool 1000.

Figure 44:
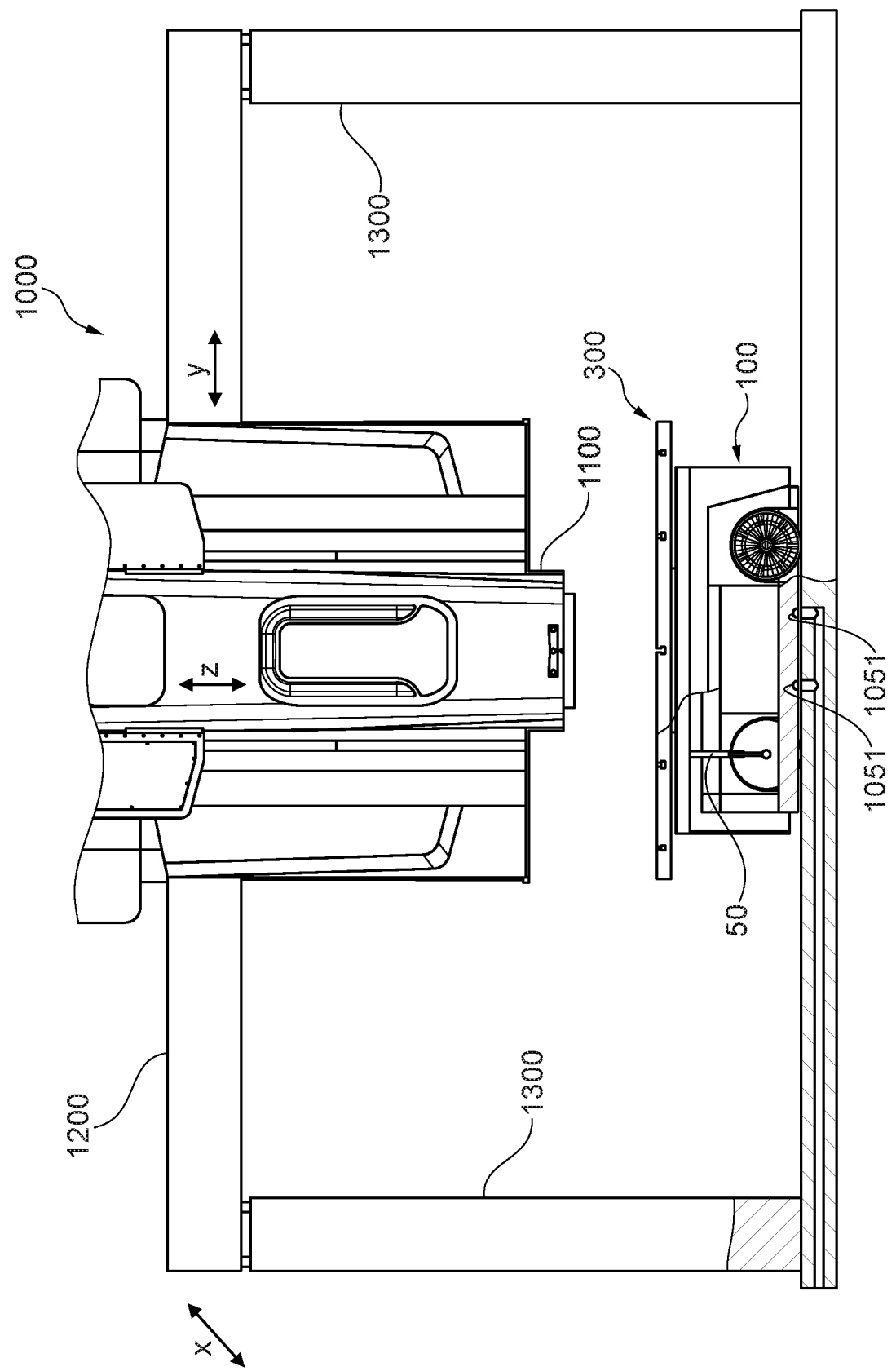
FIG. 44 schematically shows a further embodiment of the transport device according to the invention during positioning and establishment of energy and/or signal connection below a machine tool in gantry design.

The advantages herein are that the cones used for positioning and fixing (conical receptacles, e.g. like the conical receptacles 1051 already described) allow the transport device 100 to be used directly as a workpiece or machine table carrier (cf. also FIG. 44). A machine tool 1000 can thus be equipped without a machine table of its own.

As a workpiece carrier, the transport device 100 may thus move to a plurality of machine tools 1000 sequentially and carry out the respective processing (e.g. milling, grinding, . . . ) without reclamping and thus without a loss of accuracy.

Measurement processes on the workpiece can thus be carried out directly in the clamping situation given. The transport device 100 can travel together with the workpiece into the measuring room (e.g. a coordinate measuring machine or the like). This eliminates any tensioning or warping by opening the workpiece clamp.

This allows for completely new machine concepts, as illustrated schematically by way of example with a console machine (FIG. 40a) and a portal machine (FIG. 39).

Figure 40A:
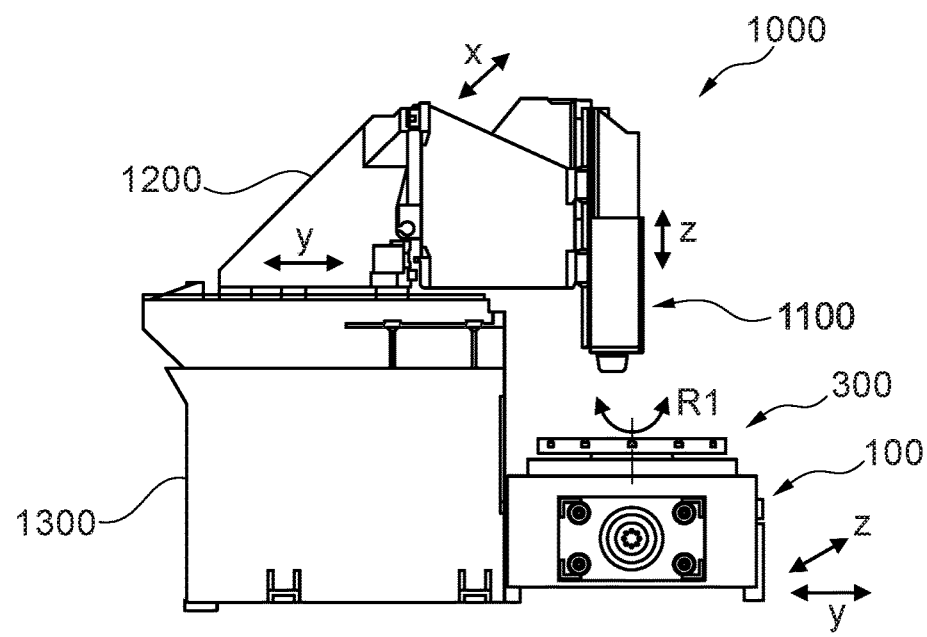
FIG. 40a schematically shows an embodiment of the transport device according to the invention with a pallet received on a console machine.

FIG. 40a schematically shows an embodiment of the transport device 100 according to the invention with a received pallet 300 on a console machine as a (modular) machine tool 1000.

The pallet 300 received by the transport device 100 may be provided with an additional axis (see console machine; here a rotation axis R1) in order to optionally create a milling-turning machine concept.

Furthermore, the connection of the transport device 100 and the pallet 300 (here with an additional axis of rotation R1) may be designed as a milling table, NC rotary table, swiveling rotary table, milling rotary table or the like and thus used for a wide variety of workpiece machining applications.

In the example shown, also a console—type machine tool 1000 is used which includes, in addition to a stand element 1300 and a transverse element 1200, a work spindle 1100, the work spindle 1100 being movable in the x, y and z directions relative to the stand element. In addition, the transport device 100 may be moved in the x and y directions and the pallet 300 may rotate about the z axis via the axis of rotation R1. Furthermore, the console machine may also be expanded by an additional axis of rotation R2, as is described in FIG. 40b.

Figure 40B:
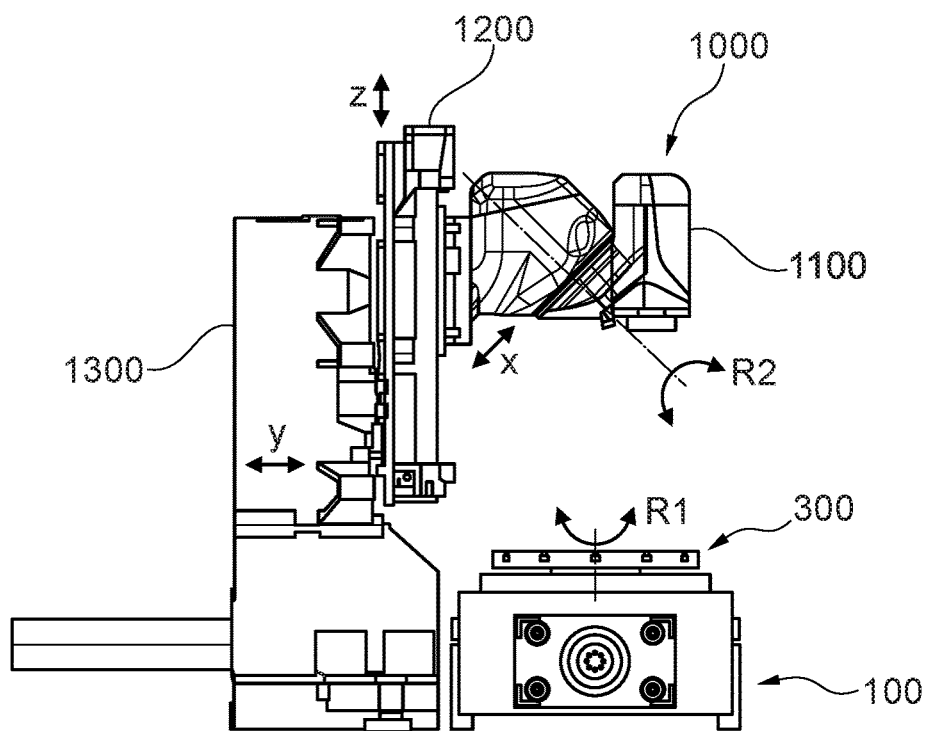
FIG. 40b schematically shows a further embodiment of the transport device according to the invention as part of various further machine concepts of a machine tool.

FIG. 40b schematically shows a further embodiment of the transport device 100 according to the invention as a component of various further machine concepts of a (modular) machine tool 1000.

Figure 40C:
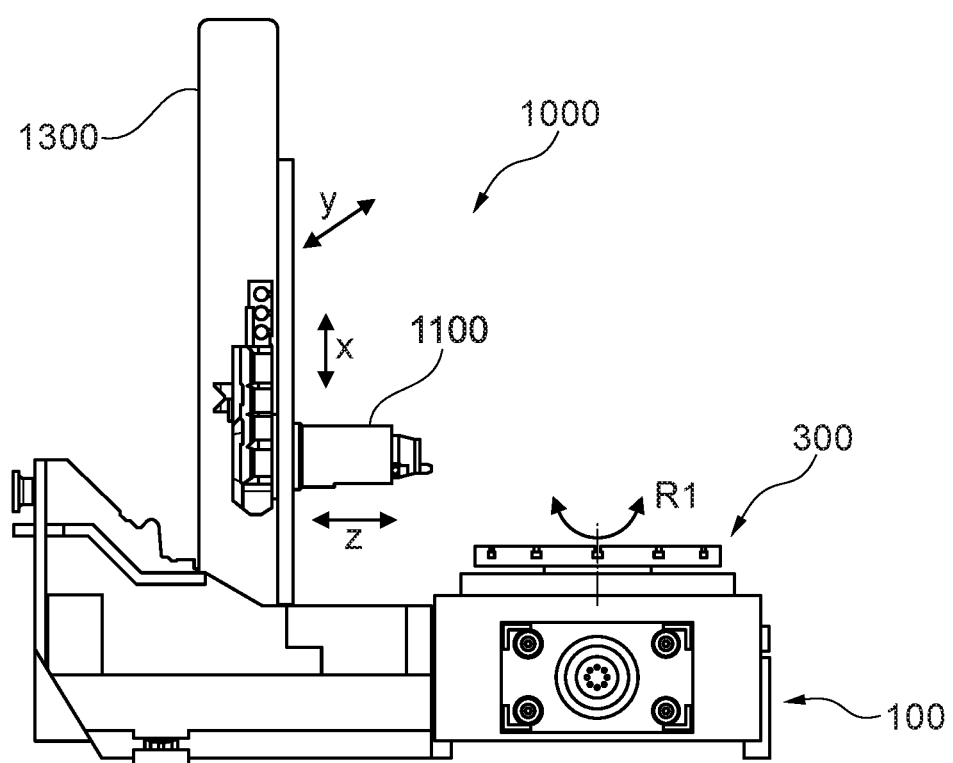
FIG. 40c schematically shows a further embodiment of the transport device according to the invention as part of various further machine concepts of a machine tool.

As already explained with reference to the concepts in FIGS. 39 and 40a, a console machine may be provided with an additional axis of rotation R2 on the work spindle 1100 in order to change the position of the work spindle 1100 with respect to the pallet 300 or to the transport device 100 by 90° by pivoting the work spindle 1100 by 180° about the axis of rotation R2. This is advantageously possible because the axis of rotation R2 and the plane/surface of the pallet 300 essentially are at a 45° angle to one another. Furthermore, as shown in FIG. 40c, an application of the transport device 100 in a horizontal machining center may also be conceivable, wherein this may also be expanded by an additional axis of rotation R2 (not shown here) as seen on the console machine in FIG. 40a, so that the work spindle 1100 of the horizontal machining center can also be pivoted by 90° to the pallet 300 or to the transport device 100 if necessary.

In both cases, the transport device 100 with a pallet 300 (in FIGS. 40b and 40c each with a rotation axis R1) is again configured as a "machine table", with the machine table also being usable as a rotary table due to the rotation axis R1, if necessary, to ensure even greater flexibility of the transport device 100 equipped with the pallet 300. As a result, the transport device 100 can again approach and leave a processing station after the other so that corresponding processing steps can be carried out on the workpiece 1 (not shown here) at the respective processing station.

In both diagrams (FIGS. 40b and 40c), the work spindles 1100 are again delivered via the linear axes in the x, y and z directions to the pallet 300 or to the transport device 100.

Figure 41:
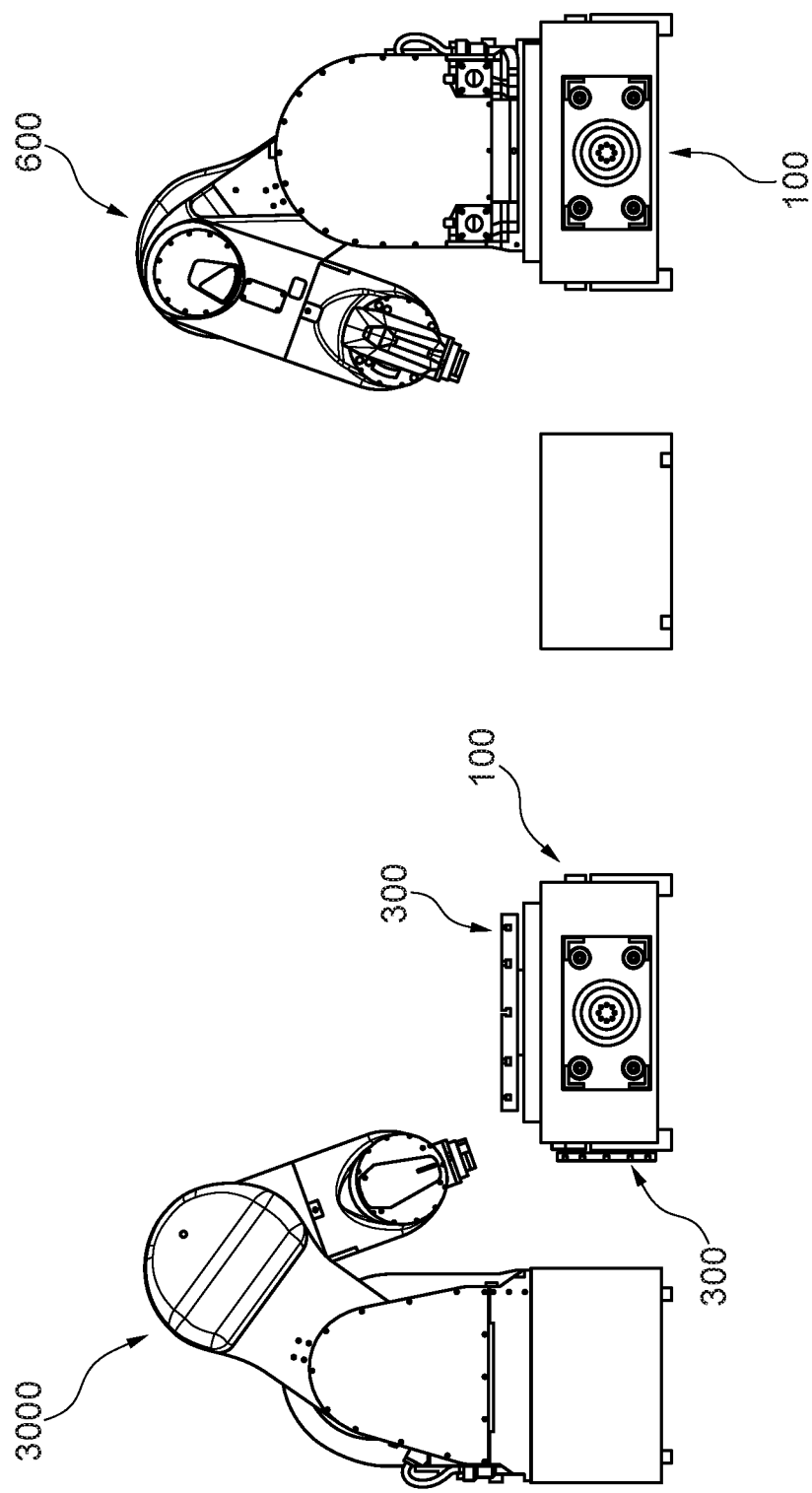
FIG. 41 schematically shows a further embodiment of the transport device according to the invention carrying a plurality of pallets or workpieces in interaction with a stationary industrial robot for handling the workpieces (on the left) and a further embodiment of the transport device according to the invention with a milling robot (on the right).

FIG. 41 schematically shows a further embodiment of the transport device 100 according to the invention carrying a plurality of pallets 300 or workpieces in interaction with a stationary industrial robot 3000 for handling/processing the workpieces (on the left) and a further embodiment of the transport device 100 according to the invention with a milling robot 600 (on the right).

The stationary industrial robot 3000 shown in the left image may also be replaced by a transport device 100 equipped with a corresponding robot 600 as an attachment, and thus the flexibility of the production processes increases further. In both cases (stationary industrial robot 3000 or transport device 100 with robot 600) the workpieces on the pallets 300 of the right transport device 100 are processed or handled by the robot.

The milling robot 600 shown in the image on the right can be moved to and be available at a large number of processing stations within a very short time thanks to its movability with the aid of the transport device 100 (e.g. to support additional milling work when milling a workpiece in a machine tool or to carry out the milling work entirely on its own). Moreover, the mobile milling robot 600 may also be used to machine components, the size of which could hardly or not at all be accommodated in a machine tool, so that the component does not have to be brought to the processing machine, but the processing machine comes to the component. This also increases the flexibility in the production processes.

Figure 42:
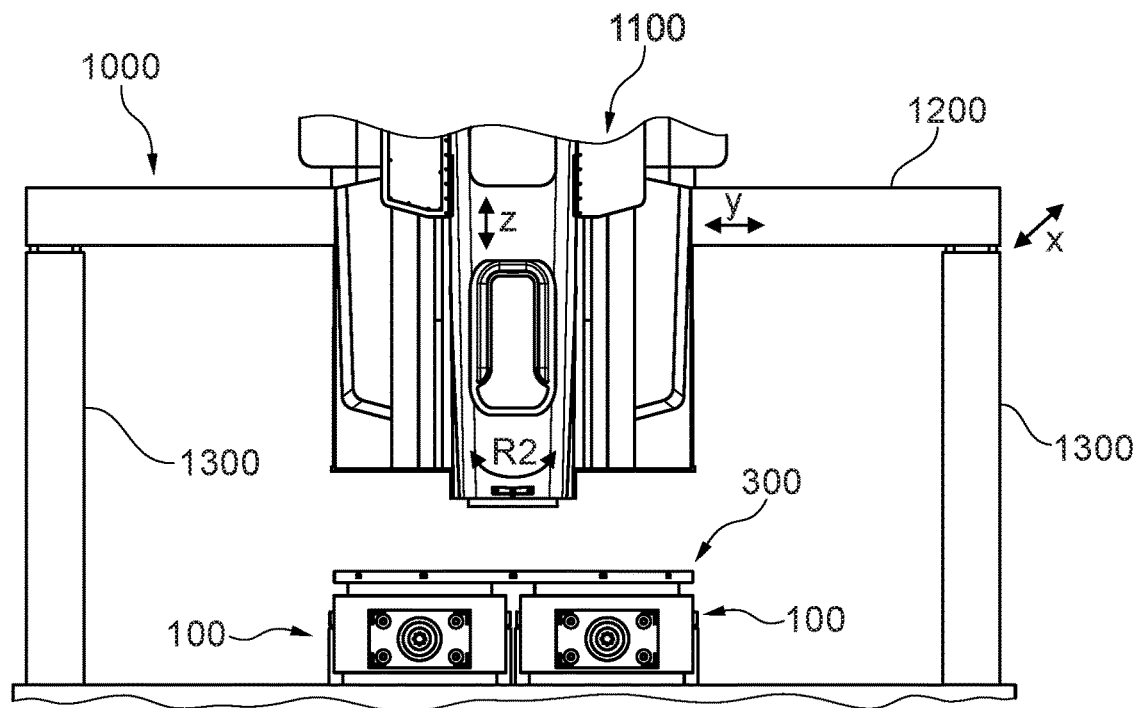
FIG. 42 schematically shows a further embodiment of the transport device according to the invention as part of a machine concept of a machine tool with a gantry design and a plurality of transport devices.

FIG. 42 schematically shows a further embodiment of the transport device 100 according to the invention as part of a machine concept of a (modular) machine tool 1000 with a portal configuration and a plurality of transport devices 100.

As already shown in FIG. 39, the transport device 100 equipped with a pallet 300 may move into the work area or work space of a machine tool 1000 in portal configuration, the machine tool 1000 processing the workpiece directly on the pallet 300 moved in by the transport device. Here, the machine tool 1000 again includes stand elements 1300 and a transverse element 1200 on which the work spindle 1100 can be moved in the y and z directions. In turn, the transverse element 1200 can now be moved in the x direction with respect to the stand elements 1300.

In particular, it is advantageous if, for handling or carrying heavy workpieces, a plurality of transport devices 100 together transport the workpiece or the pallet 300 (or a machine table) into the machine tool 1000.

For this purpose, the transport devices 100 may be mechanically coupled to one another via the pallet (but see also FIG. 43; possibly with a connection for transmitting signals and/or energy) or controlled so precisely and synchronously by the main computer control 2000 (not shown here) that a coupling or signal and/or energy transmission are not necessary.

Figure 43:
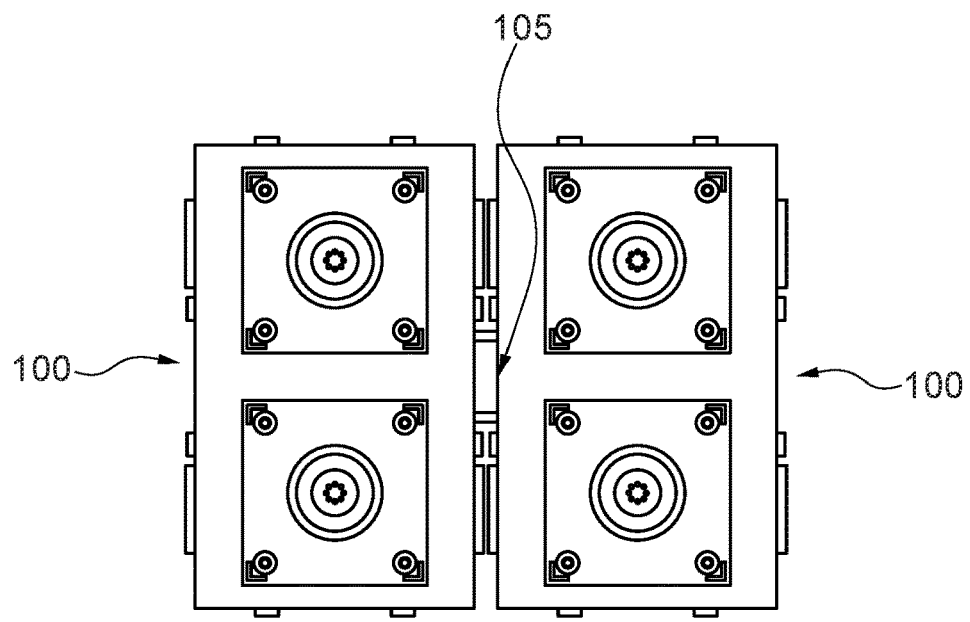
FIG. 43 schematically shows a further embodiment of the transport device according to the invention, wherein a plurality of transport devices are connected to one another by couplings to form a unit.

FIG. 43 schematically shows a further embodiment of the transport device 100 according to the invention, wherein a plurality of transport devices 100 are connected to one another by couplings 105 to form a unit.

As already briefly shown in FIG. 42, it may be advantageous to provide a coupling 105 between two transport devices 100 in order to distribute mechanical forces to both transport devices 100 on the one hand and to have the option of exchanging both signals and energy between the two transport devices 100 via the coupling 105.

It should also be noted here that, instead of the couplings 105 or in conjunction with the couplings 105, the receptacles 1040 can be used for docking a device on a machine tool 1000, as shown for example in FIG. 16c, for connecting/docking two (or more) transport devices 100 or movable machine tool structures with each other. Signals and/or energy may also be transmitted through the conical receptacles used and locking can take place.

FIG. 44 schematically shows a further embodiment of the transport device 100 according to the invention during positioning and establishment of an energy and/or signal connection below a machine tool 1000 in portal configuration.

In addition to the already described components of the machine tool 1000, such as stand elements 1300, transverse element 1200 and work spindle 1100, conical receptacles 1051 of the machine tool are also shown, wherein these, in addition to positioning the transport device 100 when it is lowered above the conical receptacles by means of its lifting cylinders 1051, can establish a connection via which, for example, energy and/or signals for controlling or monitoring the transport device 100 can be transmitted to the transport device 100 and vice versa from the transport device 100 to the machine tool 1000.

Due to the conical receptacles 1051, the pallet 300 can be positioned precisely under the machine tool 1000 and, and this is particularly advantageous, the transport device 100 or the received pallet 300 can be controlled without burdening the internal energy store (not shown here) of the transport device 100, since the energy is provided on part of the machine tool 1000 and fed into the transport device 100 via the connection described.

Figure 45:
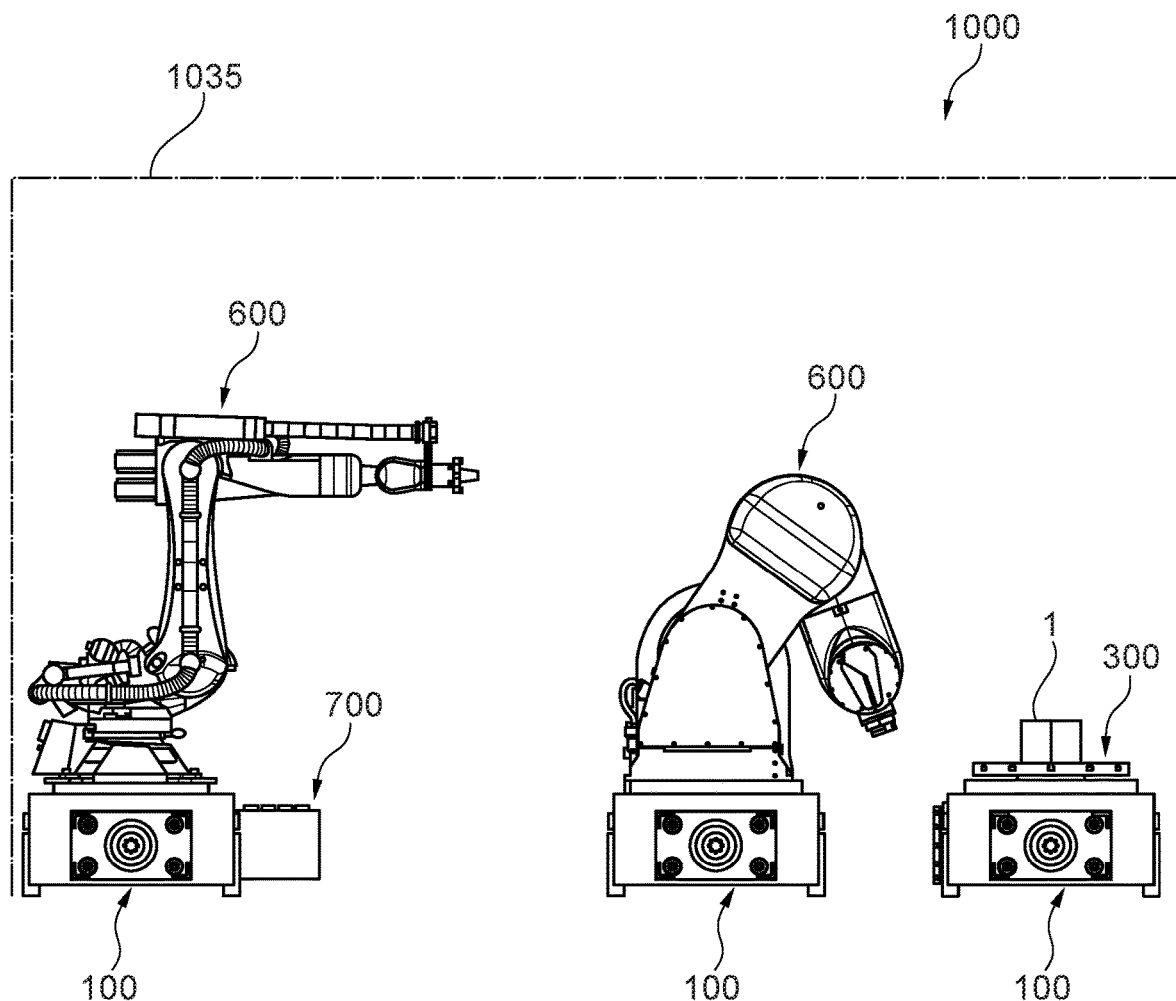
FIG. 45 schematically shows a (modular) machine tool comprising a plurality of transport devices according to the invention with different subtasks.

FIG. 45 schematically shows a (modular) machine tool 1000 comprising a plurality of transport devices 100 according to the invention with different subtasks.

The example shows a transport device 100 with a received pallet 300 (or machine table, for example also with an additional axis of rotation R1) and a workpiece 1 located thereon. In the immediate vicinity thereof is a second transport device 100 with a robot 600 for processing the workpiece 1. For this purpose, the robot 600 may have a wide variety of tools, for example a milling cutter, a grinding tool, or a device that applies material.

Moreover, the machine tool 1000 comprises a third transport device 100 with a robot 600 configured, for example, to exchange the tool received by the other robot 600. As already described above, this transport device may also carry additional modules 700 (such as mesh boxes, material pallets, further material carriers, machine pallets, modules of buffer spaces for tools) from which the robot 600 can, for example, remove tools and transfer them to the other robot 600 for processing the workpiece 1.

In addition, the (modular) machine tool 1000 may include an optional cabin 1035 within which the transport devices 100 can process the workpiece 1 and exchange the tool. It may also be advantageous if the optional cabin 1035 has entrances and exits for the transport devices 100 and also a suction (such as the suction 420 or the standard suction 1020 for stationary machine tools 1000) to suck up dirt from the cabin 1035. In addition, further transport devices 100 may also be used here, for example for additional suction of dirt (for example through the suction 420), the provision of cooling lubricant (module 900 for collecting or sucking off the used cooling lubricant from the machine tool) and/or to ensure chip removal (module for collecting chips 800).

The advantage of such a (modular) machine tool 1000 is that it can be expanded as required by further transport devices 100 with further subtasks. Furthermore, however, it is also possible to build the (modular) machine tool 1000 as a supplement to an already existing, stationary machine tool 1000 in the immediate vicinity thereof, for example to carry out remaining work (deburring, grinding, etc.) on the workpiece 1.

A clear advantage of a modular machine tool 1000 is also that large components (as already shown in FIG. 38, for example) can be processed directly on the transport devices 100 carrying the component, without the component having to be reclamped. Various (large) components can thus be moved into the work space of a transport device 100 carrying, for example, a robot 600 with a milling tool and can accordingly be processed further there.

Again, cones located on the hall floor (such as, for example, cone-shaped receptacles 1051; see also explanations for FIGS. 16a, 16b, 21a, 21b and 44) may be used for precise positioning of the transport devices 100 with respect to one another; these, as already described above, may have clamps so that exact positioning of the transport devices 100 is not only achieved, but also secured by the clamps.

Moreover, the transport devices 100 may also be connected to one another by a coupling 105 (e.g. also to form a unit) in order, for example, to exchange both signals and energy between the transport devices 100 (see also explanations relating to FIG. 43).

Figure 46:
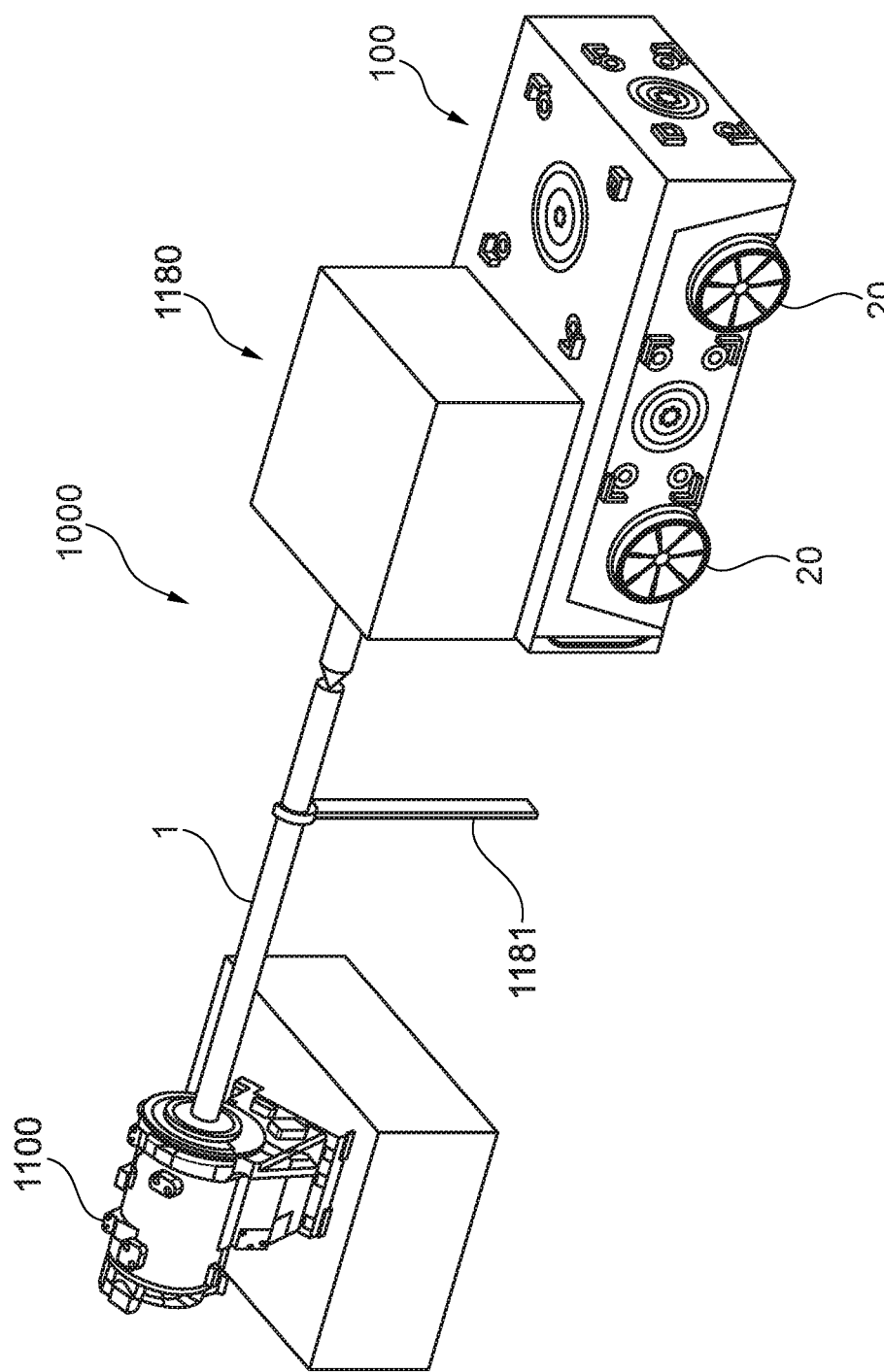
FIG. 46 schematically shows a further embodiment of the transport device according to the invention with a tailstock attachment for turning workpieces.

FIG. 46 schematically shows a further embodiment of the transport device 100 according to the invention with a tailstock attachment 1180 for turning (for example large/long) workpieces 1 as a further concept of a (modular) machine tool 1000.

Here, the alignment of the tailstock attachment 1180 with respect to the work spindle 1100 (here a stationary work spindle 1100) in the x and z directions may be performed, for example, by the drive 20 of the transport device 100. An alignment of the tailstock attachment 1180 in the y direction can now be performed, for example, by the lifting cylinders 50 (as shown in FIGS. 17 and 18) of the transport device 100.

However, a finer adjustment of the tailstock attachment 1180 with respect to the transport device 100 in the x, y and z directions can additionally or exclusively be implemented by means of corresponding drives and guides between the tailstock attachment and the receiving device 40 of the transport device 100. This may be necessary, for example, when the positioning accuracy via the drives 20 of the transport device 100 is insufficient or when the positioning of the transport device 100 is determined by conical receptacles 1051 in the hall floor.

In addition, a steady rest 1181 may be used as a support for very long workpieces 1 in order to obtain greater precision during turning and cylindrical grinding. For the machining itself, a further transport device 100 may now, for example, move up to the workpiece 1 and use a received tool carrier (for example a tool slide, not shown here) for processing the workpiece 1. For the delivery of the tool to the workpiece 1, now the drives 20 of the transport device 100 may be used again and/or an additional delivery mechanism (for finer feed movements) may be provided between the tool carrier and the transport device 100.

Figure 47:
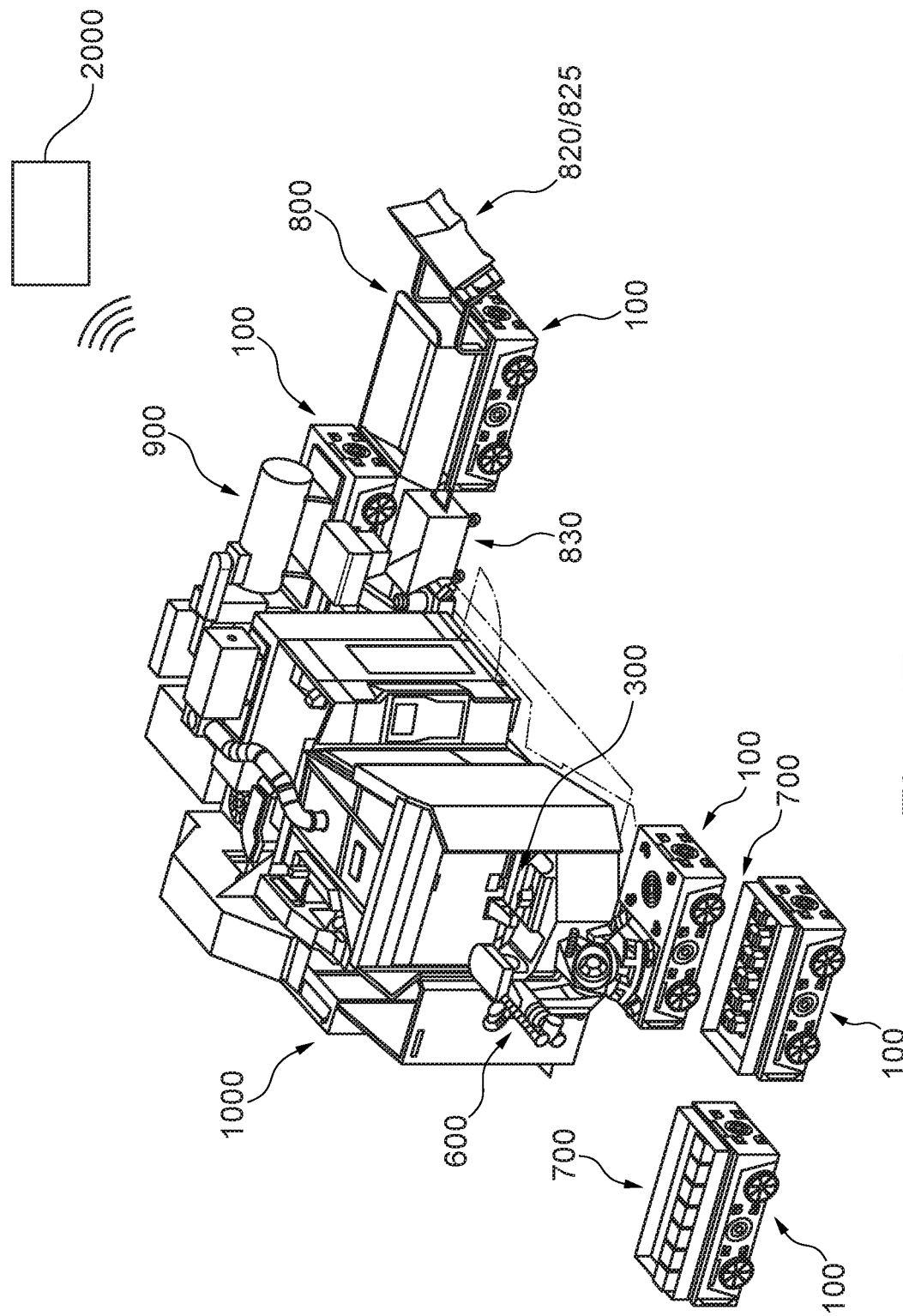
FIG. 47 schematically shows a variety of transport devices according to the invention with different tasks within a production chain.

FIG. 47 schematically shows a variety of transport devices 100 according to the invention with different tasks within a production chain.

The driverless transport system (FTS) preferably includes a superordinate main computer software integrated in the main computer control 2000 which controls and monitors the individual orders. The host computer software is preferably able to control and monitor n+1 transport devices 100 at the same time.

The communication between the transport devices 100 and the main computer control 2000 preferably works wirelessly via WLAN or radio, for example.

The transport device 100 preferably includes an optical information source such as a status light (not shown here) which serves as a graphic representation of the state of the transport device 100. Here, preferably the traffic light logic is used. Green=status ok, yellow: malfunction, red: problem. Alternatively, this light may also indicate further states by means of additional optical signals such as flashing.

If a plurality of transport devices 100 are in use, these may preferably share the handling devices (such as pallet changers 200, robots 600, modules 700 (such as material pallets, mesh boxes, etc.), the module 800 for collecting the chips, the module 900 for collecting or sucking off the used cooling lubricant from the machine tool 1000). This ensures an even more flexible solution for automation.

Preferably, the transport device 100 places a handling device that is no longer required in a known location. A further transport device 100 may move to this handling device, receive it and use it.

The transport devices 100 preferably include a means of communication with other transport devices 100. Thereby it is possible to indicate sources of disturbance such as occupied travel paths, jointly used handling devices and their location and to any other information and respond thereto. The main computer control 2000 may optionally take over this task.

The transport device 100 preferably includes an interface which allows communication, energy transmission to machine tools 1000 or stations. These interfaces are preferably contactless, but they may also alternatively be implemented via connectors or near field communication.

The tasks shown may also be expanded by the previously described concepts of a modular machine tool 1000 (see FIGS. 38 to 46) and linear storage (see FIG. 13) in order to ensure overall flexible and efficient production and machining of workpieces.

Figure 48:
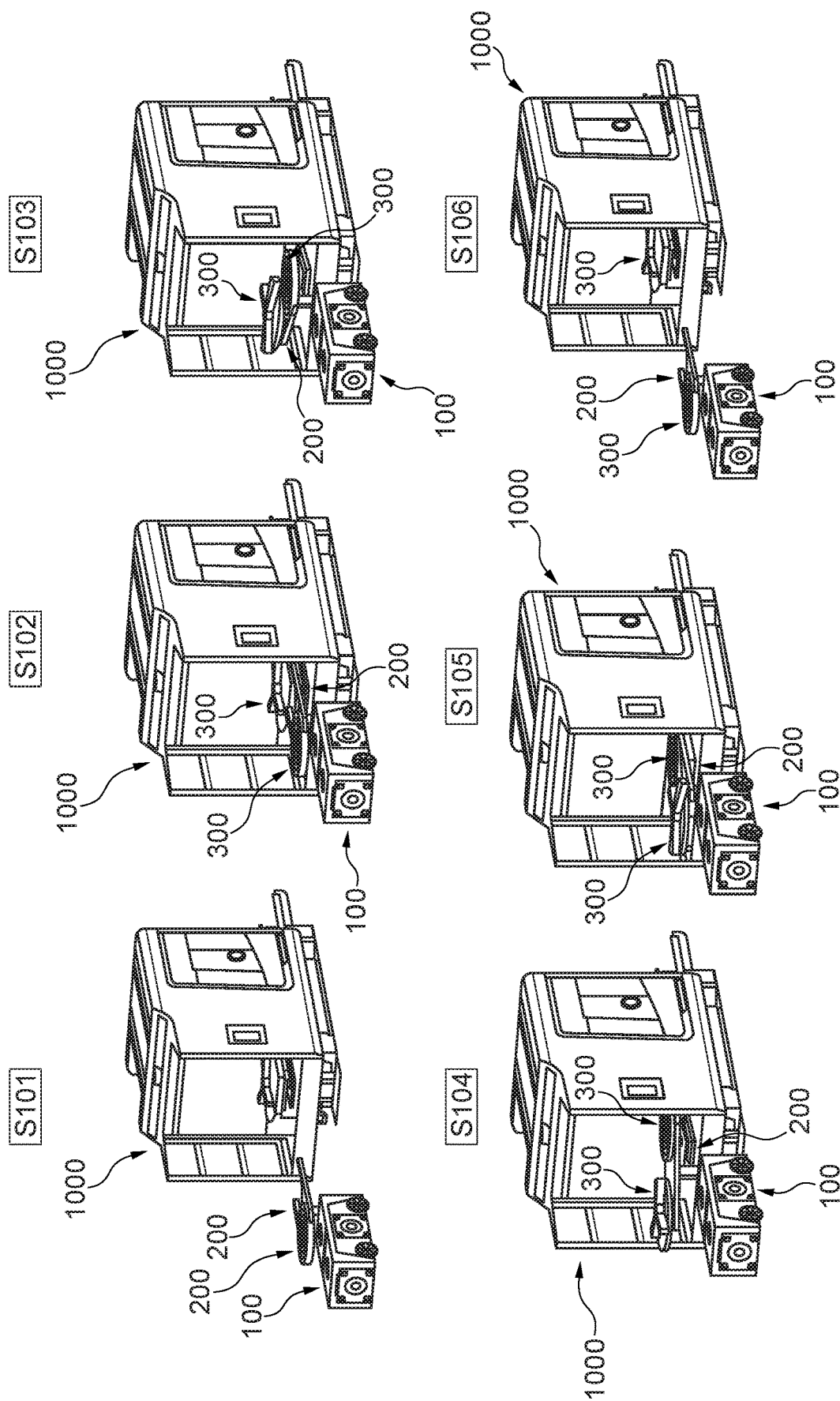
FIG. 48 schematically shows the method according to the invention for handling a pallet and/or a workpiece on a machine tool.

FIG. 48 schematically shows the method according to the invention for handling a pallet 300 and/or a workpiece on a machine tool 1000 by means of a pallet changer 200.

At the beginning, the transport device 100 is to receive a pallet changer 200 which preferably already carries a pallet 300 that is to be inserted into the machine tool 1000.

When the pallet changer 200 (handling device) is received, a connection between the transport device 100 and the pallet changer 200 may be established via connection elements of the transport device 100, via which control signals and/or energy are transmitted from the transport device 100 to the pallet changer 200.

However, this step is omitted in the illustration since receiving a handling device (such as a pallet changer 200) and establishing the connection for energy and/or signal transmission have already been described several times in the previous embodiments.

As shown in step S101, the transport device 100 with the received pallet changer 200 and the pallet 300 moves up to the machine tool 1000, which itself already has a pallet 300 in its work space.

In the subsequent step S102, the pallet changer 200 is positioned in front of the machine tool 1000. As already described, this can be done in such a way that either the transport device 100 itself carries out the positioning by means of travel movements or the transport device 100 is positioned opposite the machine tool 1000 by lowering its chassis 10 onto conical receptacles 1051 (not shown here), or the transport device 100 deposits the pallet changer 200 on conical receptacles 1051.

In this way, either energy and/or signals (e.g. for controlling the pallet change) can be transmitted from the transport device 100 to the pallet changer 200 or the pallet changer 200 can be connected directly with the machine tool 1000 by placing the pallet changer 200 on the conical receptacles 1051 of the machine tool 1000 so that signals and/or energy from the machine tool 1000 are transmitted directly to the deposited pallet changer 200.

It is also shown that the pallet changer 200 has already received the pallet 300 previously inserted in the machine tool 1000.

In step S103, the pallet 300 located in the machine tool 1000 is lifted out by the pallet changer 200 and a rotation of the pallet changer is initiated so that the pallet 300 carried by the pallet changer 200 approaches the pallet receptacle of the machine tool 1000, as is also shown in step S104.

In the following step S105, the pallet 300 previously carried by the pallet changer 200 is positioned above the pallet receptacle of the machine tool 1000 by rotating the pallet changer 200 and is deposited on the pallet receptacle of the machine tool 1000.

This is followed by lifting the pallet changer 200 from the conical receptacles 1051 and the removing/moving away the transport device 100 with the pallet changer 200 and the pallet 300 removed from the machine tool 1000, as shown in step S106.

Furthermore, the method may also proceed in such a way that, after the pallet changer 200 has been deposited on the machine tool 1000, the transport device 100 continues to move without the pallet changer in order, for example, to receive another handling device (another pallet changer 200 or the like) in the meantime and to bring it to a machine tool 1000 or a storage station 500 (not shown here) according to the order.

Subsequently, the transport device 100 or another transport device 100 may, after the pallet has been exchanged, receive the pallet changer 200 deposited in front of the machine tool 1000 again and proceed accordingly.

The above-mentioned method steps may, however, also include the respective function-specific steps of the individual modules and devices that are received by the transport device 100. These can comprise, for example: processing the workpiece by means of a tool and/or an application device by a robot 600; exchanging the tool and/or workpiece by means of a tool changer 720/a changer-storage combination 720/a tool store 720; extracting and conditioning cooling lubricant; collecting and disposing material chips; deburring and/or measuring the contour of the workpiece 1; transporting pallets 300 carrying workpiece 1; transporting a milling head 1120; coupling at least two transport devices 100 with each other; etc. (see also the explanations for FIGS. 3 to 46).

Examples and exemplary embodiments of the present invention and their advantages have been described in detail above with reference to the accompanying figures.

It should be emphasized again that the present invention, however, is in no way limited or restricted to the exemplary embodiments described above and their design features, but rather further comprises modifications of the exemplary embodiments, in particular those that are included within the scope of protection of the independent claims via modifications of the features of the described examples or by combining individual ones or a plurality of the features of the examples described.

In particular, it should be pointed out here that to wide variety of configurations and functions that the transport device 100 according to the invention can fulfill may be combined with one another in order to provide an extremely flexible machine concept in order to make the processing of workpieces 1 even more flexible and efficient. In particular, the above-mentioned concepts of the modular machine tool may be expanded by the various additional functions of the transport device 100 according to the invention mentioned further above, as well as by the provision and exchange of workpieces 1 and/or pallets 300.

However, already existing machine tools 1000 may simply be expanded by additional functions and/or by workpiece and pallet handling. Furthermore, modular machine tools may also be combined with stationary machine tools in order to make the production/machining of workpieces 1 more flexible.

Furthermore, according to the invention, a transport device 100 can, for example, take on tasks from the area of the modular machine tool and additional functions at the same time. A transport device according to the invention is not limited to just one area but can simultaneously take on a wide variety of tasks from different areas.

The above options are therefore not to be interpreted as restrictive and can expressly be combined with one another in any way.

LIST OF REFERENCE SYMBOLS 1 component/workpiece
10 chassis/platform
20 wheel
30 energy store
35 internal controller
40 receiving device
41 conical portions of the receiving device
42 interface of the receiving device
43 fasteners and connections
44 recess
45 pressure piece
46 centering device
47 drive for moving the recesses
48 bolts
50 lifting cylinders (for wheel or suspension)
55 lifting cylinder (for receiving device)
60 suspension
70 connector
71 pressure piece of the connector
72 connector fixing
73 mechanical stop
74 connection interface
75 connector body
100 transport device
101 magazine
102 tool
103 counterpart (to prism)
105 coupling (between two transport devices)
200 pallet changers
210 hood
215 locking device
300 pallet
301 alignment element of the pallet
350 pallet holder
351 alignment element of the pallet holder
355 conical recesses
357 interface of the pallet holder
358 interface of the machine tool
360 collection cover
400 conveyor belt
420 suction
450 workpiece receptacle
470 bar loader
500 storage station
510 conical receptacle (at storage station)
520 storage station with roller technology
600 robot/industrial robot
601 locking plate
610 measurement unit
620 measuring and testing means
630 attachment for post-processing components
640 unit for sharpening and dressing tools
650 protective enclosure
700 module (mesh boxes, material pallets, other material carriers, machine pallets, module of buffer spaces for tools)
720 tool changer, changer-storage combination, tool store
750 robot accessories (exchange gripper, deburrer, storage box for tools)
770 application device
775 powder/media tank
777 feed/suction of powder/media
800 module for collecting chips
810 tilt mechanism
820 lifting mechanism
825 chip container 830 container cart
900 module for collecting or suctioning the used cooling lubricant from the machine tool
910 suction device
920 tank
930 filter (for chips in the cooling lubricant)
1000 machine tool
1010 prism
1020 standard suction
1030 enclosure
1035 optional cabin
1040 pallet holder receptacle
1041 device cone
1042 centering device for aligning the device
1043 media interface
1044 pallet cone
1045 centering device for aligning the pallet
1051 conical receptacle
1060 enclosure
1065 steel cover
1070 round door
1100 work spindle
1120 milling head
1150 grinding attachment
1180 tailstock attachment
1181 steady rest
1200 transverse element (machine tool)
1300 stand element (machine tool)
1350 machine bed
1400 chip collector/chip cart
1500 tool turret
1600 gantry loader
1610 gripper (gantry loader)
1700 circular store
1800 intermediate store for pallets
1850 feed device for pallets
2000 main computer control
3000 stationary robot
4000 setup station for pallet
5000 storage station for pallet

The invention claimed is:

1. A transport device, comprising:
a driverless transport vehicle configured to transport one or more handling devices that are each configured to handle a pallet that is configured to receive a workpiece thereon and/or a workpiece on a machine tool set up on a base surface, configured to move on the base surface and position the one or more handling devices within a region in front of and/or next to the machine tool and/or in front of and/or next to a work space of the machine tool, and configured to be moved freely on a plane independently of a type of rail system to guide the transport vehicle; and
a pallet changer that is mechanically fixed to the driverless transport vehicle and is configured to directly exchange pallets in the work space of the machine tool after the driverless transport vehicle has been moved and has been positioned within a region in front of and/or next to the work space of the machine tool.

2. The transport device according to claim 1, wherein the transport device includes one or more receiving devices configured to receive respective handling devices.

3. The transport device according to claim 2, wherein at least one of the one or more receiving devices includes a centering device configured to align the respectively received handling device with respect to the receiving device.

4. The transport device according to claim 3, wherein the at least one of the one or more receiving devices that includes a centering device also includes a drive configured to linearly displace the receiving device in the direction of the centering device.

5. The transport device according to claim 2, wherein at least one receiving device is provided on at least one side of the transport device.

6. The transport device according to claim 2, wherein the one or more receiving devices include connection elements configured to establish an electrical, hydraulic and/or pneumatic connection to transmit control signals and/or energy from the transport device to the handling device.

7. The transport device according to claim 6, wherein the connection elements automatically establish a connection with the handling device to transmit the electrical, pneumatic and/or hydraulic control signals and/or energy when the handling device is received.

8. The transport device according to claim 6, wherein the receiving devices each include a control device configured to monitor the state of a receptacle of the respective handling device and to monitor the control signals, the energy transfer and/or a locking state of the handling device received on the respective receiving device.

9. The transport device according to claim 2, wherein the one or more receiving devices of the transport device are configured to receive mesh boxes with unfinished and/or finished parts, and/or
the one or more receiving devices of the transport device are configured to receive an exchange gripper that exchanges workpieces and/or tools at the machine tool, and/or the one or more receiving devices of the transport device are configured to receive a pallet holder.

10. The transport device according to claim 1, further comprising:
a drive configured to move the transport vehicle, and
a control unit for controlling the transport device.

11. The transport device according to claim 1, wherein the pallet changer includes a gripper, a receiving claw and/or a fork-shaped receptacle configured to receive the pallet.

12. A system, comprising:
a machine tool having a workspace and a setup station and configured to be set up on a base and to machine workpieces; and
a transport device including
a driverless transport vehicle configured to transport one or more handling devices that are each configured to handle a pallet with a workpiece thereon and/or to handle a workpiece on the machine tool, configured to move on the base surface and position the one or more handling devices within a region in front of and/or next to the machine tool and/or in front of and/or next to the machine tool work space, and configured to be moved freely on a plane independently of a type of rail system to guide the transport vehicle, and
a pallet changer that is mechanically fixed to the driverless transport vehicle and is configured to directly exchange pallets in the machine tool work space after the driverless transport vehicle has been moved and has been positioned within the region in front of and/or next to the machine tool work space.

13. The system according to claim 12, wherein the transport device includes one or more receiving devices configured to receive respective handling devices.

14. The system according to claim 13, wherein at least one of the one or more receiving devices includes a centering device configured to align the respectively received handling device with respect to the receiving device.

15. The system according to claim 13, wherein at least one receiving device is provided on at least one side of the transport device.

16. The system according to claim 13, wherein the one or more receiving devices include connection elements configured to establish an electrical, hydraulic and/or pneumatic connection to transmit control signals and/or energy from the transport device to the handling device.

17. The system according to claim 16, wherein the connection elements automatically establish a connection with the handling device to transmit the electrical, pneumatic and/or hydraulic control signals and/or energy when the handling device is received.

18. The system according to claim 16, wherein the receiving devices each include a control device configured to monitor the state of a receptacle of the respective handling device and to monitor the control signals, the energy transfer and/or a locking state of the handling device received on the respective receiving device.

19. The system according to claim 13, wherein the one or more receiving devices of the transport device are configured to receive mesh boxes with unfinished and/or finished parts, and/or
the one or more receiving devices of the transport device are configured to receive an exchange gripper that exchanges workpieces and/or tools at the machine tool, and/or
the one or more receiving devices of the transport device are configured to receive a pallet holder.

20. The system according to claim 12, wherein the pallet changer includes a gripper, a receiving claw and/or a fork-shaped receptacle configured to receive the pallet.

21. The system according to claim 12, wherein the pallet changer is further configured to exchange pallets at a setup station of the machine tool after the driverless transport vehicle has been moved and has been positioned within the region in front of and/or next to the machine tool work space.

22. The transport device according to claim 1, wherein the pallet changer is further configured to exchange pallets at a setup station of the machine tool after the driverless transport vehicle has been moved and has been positioned within the region in front of and/or next to the machine tool work space.

\* \* \* \* \*